(12) United States Patent
Williams et al.

(10) Patent No.: US 11,840,360 B1
(45) Date of Patent: Dec. 12, 2023

(54) APPARATUS AND A METHOD FOR AN INDICATING SYSTEM FOR GROUND SUPPORT EQUIPMENT FOR AN ELECTRIC AIRCRAFT

(71) Applicant: BETA AIR, LLC, South Burlington, VT (US)

(72) Inventors: Bruce Williams, South Burlington, VT (US); Jake Pill, South Burlington, VT (US); Richard Donnelly, South Burlington, VT (US); Edward Hall, South Burlington, VT (US); Michael Kuss, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 18/121,242

(22) Filed: Mar. 14, 2023

(51) Int. Cl.
*B64F 1/36* (2017.01)
*B60L 58/10* (2019.01)
(Continued)

(52) U.S. Cl.
CPC .............. *B64F 1/362* (2013.01); *B60L 53/18* (2019.02); *B60L 58/10* (2019.02); *B60L 58/24* (2019.02);
(Continued)

(58) Field of Classification Search
CPC .......... B64F 1/362; B60L 58/10; B60L 58/24; B60L 53/18; B60L 2200/10; B64D 45/00;
(Continued)

(56) References Cited

U.S. PATENT DOCUMENTS 10,612,933 B1 *  4/2020  Ledet ................. G01C 21/3469
10,629,067 B1 *  4/2020  Komoni ................ G01S 5/0264
(Continued)

FOREIGN PATENT DOCUMENTS

AU     2008264146 A1 *  7/2009  .......... B60L 11/1818
AU     2014259568 A1 * 11/2014  ............. B63H 21/17
(Continued)

OTHER PUBLICATIONS

Skycharge Mobile, (website), https://www.eaton.com/ch/en-gb/catalog/emobility/skycharge-mobile.html.

*Primary Examiner* — Atul Trivedi
(74) *Attorney, Agent, or Firm* — CALDWELL INTELLECTUAL PROPERTY LAW

(57) ABSTRACT

An apparatus and a method for an indicating system for ground support equipment for an electric aircraft is disclosed. The apparatus may include ground support equipment, wherein the ground support equipment may include at least a ground support module, wherein the at least a ground support module may be configured to support an operation of an electric aircraft, one or more housings, wherein the one or more housings may be configured to house the at least a ground support module, a cable module, wherein the cable module may be configured to connect the at least a ground support module and the electric aircraft, an indicator configured to indicate informatic communication of the at least ground support module and the cable module and a controller communicatively connected to the at least a ground support module and the cable module and configured to control the indicator.

20 Claims, 12 Drawing Sheets

(51) Int. Cl.
*B60L 53/18* (2019.01)
*B60L 58/24* (2019.01)
*H01M 10/44* (2006.01)
*B64D 45/00* (2006.01)
*B64C 29/00* (2006.01)

(52) U.S. Cl.
CPC ............ *B64D 45/00* (2013.01); *H01M 10/44* (2013.01); *B60L 2200/10* (2013.01); *B64C 29/0008* (2013.01); *H01M 2220/20* (2013.01)

(58) Field of Classification Search
CPC .............. H01M 10/44; H01M 2220/20; B64C 29/0008
USPC ........................................................ 701/34.4
See application file for complete search history.

(56) References Cited

U.S. PATENT DOCUMENTS

| | | | |
|---|---|---|---|
| 11,273,724 B1* | 3/2022 | Palombini | B64F 1/22 |
| 11,340,308 B1* | 5/2022 | Schreiber | G01R 31/396 |
| 11,433,775 B1 | 9/2022 | Hinman | |
| 11,447,030 B1* | 9/2022 | Palombini | B60L 53/66 |
| 11,465,529 B1* | 10/2022 | Palombini | B60L 53/305 |
| 11,469,473 B1* | 10/2022 | Wiegman | B60L 3/0046 |
| 11,476,676 B1* | 10/2022 | Lohe | B60L 58/21 |
| 11,485,517 B1* | 11/2022 | Wiegman | H02J 7/00034 |
| 11,515,586 B2 | 11/2022 | Guerra | |
| 11,522,372 B1* | 12/2022 | Wiegman | H02J 13/00002 |
| 11,549,994 B1* | 1/2023 | Lohe | B64D 27/24 |
| 11,562,653 B1* | 1/2023 | Foland | B60L 58/24 |
| 11,572,183 B1* | 2/2023 | Overfield | G06Q 50/30 |
| 11,577,848 B1* | 2/2023 | Foland | B64D 43/00 |
| 11,584,250 B1* | 2/2023 | Palombini | H02J 7/0045 |
| 11,584,254 B1* | 2/2023 | Foland | G08G 5/0034 |
| 11,597,295 B1* | 3/2023 | Lohe | B60L 3/0046 |
| 2002/0158583 A1* | 10/2002 | Lys | B60Q 1/44 |
| | | | 315/82 |
| 2014/0210399 A1* | 7/2014 | Urschel | B64F 1/36 |
| | | | 320/136 |
| 2016/0363659 A1* | 12/2016 | Mindell | G01S 13/66 |
| 2017/0313332 A1* | 11/2017 | Paget | B61L 25/025 |
| 2018/0201152 A1* | 7/2018 | Newman | H02J 7/35 |
| 2019/0058242 A1* | 2/2019 | Tabe | H01Q 1/248 |
| 2019/0229650 A1* | 7/2019 | Demont | B60L 3/0061 |
| 2019/0315479 A1* | 10/2019 | Tillotson | G01S 5/0231 |
| 2020/0055610 A1* | 2/2020 | Terwilliger | F02C 6/14 |
| 2020/0130864 A1* | 4/2020 | Brockers | B64D 47/08 |
| 2020/0277078 A1* | 9/2020 | Smith | B64D 35/02 |
| 2020/0298728 A1* | 9/2020 | Demont | B60L 53/00 |
| 2020/0346551 A1* | 11/2020 | Nestel | H02J 7/007 |
| 2021/0073692 A1* | 3/2021 | Saha | G06V 10/764 |
| 2021/0391731 A1* | 12/2021 | Kirleis | B60L 8/003 |
| 2021/0404827 A1* | 12/2021 | Gloceri | H01M 10/613 |
| 2022/0013814 A1* | 1/2022 | Kirleis | B60L 3/0092 |
| 2022/0032799 A1* | 2/2022 | Ives | H02J 7/0048 |
| 2022/0063431 A1* | 3/2022 | Gurusamy | H02J 7/0013 |
| 2022/0065940 A1* | 3/2022 | Sudarsan | G01R 31/392 |
| 2022/0250508 A1 | 8/2022 | Donovan | |
| 2022/0340042 A1* | 10/2022 | Schreiber | B60L 58/16 |
| 2022/0355697 A1* | 11/2022 | Wiebenga | B60L 58/24 |
| 2022/0355698 A1* | 11/2022 | Lohe | H02J 7/00032 |
| 2022/0363402 A1* | 11/2022 | Schenk | B60K 6/46 |
| 2022/0380030 A1* | 12/2022 | Piccone | B64C 27/12 |
| 2022/0396364 A1* | 12/2022 | Wiegman | B60L 50/60 |
| 2022/0402621 A1* | 12/2022 | McLean | B64D 37/30 |
| 2022/0412023 A1* | 12/2022 | Palombini | B60L 50/64 |
| 2023/0053872 A1* | 2/2023 | Wiegman | B60L 53/16 |
| 2023/0054124 A1* | 2/2023 | Wiegman | B60L 53/16 |
| 2023/0057474 A1* | 2/2023 | Wiegman | H04L 63/10 |
| 2023/0060928 A1* | 3/2023 | Wiegman | B60L 53/62 |
| 2023/0063582 A1* | 3/2023 | Wiegman | B60L 3/0046 |
| 2023/0066433 A1* | 3/2023 | Wiegman | B64D 27/24 |
| 2023/0136181 A1* | 5/2023 | Wiegman | B60L 53/66 |
| | | | 701/3 |
| 2023/0219422 A1* | 7/2023 | Wagner | B60L 58/10 |
| | | | 701/29.4 |

FOREIGN PATENT DOCUMENTS

| | | | | |
|---|---|---|---|---|
| CA | 2706777 A1 | * | 5/2009 | ............ B63H 21/17 |
| CA | 3084784 A1 | * | 10/2019 | ......... H01M 10/615 |
| CN | 109562703 A | * | 4/2019 | ........ B60H 1/00428 |
| CN | 111148643 A | * | 5/2020 | ........ B60H 1/00021 |
| EP | 3936376 A1 | * | 1/2022 | ............. B60L 53/60 |
| GB | 2460500 A | * | 12/2009 | ......... B60L 11/1818 |
| KR | 20170013357 A | * | 2/2017 | ............... G21B 3/00 |

* cited by examiner

APPARATUS AND A METHOD FOR AN INDICATING SYSTEM FOR GROUND SUPPORT EQUIPMENT FOR AN ELECTRIC AIRCRAFT

FIELD OF THE INVENTION

The present invention generally relates to the field of electric aircraft. In particular, the present invention is directed to an apparatus and a method for an indicating system for ground support equipment for an electric aircraft.

BACKGROUND

Electric aircrafts present a great promise for the future. Specifically, electric aircraft will allow human flight to be performed without need to burn fossil fuels. It is well known that fossil fuel use is increasing the level of atmospheric carbon and contributing to global climate change. Furthermore, fossil fuels are a finite resource and, therefore, their use is unsustainable. Servicing the electric aircraft in preparation for flight is essential for flight safety. Additionally, servicing the electric aircraft can be lengthy and inefficient. Existing solutions to make servicing electric aircraft efficient are not sufficient.

SUMMARY OF THE DISCLOSURE

In an aspect, an apparatus for an indicating system for ground support equipment for an electric aircraft is disclosed. The apparatus may include ground support equipment, wherein the ground support equipment may include at least a ground support module, wherein the at least a ground support module may be configured to support an operation of an electric aircraft, one or more housings, wherein the one or more housings may be configured to house the at least a ground support module, a cable module, wherein the cable module may be configured to connect the at least a ground support module and the electric aircraft, an indicator configured to indicate informatic communication of the at least ground support module and the cable module and a controller communicatively connected to the at least a ground support module and the cable module and configured to control the indicator.

In another aspect, a method for using an indicating system for ground support equipment for an electric aircraft is disclosed. The method may include connecting, using a cable module of a battery charging module, the battery charging module and an electric aircraft, activating, using a controller and at least a sensor communicatively connected to the cable module, an indicator mechanically connected to the cable module as a function of the connection, charging, using the battery charging module of ground support equipment, the at least a battery of the electric aircraft, receiving, using the controller and the at least a sensor communicatively connected to the at least a battery, a charging status of the at least a battery of the electric aircraft mated with the battery charging module of the ground service equipment using the cable module, and activating, using the controller, the indicator of the cable module as a function of the charging status.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus for an indicating system for ground support equipment for an electric aircraft. The apparatus may include ground support equipment, wherein the ground support equipment may include at least a ground support module, wherein the at least a ground support module may be configured to support an operation of an electric aircraft, one or more housings, wherein the one or more housings may be configured to house the at least a ground support module, a cable module, wherein the cable module may be configured to connect the at least a ground support module and the electric aircraft, an indicator configured to indicate informatic communication of the at least ground support module and the cable module and a controller communicatively connected to the at least a ground support module and the cable module and configured to control the indicator. Exemplary embodiments illustrating aspects of the present disclosure are described below in the context of several specific examples.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
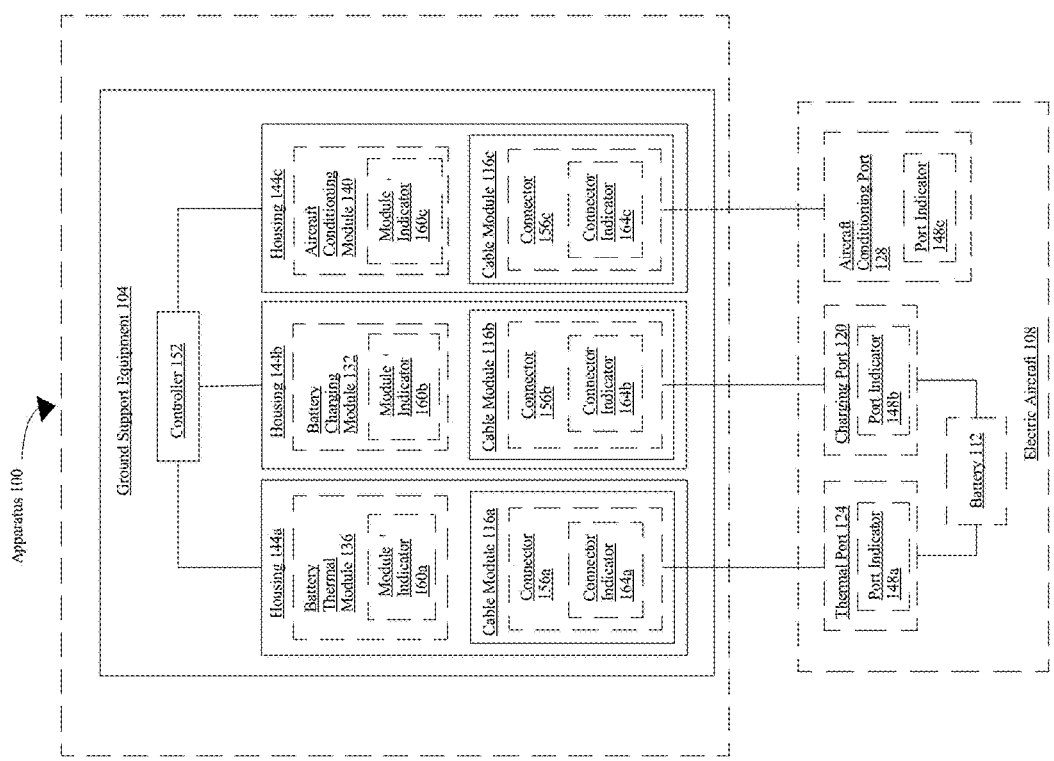
FIG. 1 is a block diagram of ground support equipment with an indicating system for an electric aircraft.

Referring now to the drawings, FIG. 1 illustrates an exemplary embodiment of an apparatus 100 for a usage indicating system for ground support equipment 104 for an electric aircraft 108. For the purposes of this disclosure, an "electric aircraft" is an electrically powered aircraft. Electric aircraft 108 may be capable of rotor-based cruising flight, rotor-based takeoff, rotor-based landing, fixed-wing cruising flight, airplane-style takeoff, airplane-style landing, and/or any combination thereof. "Rotor-based flight," as described in this disclosure, is where the aircraft generated lift and propulsion by way of one or more powered rotors coupled with an engine, such as a quadcopter, multi-rotor helicopter, or other vehicle that maintains its lift primarily using downward thrusting propulsors. "Fixed-wing flight," as described in this disclosure, is where the aircraft is capable of flight using wings and/or foils that generate lift caused by the aircraft's forward airspeed and the shape of the wings and/or foils, such as airplane-style flight. In an embodiment, electric aircraft 108 may include electric vertical takeoff and landing (eVTOL) aircraft. A "vertical take-off and landing aircraft," as used in this disclosure, is an aircraft that can hover, take off, and land vertically. In another embodiment, an electric aircraft 108 may include an electric conventional takeoff and landing (eCTOL) aircraft. For the purposes of this disclosure, a "conventional take-off and landing aircraft" is an aircraft taking off and landing horizontally from a conventional length runway in the distance. In another embodiment, an electric aircraft 108 may include an electric short takeoff and landing (eSTOL) aircraft. For the purposes of this disclosure, a "short takeoff and landing aircraft" is an aircraft that needs a shorter minimum horizontal distance to accelerate in order to ascend into the air than typical fixed wing types of aircrafts. In some embodiments, an electric aircraft 108 may include a sensor. The sensor disclosed herein may be consistent with a sensor disclosed below. Additionally, the electric aircraft 108 disclosed herein is further described in detail with respect to FIG. 9.

With continued reference to FIG. 1, in some embodiments, an electric aircraft 108 may include at least a battery 112. As used in this disclosure, a "battery" is a source of stored electrical power. As a non-limiting example, the at least a battery 112 may include one or more battery cells, one or more battery modules, and/or one or more battery packs configured to provide electrical power to an electric aircraft 108 and/or an aircraft electrical subsystem. For the purposes of this disclosure, a "battery pack" is a set of battery modules. For the purposes of this disclosure, a "battery module" is a set of battery cells. For the purposes of this disclosure, a "battery cell" is a single anode and cathode separated by electrolyte, wherein the cell produces voltage and current. In some embodiments, the at least a battery 112 may include at least a sensor. The sensor disclosed herein may be consistent with a sensor disclosed below. In some embodiments, the at least a sensor may include a temperature sensor. For the purposes of this disclosure, a "temperature sensor" is a device that detects heat and converts it into an electrical signal. As a non-limiting example, the temperature sensor may include thermocouples, thermistors, thermometers, passive infrared sensors, resistance temperature sensors (RTD's), semiconductor based integrated circuits (IC), a combination thereof or another undisclosed sensor type, alone or in combination. For the purposes of this disclosure and as would be appreciated by someone of ordinary skill in the art, "temperature" is a measure of the heat energy of a system. Temperature, as measured by any number or combinations of sensors, may be measured in Fahrenheit (° F.), Celsius (° C.), Kelvin (° K), or another scale alone or in combination. The temperature measured by sensors may comprise electrical signals which are transmitted to their appropriate destination wireless or through a wired connection. The at least a battery 112 disclosed herein is further described in detail in FIGS. 5-7. Additionally without limitation, the at least a battery 112 disclosed herein may be consistent with a battery module and/or a battery pack described in U.S. patent application Ser. No. 17/890, 716, filed on Aug. 18, 2022, and entitled "METHODS AND SYSTEMS FOR GROUND-BASED THERMAL CONDITIONING FOR AN ELECTRIC AIRCRAFT,", which is incorporated in its entirety herein by reference.

With continued reference to FIG. 1, in some embodiments, an electric aircraft 108 may include a port. For the purposes of this disclosure, a "port" is an interface that mates with a mating component in order to connect a second component with the mating component. "Mate," as used in this disclosure, is an action of attaching two or more components together. Mating may be performed using a mechanical or electromechanical means described in this disclosure. For example, without limitation mating may include an electromechanical device used to join electrical conductors and create an electrical circuit. In some cases, mating may be performed by way of gendered mating components. A gendered mate may include a male component or plug which is inserted within a female component or socket. In some cases, mating may be removable. In some cases, mating may be permanent. In some cases, mating may be removable, but requires a specialized tool or key for removal. Mating may be achieved by way of one or more of plug and socket mates, pogo pin contact, crown spring mates, and the like. In some cases, mating may be keyed to ensure proper alignment of a mating component. In some cases, mate may be lockable. As used in this disclosure, a "mating component" is a component that mates with at least another component. As a non-limiting example, a mating component may include a cable module 116a-c. In some embodiments, a port may be configured to mate with a cable module 116a-c. The cable module 116a-c disclosed herein is further described below. As a non-limiting example, a port may include a female component having a receptive form, receptive to a male component, a cable module 116a-c. Alternatively or additionally, a port may include a male component having a penetrative form that may include one or more plug pins, that may be protruding pins, that mates with a socket, a female component of a cable module 116a-c.

With continued reference to FIG. 1, in some embodiments, a port may include a charging port 120. For the purposes of this disclosure, a "charging port" is a port used for charging an electric aircraft. In some embodiments, a charging port 120 may be mated with a cable module 116*a-c* of a battery charging module 132. The battery charging module 132 disclosed herein is further disclosed below. In some embodiments, a port may include a thermal port 124. For the purposes of this disclosure, a "thermal port" is a port that is used to provide a coolant flow to at least a battery of an electric aircraft. In some embodiments, a thermal port 124 may be mated with a cable module 116*a-c* of a battery charging module 136. The battery charging module 136 disclosed herein is further described below. In some embodiments, a port may include an aircraft conditioning port 128. For the purposes of this disclosure, an "aircraft conditioning port" is a port that is used for communication related an electric aircraft. In some embodiments, an aircraft conditioning port 128 may be mated with a cable module 116*a-c* of an aircraft conditioning module 140. The aircraft conditioning module 140 disclosed herein is further described below. In some embodiments, a port may include a multi-port. For the purposes of this disclosure, a "multi-port" is a port that can be used for multiple purposes. As a non-limiting example, a multi-port may be used as a charging port 120, thermal port 124, and aircraft conditioning port 128 all at once. In some embodiments, the multi-port may be mated with a cable module 116*a-c* that is connected with a battery charging module 136, battery charging module 132, and an aircraft conditioning module 140. In some embodiments, a port may be but not limited to on the right, left, middle, top, bottom, or other side of an electric aircraft 108. An electric aircraft 108 may include a plurality of same ports 116. As a non-limiting example, an electric aircraft 108 may include six charging port 120*s*. An electric aircraft 108 may include a plurality of different ports 116. As a non-limiting example, an electric aircraft 108 may include three charging port 120*s*, two thermal port 124*s*, and one aircraft conditioning port 128. A port may be visible on a surface of electric aircraft 108. A port may be covered with a cover. The port may be accessible as the cover is opened. The cover may be closed after the port is being used. The cover may open and close manually by a human. The cover may open and close by a command from a flight controller.

Figure 4:
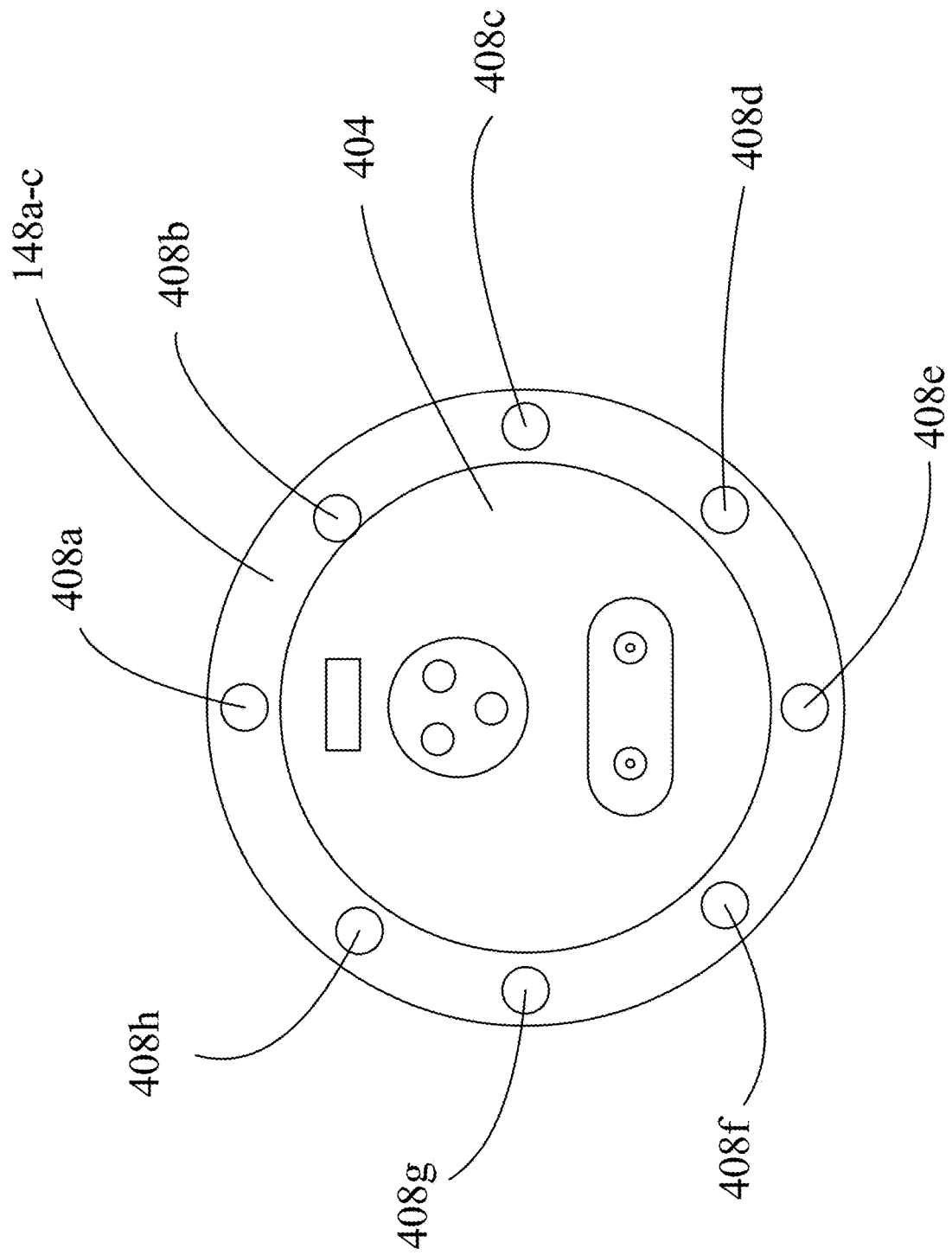
FIG. 4 is an exemplary embodiment of a port of an electric aircraft and a port indicator.

With continued reference to FIG. 1, in some embodiments, a port may include a port indicator 148*a-c*. For the purposes of this disclosure, a "port indicator" is an indicator used in a port of an electric aircraft. The port indicator disclosed herein may be consistent with an indicator described below. An exemplary configuration of the port and the port indicator 148*a-c* is shown in FIG. 4. The port indicator 148*-c* may include a light indicator, a sound indicator, a vibration indicator, and the like. The light indicator, the sound indicator, the vibration indicator is further described in detail below. In an embodiment, the port indicator 148*a-c* may indicate an attachment condition of a port and a cable module 116*a-c*. For the purposes of this disclosure, an "attachment condition" refers to a condition where mating components are mated successfully or not to communicate. As a non-limiting example, a controller 152 may receive a signal from a proximity sensor, wherein the signal includes that the port and a connector 156*a-c* of the cable module 116*a-c* are securely mated. Then, the controller 152 may activate a port indicator 148*a-ca-c* to light up in green to indicate that the port and the connector 156*a-c* are securely mated. As another non-limiting example, the controller 152 may receive a signal from the proximity sensor, wherein the signal includes that the port and a connector 156*a-c* of the cable module 116*a-c* are not securely mated. Then, the controller 152 may activate a port indicator 148*a-ca-c* to light up in red to indicate that the port and the connector 156*a-c* are not securely mated and the attachment of them needs to be adjusted.

With continued reference to FIG. 1, in another embodiment, a port indicator 148*a-c* may indicate that a port is ready to be detached from a cable module 116*a-c*. When the port and the cable module 116*a-c*, for example without limitation, are in communication, the port and the cable module 116*a-c* may not be ready to be detached. When the port and the cable module 116*a-c*, for another example without limitation, are done communicating, then the port and the cable module 116*a-c* may be ready to be detached. As a non-limiting example, when a flow sensor detects a coolant flow from at least a battery thermal module 136, the flow sensor may transmit a signal to a controller 152. When the controller 152 receives the signal from the flow sensor, the controller 152 may activate a port indicator 148*a-ca-c* to flash in red to indicate that the port and the connector 156*a-c* of the cable module 116*a-c* are not ready to be detached. As another non-limiting example, when the flow sensor detects no coolant flow from at least a battery thermal module 136, and the controller 152 does not receive a signal from the flow sensor, the controller 152 may activate a port indicator 148*a-ca-c* to light up in green to indicate that the port and the connector 156*a-c* of the cable module 116*a-c* are ready to be detached.

With continued reference to FIG. 1, for the purposes of this disclosure, "ground support equipment," also called "GSE" is support equipment that supports an operation of an aircraft whilst on the ground. In some embodiments, ground support equipment 104 may be connected to the electric aircraft 108 during a ground support. For the purposes of this disclosure, "ground support" is support operations of an aircraft that are done when the aircraft is on the ground. As a non-limiting example, the ground support equipment 104 may be used to charge at least a battery 112 of an electrical aircraft. As another non-limiting example, the ground support equipment 104 may be used to regulate a temperature of the at least a battery 112 of the electric aircraft 108. As another non-limiting example, the ground support equipment 104 may be used to engage in pre-flight preparation. The pre-flight communication disclosed herein is further described in detail below. As another non-limiting example, the ground support equipment 104 may be used for informatic communication. For the purposes of this disclosure, "informatic communication" is an attribute wherein two or more relata interact with one another by way of an information flow or information in general. In some embodiments, informatic communication disclosed herein may be consistent with data communication. For the purposes of this, "communication" is an attribute wherein two or more relata interact with one another, for example within a specific domain or in a certain manner. In some cases communication between two or more relata may be of a specific domain, such as without limitation electric communication, fluidic communication, informatic communication, mechanic communication, thermal communication, and the like. For the purposes of this disclosure, "electric communication" is an attribute wherein two or more relata interact with one another by way of an electric current or electricity in general. For the purposes of this disclosure, "fluidic communication" is an attribute wherein two or more relata interact with one another by way of a fluidic flow or fluid in general. For the purposes of this disclosure, "mechanic communication" is an attribute wherein two or more relata interact with one another by way of mechanical means, for instance, mechanic effort, such as without limitation a force, and flow, such as without limitation velocity. For the purposes of this disclosure, "thermal communication" is an attribute wherein two or more relata interact with one another by way of temperature in general. Additionally without limitation, ground support equipment 104 disclosed herein may be consistent with a ground service system found in U.S. patent application Ser. No. 17/752,248, filed on May 24, 2022, and entitled "GROUND SERVICE SYSTEMS AND DEVICES FOR AN ELECTRIC AIRCRAFT,", a ground support cart found in U.S. Ser. No. 17/405,662, filed on Aug. 18, 2021 and entitled "A GROUND SUPPORT CART FOR RECHARGING AN ELECTRIC AIRCRAFT AND A METHOD OF USE,", and/or a ground-based thermal conditioning module in U.S. patent application Ser. No. 17/890,716, filed on Aug. 18, 2022, and entitled "METHODS AND SYSTEMS FOR GROUND-BASED THERMAL CONDITIONING FOR AN ELECTRIC AIRCRAFT,", which are incorporated in their entirety herein by reference.

With continued reference to FIG. 1, in an embodiment, ground support equipment 104 may be fixed on the ground. In another embodiment, ground support equipment 104 may be movable. For the purposes of this disclosure, "movable" refers to an ability to move from one location to another. As a non-limiting example, the ground support equipment 104 may move from a facility to a charging station. As a non-limiting example, the ground support equipment may move closer to an electric aircraft 108. In an embodiment, ground support equipment 104 may include at least a wheel. For the purposes of this disclosure, a "wheel" is a circular object that revolves on an axle to enable it to move over a surface. As a non-limiting example, a user may push and/or pull to move the ground support equipment 104. For the purposes of this disclosure, a "user" may be any person that uses an apparatus. As another non-limiting example, the ground support equipment 104 may be motorized, wherein the ground support equipment 104 may be equipped with a motor to move the ground support equipment 104.

With continued reference to FIG. 1, in an embodiment, ground support equipment 104 may include at least a ground support module. For the purposes of this disclosure, a "ground support module" is any module that ground supports an electric aircraft. In some embodiments, the ground support module may include at least a battery charging module 120. For the purposes of this disclosure, a "battery charging module" is a module configured to charge at least a battery of an electric aircraft. As a non-limiting example, the at least a battery 112 of the electric aircraft 108 may include at least a battery pack, at least a battery module, at least a battery cell, and the like. The at least a battery 112 is further described in detail with respect to FIGS. 5-7. In some embodiments, a battery charging module 132 may include an energy source. For the purposes of this disclosure, an "energy source" is a source of electrical power. In some embodiments, an energy source may be an energy storage device, such as, for example, a battery or a plurality of batteries. A battery may include, without limitation, a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Additionally, an energy source need not be made up of only a single electrochemical cell, it can consist of several electrochemical cells wired in series or in parallel. In other embodiments, an energy source may be a connection to the power grid. For example, in some non-limiting embodiments, an energy source may include a connection to a grid power component. Grid power component may be connected to an external electrical power grid. In some other embodiments, the external power grid may be used to charge batteries, for example, when energy source includes batteries. In some embodiments, grid power component may be configured to slowly charge one or more batteries in order to reduce strain on nearby electrical power grids. Battery charging module 132 may house a variety of electrical components. In one embodiment, battery charging module 132 may contain a solar inverter. Solar inverter may be configured to produce on-site power generation. In one embodiment, power generated from solar inverter may be stored in battery charging module 132. In some embodiments, battery charging module 132 may include a used electric aircraft 108 battery pack no longer fit for flight. Additionally without limitation, a battery charging module disclosed herein may be consistent with a charging module found in U.S. patent application Ser. No. 17/752,248, filed on May 24, 2022, and entitled "GROUND SERVICE SYSTEMS AND DEVICES FOR AN ELECTRIC AIRCRAFT,", which is incorporated in its entirety herein by reference.

With continued reference to FIG. 1, in another embodiment, a ground support module may include at least a battery charging module 136. In some embodiments, ground support equipment 104 may include a plurality of battery thermal modules 124. For the purposes of this disclosure, a "battery thermal module" is a module that regulates temperature of at least a battery 112 of an electric aircraft 108. In an embodiment, the at least a battery charging module 136 may be configured to heat at least a battery 112. For the purposes of this disclosure, "heating" refers to increasing thermal energy within a system. As a non-limiting example, the at least a battery charging module 136 may be configured to heat at least a battery 112 while charging the at least a battery 112. In another embodiment, the at least a battery charging module 136 may be configured to cool the at least a battery 112. For the purposes of this disclosure, "cooling" refers to removing thermal energy from a system. As a non-limiting example, the at least a battery charging module 136 may be configured to cool at least a battery 112 while charging the at least a battery 112. In some embodiments, the battery charging module 136 may be configured to precondition the at least a battery 112. For the purposes of this disclosure, "preconditioning" is a set of operations to intensify one or more electrical subsystems of an electric aircraft to prepare it for an operation. Preconditioning may include a set of operations to modify a temperature of component of an electric aircraft 108, wherein modifying may include preheating, and/or precooling. For the purposes of this disclosure, "preheating" refers to a process of heating a power source beforehand to prepare the power source to be used. This is so, at least in part to set the temperature of the at least a battery 112 at the optimal temperature to its best operating temperature. Additionally or alternatively, this is so, at least in part to set the temperature of the at least a battery 112 at an optimal temperature to prepare for the next process of a supporting an operation of an electric aircraft 108. For the purposes of this disclosure, an "optimal temperature" is a range of temperature at which a power source functions its best. When the at least a battery 112 at a temperature off from the optimal temperature gets charged, the at least a battery 112 may be damaged or lose its efficiency. As a non-limiting example, this is so, at least in part to set the temperature of the at least a battery 112 at the optimal temperature to receive charging at a higher rate, resulting in an overall faster recharge time. As another non-limiting example, when the at least a battery 112 at a temperature off from the optimal temperature gets charged, the at least a battery 112 may be permanently damaged. For the purposes of this disclosure, "precooling" refers to a process of cooling a power source beforehand to prepare the power source to be used. This is so, at least in part to set the temperature of the at least a battery 112 at the optimal temperature to prepare for the next process of a supporting an operation of an electric aircraft 108. As a non-limiting example, this is so, at least in part to set the temperature of the at least a battery 112 at a temperature to receive charging at a higher rate, resulting in an overall faster recharge time. Persons skilled in the art, upon reviewing the entirety of this disclosure, will be aware of the various embodiments of power source preconditioning as described herein.

With continued reference to FIG. 1, in some embodiments, at least a battery charging module 136 may be communicatively connected to at least a battery charging module 132. In some embodiments, regulating temperature using the battery charging module 136 may occur synchronously and/or asynchronously with charging using a battery charging module 132. As a non-limiting example, the battery charging module 136 may be configured to provide a flow of coolant prior to charging at least a battery 112 of an electric aircraft 108 using the battery charging module 132. Additionally without limitation, a battery charging module 136 disclosed herein may be consistent with a cooling module found in U.S. patent application Ser. No. 17/752,248, filed on May 24, 2022, and entitled "GROUND SERVICE SYSTEMS AND DEVICES FOR AN ELECTRIC AIRCRAFT,", a ground based thermal conditioning module found in U.S. patent application Ser. No. 17/890,716, filed on Aug. 18, 2022, and entitled "METHODS AND SYSTEMS FOR GROUND-BASED THERMAL CONDITIONING FOR AN ELECTRIC AIRCRAFT,", and/or a ground service equipment found in U.S. patent application Ser. No. 18/120,257, filed on Mar. 10, 2023, and entitled "A SYSTEM AND A METHOD FOR PRECONDITIONING A POWER SOURCE OF AN ELECTRIC AIRCRAFT,", which are incorporated in their entirety herein by reference.

With continued reference to FIG. 1, in some embodiments, a battery charging module 136 may include a coolant source. For the purposes of this disclosure, a "coolant source" is an origin, generator, reservoir, or flow producer of coolant. In some cases, a coolant source may include a flow producer, such as a fan and/or a pump. A coolant source may include any of following non-limiting examples, air conditioner, refrigerator, heat exchanger, pump, fan, expansion valve, and the like. For the purposes of this disclosure, "coolant" is any flowable heat transfer medium. Coolant may include a liquid, a gas, a solid, and/or a fluid. Coolant may include a compressible fluid and/or a non-compressible fluid. Coolant may include a non-conductive liquid such as a fluorocarbon-based fluid, such as without limitation Fluorinert from 3M of Saint Paul, Minnesota, USA. In some cases, coolant may include air. As used in this disclosure, a "coolant flow" is a stream of coolant. In some cases, a coolant may include a fluid and coolant flow is a fluid flow. Alternatively or additionally, in some cases, a coolant may include a solid, such as without limitation bulk material and coolant flow may include motion of the solid. Exemplary forms of mechanical motion for bulk materials include fluidized flow, augers, conveyors, slumping, sliding, rolling, and the like.

With continued reference to FIG. 1, in some embodiments, a coolant source may be further configured to transfer heat between coolant, for non-limiting example coolant belonging to coolant flow, and an ambient air. As used in this disclosure, "ambient air" is air which is proximal a system and/or subsystem, for instance the air in an environment which a system and/or sub-system is operating. For example, in some cases, a coolant source may include a heat transfer device between coolant and ambient air. Exemplary heat transfer devices may include, without limitation, heat pumps, refrigeration, air conditioning, expansion or throttle valves, heat exchangers, such as without limitation air-to-air heat exchangers, air-to-liquid heat exchangers, shell-tube heat exchangers, and the like, vapor-compression cycle system, vapor absorption cycle system, gas cycle system, Stirling engine, reverse Carnot cycle system, and the like.

With continued reference to FIG. 1, in some embodiments, a ground support module may include at least an aircraft conditioning module 140. In some embodiments, GSE 104 may include a plurality of aircraft conditioning modules 128. For the purposes of this disclosure, an "aircraft conditioning module" is a module configured to engage in a pre-flight preparation protocol. For the purposes of this disclosure, a "pre-flight preparation protocol" is a protocol to perform a variety of functions in order to condition an electric aircraft 108 so that it is prepared for a flight. As a non-limiting example, the pre-flight preparation protocol may include a window defrosting system, a wing defrosting system, and a cockpit pre-conditioning system. In some embodiments, the aircraft conditioning module 140 may also conduct preflight tests on an electric aircraft 108. As a non-limiting example, the preflight tests may include verifying the accuracy of aircraft sensors on an electric aircraft 108. This may include comparing the data from the sensors to expected values. In some embodiments, the aircraft conditioning module 140 may be configured to pre-boot any electronic systems. This may include booting up any pilot control systems, pilot displays, and the like. In some embodiments, this may include applying software updates to the electronic systems. In some embodiments, the at least an aircraft conditioning module 140 may be communicatively connected to a flight controller of an electric aircraft 108. The flight controller disclosed herein is further described in detail with respect to FIG. 8.

With continued reference to FIG. 1, ground support equipment 104 may include at least a sensor. In some embodiments, the at least a sensor may be communicatively connected to a controller 152. The controller 152 disclosed herein is further described below. In some embodiments, the at least a sensor may be communicatively connected to at least a battery 112 of an electric aircraft 108. The at least a sensor may include one or more sensors. As used in this disclosure, a "sensor" is a device that is configured to detect an input and/or a phenomenon and transmit information related to the detection. For example, and without limitation, the at least a sensor may transduce a detected phenomenon, such as without limitation, motion, speed, acceleration, temperature, voltage, current, pressure, and the like, into a sensed signal. In some embodiments, the at least a sensor may be communicatively connected to at least a battery charging module 132. In another embodiment, the at least a sensor may be communicatively connected to at least a battery charging module 136. In another embodiment, the at least a sensor may be communicatively connected to at least an aircraft conditioning module 140. In some embodiments, the at least a sensor may be communicatively connected to a cable module 116. In some embodiments, the at least a sensor may be communicatively connected to an electric aircraft. As a non-limiting example, the at least a sensor may be configured to detect a motion of a cable module 116*a-c*, an attachment condition of a cable module 116*a-c* to a port of an electric aircraft 108, a temperature of at least a battery 112, a flow rate of a coolant, a temperature of an electric aircraft components, a motion of a retractable drawer of a ground service module, current, voltage, pressure, temperature, moisture level, and the like. The signal the at least a sensor outputs may include electrical, electromagnetic, visual, audio, radio waves, or another undisclosed signal type alone or in combination. At least a sensor may be communicatively connected to a controller 152, as discussed further in this disclosure. In an embodiment, the at least a sensor may transmit a signal to a controller 152. The at least a sensor may be a contact or a non-contact sensor.

With continued reference to FIG. 1, at least a sensor may include a plurality of independent sensors, where any number of the described sensors may be used to detect any number of physical or electrical quantities associated with at least a battery 112, ground support equipment 104, or an electrical energy storage system of an electric aircraft 108. Independent sensors may include separate sensors measuring physical or electrical quantities that may be powered by and/or in communication with circuits independently, where each may signal sensor output to a control circuit. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of at least a sensor to detect phenomenon may be maintained.

With continued reference to FIG. 1, In one or more embodiments, and without limitation, the at least a sensor may include one or more temperature sensors, voltmeters, current sensors, hydrometers, infrared sensors, photoelectric sensors, ionization smoke sensors, motion sensors, pressure sensors, radiation sensors, level sensors, imaging devices, moisture sensors, gas and chemical sensors, flame sensors, electrical sensors, imaging sensors, force sensors, Hall sensors, and the like. In some embodiments, at least a sensor may include a motion sensor. A "motion sensor", for the purposes of this disclosure, refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. At least a sensor may include, torque sensor, gyroscope, accelerometer, torque sensor, magnetometer, inertial measurement unit (IMU), pressure sensor, force sensor, proximity sensor, displacement sensor, vibration sensor, among others.

With continued reference to FIG. 1, in some embodiments, at least a sensor may include a pressure sensor. Pressure, for the purposes of this disclosure, and as would be appreciated by someone of ordinary skill in the art, is a measure of force required to stop a fluid from expanding and is usually stated in terms of force per unit area. The pressure sensor that may be included in at least a sensor may be configured to measure an atmospheric pressure and/or a change of atmospheric pressure. In some embodiments, the pressure sensor may include an absolute pressure sensor, a gauge pressure sensor, a vacuum pressure sensor, a differential pressure sensor, a sealed pressure sensor, and/or other unknown pressure sensors or alone or in a combination thereof. The pressor sensor may include a barometer. In some embodiments, the pressure sensor may be used to indirectly measure fluid flow, speed, water level, and altitude. In some embodiments, the pressure sensor may be configured to transform a pressure into an analogue electrical signal. In some embodiments, the pressure sensor may be configured to transform a pressure into a digital signal.

With continued reference to FIG. 1, in one or more embodiments, at least a sensor may include a moisture sensor. "Moisture", as used in this disclosure, is the presence of water, which may include vaporized water in air, condensation on the surfaces of objects, or concentrations of liquid water. Moisture may include humidity. "Humidity", as used in this disclosure, is the property of a gaseous medium (almost always air) to hold water in the form of vapor. In one or more embodiments, at least a sensor may include electrical sensors. Electrical sensors may be configured to measure voltage across a component, electrical current through a component, and resistance of a component. In one or more embodiments, at least a sensor may include thermocouples, thermistors, thermometers, infrared sensors, resistance temperature sensors (RTDs), semiconductor based integrated circuits (ICs), a combination thereof, or another undisclosed sensor type, alone or in combination. "Temperature," for the purposes of this disclosure, and as would be appreciated by someone of ordinary skill in the art, is a measure of the heat energy of a system. Temperature, as measured by any number or combinations of sensors present within at least a sensor, may be measured in Fahrenheit (° F.), Celsius (° C.), Kelvin (° K), or another scale alone or in combination. The temperature measured by sensors may comprise electrical signals, which are transmitted to their appropriate destination wireless or through a wired connection. In some embodiments, the at least a sensor may include a flow sensor. For the purposes of this disclosure, a "flow sensor" is a sensor that measures a flow of a fluid. As a non-limiting example, the flow sensor may measure a flow rate of a coolant between ground service equipment 116 and an electric aircraft 108. In some embodiments without limitation, the flow sensor may include ultrasonic meter, electromagnetic meter, Karman vortex meter, paddlewheel meter, floating element meter, thermal meter, differential pressure types meter, and the like. Persons skilled in the art, upon reviewing the entirety of this disclosure, will be aware of various ways in which steps, sequences of steps, and/or processing tasks to detect the flow of fluids for the disclosure. In some embodiments, the at least a sensor may include a battery current sensor. For the purposes of this disclosure, a "battery current sensor" is a device that monitors the flow of currents into and out of a battery.

With continued reference to FIG. 1, in one or more embodiments, at least a sensor may include a sensor suite which may include a plurality of sensors that may detect similar or unique phenomena. For example, in a non-limiting embodiment, sensor suite may include a plurality of voltmeters or a mixture of voltmeters and thermocouples. Ground support equipment 104 may include a plurality of sensors in the form of individual sensors or a sensor suite working in tandem or individually. A sensor suite may include a plurality of independent sensors, as described in this disclosure, where any number of the described sensors may be used to detect any number of physical or electrical quantities associated with an aircraft. Independent sensors may include separate sensors measuring physical or electrical quantities that may be powered by and/or in communication with circuits independently, where each may signal sensor output to a control circuit such as controller 152. In one or more embodiments, at least a sensor may include a sense board, such as sense board. A sense board may have at least a portion of a circuit board that includes one or more sensors configured to, for example, measure a temperature of at least a battery 112. In one or more embodiments, a sense board may be connected to battery modules and/or cells of at least a battery 112. In one or more embodiments, a sense board may include one or more circuits and/or circuit elements, including, for example, a printed circuit board component. A sense board may include, without limitation, a control circuit configured to perform and/or direct any actions performed by the sense board and/or any other component and/or element described in this disclosure. The control circuit may include any analog or digital control circuit, including without limitation a combinational and/or synchronous logic circuit, a processor, microprocessor, microcontroller, or the like.

With continued reference to FIG. 1, at least a sensor may include sensors configured to measure physical and/or electrical parameters. As a non-limiting example, temperature and/or voltage, of at least a battery 112 may be measured. For example, and without limitation, at least a sensor may monitor voltage and/or temperature of battery modules and/or cells of at least a battery 112. At least a sensor may be configured to detect failure within each battery module, for instance and without limitation, as a function of and/or using detected physical and/or electrical parameters. In one or more exemplary embodiments, battery cell failure may be characterized by a spike in temperature and at least a sensor may be configured to detect that increase in temperature and generate signals, which are discussed further below, to notify users, support personnel, safety personnel, flight crew, maintainers, operators, emergency personnel, aircraft computers, or a combination thereof. In other exemplary embodiments, at least a sensor may detect voltage and direct the charging of individual battery cells according to charge level. Detection may be performed using any suitable component, set of components, and/or mechanism for direct or indirect measurement and/or detection of voltage levels, including without limitation comparators, analog to digital converters, any form of voltmeter, or the like.

With continued reference to FIG. 1, in some embodiments, ground support equipment 104 may include one or more housings 144*a-c*. For the purposes of this disclosure, a "housing" is a physical component within which other internal components are located. In some embodiments, one or more housings 144*a-c* may be configured to protect internal components. As a non-limiting example, internal components with housing will be functional while function of housing may largely be to protect the internal components. In some embodiments, one or more housings 144*a-c* may be configured to separate internal components from other internal components. In an embodiment, GSE 104 may be sparsely placed on a surface. In another embodiment, one or more housings 104*a-c* may be placed altogether on a surface. One or more housings 144*a-c* may include a platform, moveable cart, cage, box, frame, and/or the like. In some embodiments, one or more housings 144*a-c* may be a shape of rectangle, square, circle, triangle, oval, trapezium, and/or any shape thereof. In some embodiments, one or more housings 144*a-c* may include a housing 144*a* for a battery charging module 136, a housing 144*b* for a battery charging module 132, a housing 144*c* for an aircraft conditioning module 140, and the like. In some embodiments, one or more housings 144*a-c* may include housings a-c for a plurality of battery thermal modules 124, a plurality of battery charging modules 120, and a plurality of aircraft conditioning modules 128. In some embodiments, one or more housings 144*a-c* may include a cable module 116*a-c*. The cable module 116*a-c* disclosed herein is further described below.

With continued reference to FIG. 1, in some embodiments, one or more housings 144*a-c* may include a retractable drawer. For the purposes of this disclosure, a "retractable drawer" is a door that can open and close for an access to ground support equipment. In an embodiment, the retractable drawer may include a shape of a rectangle, circle, triangle, square, or any shape thereof. In an embodiment, the retractable drawer may be on a front of the one or more housings 144*a-c*. In another embodiment, the retractable drawer may be on a side of the one or more housings 144*a-c*. In an embodiment, the retractable drawer may open and/or close by sliding the retractable drawer. In another embodiment, the retractable drawer may be opened and/or closed using a hinge mechanism. In another embodiment, the retractable drawer may be opened by pushing the retractable drawer, wherein the retractable drawer may include a spring-loaded piston. In some embodiments, one or more housings 144*a-c* may include a retractable drawer configured to cover and provide an access to a cable module 116*a-c* of a ground support module. As a non-limiting example, one or more housings 144*a-c* may include a retractable drawer for a cable module 116*a-c* of a battery charging module 136. As another non-limiting example, one or more housings may include a retractable drawer for a cable module 116*a-c* of a battery charging module 132.

Figure 2:
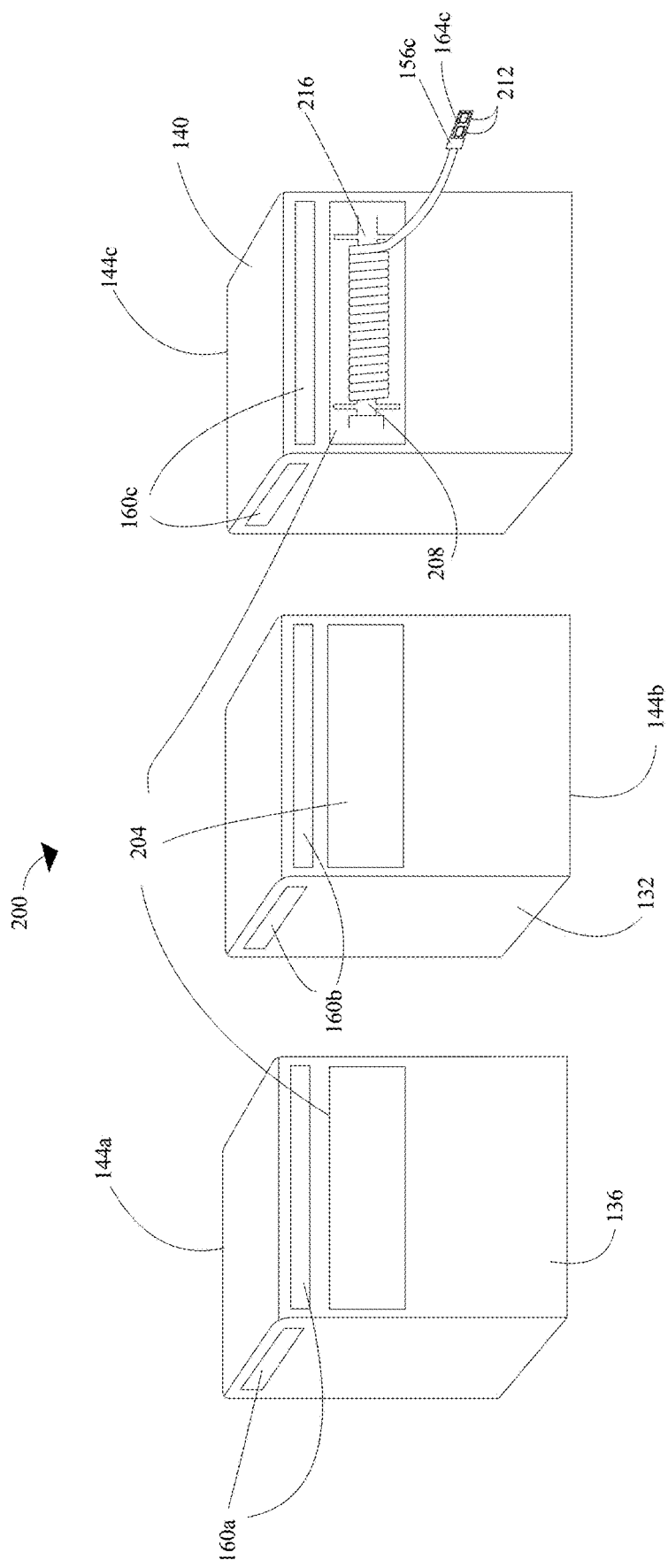
FIG. 2 is an exemplary embodiment of a ground support equipment with an indicating system for an electric aircraft.

With continued reference to FIG. 1, in some embodiments, the retractable drawer may include an indicator, wherein the indicator may include a light indicator. The light indicator of the retractable drawer may be lit up when the retractable drawer is opened. The light indicator of the retractable drawer may be turned off when the retractable drawer is closed. As a non-limiting example, a controller 152 may receive a signal from a pressure sensor of the retractable drawer, wherein the pressure sensor detected a release of pressure by opening the retractable drawer and the signal includes the release of the pressure of the retractable drawer. Then, the controller 152 may activate the light indicator to light up to indicate the retractable drawer is opened. After then, when the controller 152 receives another signal from the pressure sensor, wherein the signal includes a pressure by closing the retractable drawer, the controller 152 may control the light indicator to turn off to indicate the retractable drawer is closed. In some embodiments, the retractable drawer may include at least a sensor, wherein the at least a sensor is configured to detect a motion of the retractable drawer when it is opened and/or closed. In some embodiments, the retractable drawer may include at least a sensor. As a non-limiting example, the retractable drawer may include a pressure sensor, a motion sensor, and the like. As a non-limiting example, the at least a sensor of the retractable drawer may detect that the retractable drawer is opened and send a signal to a controller 152. Then, the controller 152 may activate a module indicator 160*a-c* mechanically connected to a ground support module. As another non-limiting example, the at least a sensor of the retractable drawer may detect that the retractable drawer is closed and send a signal to the controller 152. Then, the controller 152 may deactivate the module indicator 160*a-c* mechanically connected to a ground support module. The module indicator 160*a-c* disclosed herein is further described below. An exemplary configuration of the retractable drawer is shown in FIG. 2.

With continued reference to FIG. 1, in some embodiments, one or more housings 144a-c may include at least a module indicator 160a-c. For the purposes of this disclosure, a "module indicator" is an indicator used for a ground support module. The at least a module indicator 144a-c disclosed herein may be consistent with an indicator described below. The module indicator 160a-c may include a light indicator, a sound indicator, a vibration indicator, and the like. The light indicator, the sound indicator, the vibration indicator is further described in detail below. In some embodiments, the at least a module indicator may be mechanically connected to the one or more housings 144a-c of a ground support module. In an embodiment, the at least a module indicator 160a-c may be on a front surface of one or more housings 144a-c. In another embodiment, the at least a module indicator 160a-c may be on one or more side surfaces of the one or more housings 144a-c. In some embodiments, the at least a module indicator 160a-c may be on a top surface of the one or more housings 144a-c. In an embodiment, the at least a module indicator 160a-c may be on a top of a surface of the one or more housings 144a-c. In another embodiment, the at least a module indicator 160a-c may be on a bottom of a surface of the one or more housings 144a-c. In some embodiments, the at least a module indicator 160a-c is a shape of line, rectangle, circle, triangle, square, and the like. An exemplary configuration of the at least a module indicator 160a-c is shown in FIG. 2. In some embodiments, the at least a module indicator 160a-c may include at least a module indicator 160a-ca for a battery charging module 136, at least a module indicator 160a-cb for a battery charging module 132, at least a module indicator 160a-cc for an aircraft conditioning module 140, and the like.

With continued reference to FIG. 1, in an embodiment, at least a module indicator 160a-c may indicate a retractable drawer of one or more housings 144a-c is opened and/or closed. As a non-limiting example, a controller 152 may receive a signal from a pressure sensor of the retractable drawer, wherein the pressure sensor detected a release of pressure by opening the retractable drawer and the signal includes the release of the pressure of the retractable drawer. Then, the controller 152 may activate at least a module indicator 160a-c on one or more housings 144a-c to light up to indicate the retractable drawer is opened. After then, when the controller 152 receives another signal from the pressure sensor, wherein the signal includes a pressure by closing the retractable drawer, the controller 152 may control the at least a module indicator 160a-c to turn off to indicate the retractable drawer is closed.

With continued reference to FIG. 1, in another embodiment, at least a module indicator 160a-c may indicate a ground support module is being used. As a non-limiting example, when a flow sensor detects a coolant flow from at least a battery thermal module 136, the flow sensor may transmit a signal to a controller 152. When the controller 152 receives the signal from the flow sensor, the controller 152 may activate a module indicator 160a-ca to flash to indicate that the at least a battery thermal module 136 is activated and being used. As another non-limiting example, when the flow sensor detects no coolant flow from at least a battery thermal module 136, and the controller 152 does not receive a signal from the flow sensor, the controller 152 may activate the module indicator 160a-ca to stop flashing to indicate that the at least a battery thermal module 136 is deactivated and not being used. As another non-limiting example, when a controller 152 receives a user input from a user input device, wherein the user input includes 'start charging,' the controller 152 may activate a module indicator 160a-cb to flash lights to indicate the at least a battery charging module 132 is activated and being used. As a non-limiting example, at least a module indicator 160a-cb may light up when at least a battery charging module 132 is charging at least a battery 112 of an electric aircraft 108. As another non-limiting example, at least a module indicator 160a-ca of at least a battery charging module 136 may light up when a retractable drawer on a housing 144b is opened, then the at least a module indicator 160a-ca may flash when at least a battery charging module 136 is providing a coolant flow to the at least a battery 112. Then, the at least a module indicator 160a-ca may stop flashing but still lighting when the at least a battery charging module 136 deactivated, and the at least a module indicator 160a-ca may be turned off as the retractable drawer is closed.

With continued reference to FIG. 1, in some embodiments, at least a module indicator 160a-c may indicate any malfunction of a ground support module. As a non-limiting example, a controller 152 may receive a signal from a temperature sensor of an energy source of at least a battery charging module 132, wherein the signal includes a temperature of the energy source. When the temperature of the energy source is below an energy source temperature threshold, the controller 152 may activate a module indicator 160a-c to flash lights in red to indicate a malfunction of the at least a battery charging module 132. As another non-limiting example, a controller 152 may receive a signal from a flow sensor in at least a battery thermal module 136, wherein the signal includes an information that there is no flow inside of the at least a battery thermal module 136. Then, the controller 152 may activate the module indicator 160a-ca to indicate that there is a problem in the at least a battery thermal module 136.

For the purposes of this disclosure, "flashing" refers to a light showing one or more flashes at regular intervals. The flash pattern disclosed herein is further disclosed below. As a non-limiting example, an indicator may flash 10, 20, 25, 45, 50, and the like flashes per minute. In some embodiments, the at least a module indicator 160a-c may be activated using color pattern when the ground support module is not working properly. The color pattern disclosed herein is further described below. As a non-limiting example, at least a module indicator 160a-cb may light up in red when an energy source of the at least a battery charging module 132 has not enough power and needs to be replaced. As another non-limiting example, at least a module indicator 160a-ca may light up in red when a coolant source of the at least a battery charging module 136 may need to be replaced. As another non-limiting example, at least a module indicator 160a-c may light up in red when there is an error in a communication for booting up a pilot control system of an electric aircraft 108 using at least an aircraft conditioning module 140. In some embodiments, the at least a module indicator 160a-c may be activated with the color pattern and the flash pattern. As a non-limiting example, at least a module indicator 160a-cb may flash yellow light when the at least a battery charging module 132 is in a process of charging the at least a battery 112, then the at least a module indicator 160a-cb may flash green light when the charging is completed.

With continued reference to FIG. 1, in some embodiments, ground support equipment 104 includes a cable module 116a-c. For the purposes of this disclosure, a "cable module" is a module containing a length of cable, which is configured to support communication between mating components. As a non-limiting examples, a port of an electric aircraft 108 and ground support equipment 104 may include mating components. In some embodiments, a cable module 116*a-c* may be configured to connect the ground service equipment 104 and an electric aircraft 108. In some embodiments, a cable module 116*a-c* may be mechanically coupled to the ground support equipment 104. As a non-limiting example, the cable module 116*a-c* may be removable from the ground support equipment 104. As another non-limiting example, the cable module 116*a-c* may be permanently attached to the ground support equipment 104. In some embodiments, the cable module 116*a-c* may be inside of one or more housings 144*a-c*. As a non-limiting example, the cable module 116*a-c* may be inside of a retractable drawer, this is so when a user opens the retractable drawer, the cable module 116*a-c* can be found to be used. In some embodiments, the cable module 116*a-c* may be dangled on the one or more housings 144*a-c*. In some embodiments, GSE 104 may include one or more of cable modules 116. As a non-limiting example, GSE 104 may include a cable module 116*a-c* for each of ground support modules. For example without limitation, a cable module 116*b* for at least a battery charging module 136, a cable module 116*b* for at least a battery charging module 132, and a cable module 116*c* for at least an aircraft conditioning module 140, and the like. As another non-limiting example, GSE 104 may include one cable module 116 for a multiple ground support modules. For example without limitation, GSE 104 may include one cable module 116 for both the at least a battery charging module 136 and the at least a battery charging module 132. For another example without limitation, GSE 104 may include one cable module for the at least a battery charging module 136, the at least a battery charging module 132 and the at least an aircraft conditioning module 140. In some embodiments, the cable module 116*a-c* may be configured to mate with a port of an electric aircraft 108. As a non-limiting example, the cable module 116*a* of the at least a battery charging module 136 may mate with a thermal port 124. As another non-limiting example, the cable module 116*b* of the at least a battery charging module 132 may mate with a charging port 120. As another non-limiting example, the cable module 116*c* of the at least an aircraft conditioning module 124 may mate with an aircraft conditioning port 128. As another non-limiting example, the cable module 116 may be connected to a multi-port. Additionally without limitation, a configuration of the cable module 116*a-c* may be seen in FIG. 2-3A-B.

With continued reference to FIG. 1, in some embodiments, a cable module 116*a-c* may include a reel. For the purposes of this disclosure, a "reel" is a rotary device around which an object may be wrapped. The reel may be rotatably mounted to the cable module 116*a-c*. For the purposes of this disclosure, "rotatably mounted" means mounted such that the mounted object may rotate with respect to the object that the mounted object is mounted on. Additionally, when a cable is in a stowed configuration, the charging cable may be wound around the reel. In the stowed configuration, the cable need not be completely wound around the reel. As a non-limiting example, a portion of the cable may hang free from the reel even when cable is in the stowed configuration. The disclosure of a cable module 116*a-c* may be consistent with the disclosures of the cable reel module utilized to in U.S. Nonprovisional application Ser. No. 17/736,530 filed on May 4, 2022, and entitled "SYSTEM FOR AN ELECTRIC AIRCRAFT CHARGING WITH A CABLE REEL", the entirety of which is incorporated herein by reference.

With continued reference to FIG. 1, cable module 116*a-c* may include a rotation mechanism. A "rotation mechanism," for the purposes of this disclosure is a mechanism that is configured to cause another object to undergo rotary motion. As a non-limiting example, rotation mechanism may include a rotary actuator. As a non-limiting example, rotation mechanism may include an electric motor. As another non-limiting example, rotation mechanism may include a servomotor. As yet another non-limiting example, rotation mechanism may include a stepper motor. In some embodiments, rotation mechanism may include a compliant element. For the purposes of this disclosure, a "compliant element" is an element that creates force through elastic deformation. As a non-limiting example, rotation mechanism may include a torsional spring, wherein the torsional spring may elastically deform when a reel is rotated in, for example, the forward direction; this would cause the torsional spring to exert torque on a reel, causing a reel to rotate in a reverse direction when it has been released. Rotation mechanism may be configured to rotate a reel in a forward direction and a reverse direction. Forward direction and reverse direction are opposite directions of rotation. As a non-limiting example, the forward direction may be clockwise, whereas the reverse direction may be counterclockwise, or vice versa. As a non-limiting example, rotating in the forward direction may cause cable to extend, whereas rotating in the reverse direction may cause cable to stow, or vice versa. In some embodiments, rotation mechanism may continually rotate a reel when rotation mechanism is enabled. In some embodiments, rotation mechanism may be configured to rotate a reel by a specific number of degrees. In some embodiments, rotation mechanism may be configured to output a specific torque to a reel. As a non-limiting example, this may be the case, wherein rotation mechanism is a torque motor. Rotation mechanism may be electrically connected to an energy source.

With continued reference to FIG. 1, in some embodiments, ground support equipment 104 may pay in or pay out of a cable module 116*a-c*. As used in this disclosure, "paying out" a cable module is increasing a free length of a cable, i.e., increasing slack in the cable. As used in this disclosure, a "free length of cable" is a length of cable that is external to a housing of the cable module. In some cases, paying out cable may actually move a free end of a cable module 116*a-c*, for example if the cable is sufficiently rigid. Alternatively or additionally, paying out a cable module 116*a-c* may increase a usable length of a cable. Paying out may be referred to in this disclosure as unspooling, without necessarily limiting a meaning of the term, for example to a device having a spool of cable. Paying out may also be referred to in this disclosure as extending. Conversely, as used in this disclosure, "paying in" a cable module refers to decreasing a free length of a cable, i.e., decreasing slack in the cable. In some cases, paying in a cable module 116*a-c* may retract a free end toward a housing and/or reel. Alternatively or additionally, paying in a cable module 116*a-c* may just decrease a usable length of a cable. Paying in may be referred to in this disclosure as unspooling, without necessarily limiting a meaning of the term, for example to a device having a spool of cable.

With continued reference to FIG. 1, in some embodiments, a cable module 116*a-c* may include a proximal end. For the purposes of this disclosure, a "proximal end" is an end of a cord that is configured to be connected with a ground support module. As a non-limiting example, the proximal end may be mechanically connected to a battery charging module 136, battery charging module 132, and an aircraft conditioning module 140. The proximal end may be removable from the ground support module. The proximal end may be permanently attached to the ground support module. In some embodiments, the proximal end may include a connector indicator 164a-c. The connector indicator 164a-c disclosed herein is further described in detail below.

With continued reference to FIG. 1, in some embodiments, a cable module 116a-c may include a cable. For the purposes of this disclosure, a "cable" is a cable part of a cord that is configured to transmit communication between a connector of a cable module and a proximal end of the cable module. In some embodiments, a cable may include a feeder. A feeder may have a connector located substantially at the cable. A "feeder," as used in this disclosure, is a component that facilitates conduction. As used in this disclosure, "conduction" is a process by which one or more of heat and/or electricity is transmitted through a substance, for example when there is a difference of effort (i.e., temperature or electrical potential) between adjoining regions. In some cases, the feeder may be configured to charge and/or recharge an electric vehicle. For instance, the feeder may be configured to facilitate a specified amount of electrical power, current, or current type. For example, the feeder may include a direct current conductor. As used in this disclosure, a "direct current conductor" is a conductor configured to carry a direct current. As used in this disclosure, "direct current" is one-directional flow of electric charge. In some cases, the feeder may include an alternating current conductor. As used in this disclosure, an "alternating current conductor" is a conductor configured to carry an alternating current. As used in this disclosure, an "alternating current" is a flow of electric charge that periodically reverses direction; in some cases, an alternating current may change its magnitude continuously with in time (e.g., sine wave). In some instances, the terminology "conductor" may be used in place of a feeder in this disclosure. A feeder disclosed herein may be consistent with a conductor disclosed in U.S. patent application Ser. No. 17/405,840 entitled "CONNECTOR AND METHODS OF USE FOR CHARGING AN ELECTRIC VEHICLE," which is incorporated in its entirety herein by reference.

With continued reference to FIG. 1, in some embodiments, a feeder may include an electrical conductor, for example a wire and/or cable. Exemplary conductor materials include metals, such as without limitation copper, nickel, steel, and the like. in some embodiments, a feeder may additionally include an isolation monitor conductor configured to conduct an isolation monitoring signal. In some cases, power systems, for example electric vehicle batteries, must remain electrically isolated from communication, control, and/or sensor signals. As used in this disclosure, "isolation" is a state where substantially no communication of a certain type is possible between two components, for example electrical isolation refers to elements which are not in electrical communication. Often signal carrying conductors and components (e.g., sensors) may need to be in relatively close proximity with power systems and/or power carrying conductors. For instance, battery sensors which sense characteristics of batteries, for example batteries within an electric aircraft 108, are often by virtue of their function placed in close proximity with a battery. A battery sensor that measures battery charge and communicates a signal associated with battery charge back to controller may be at risk of becoming not isolated from the battery. In some cases, an isolation monitoring signal will indicate isolation of one or more components. In some cases, an isolation monitoring signal may be generated by an isolation monitoring sensor. Isolation monitoring sensor may include any sensor described in this disclosure, such as without limitation a multi-meter, an impedance meter, and/or a continuity meter. In some cases, isolation from an electrical power may be required for a housing of a cable and a ground. Isolation monitoring signal may, in some cases, communication information about isolation between an electrical power and ground, for example along a flow path that includes a cable.

With continued reference to FIG. 1, in some embodiments, a feeder may include a ground conductor. As used in this disclosure, a "ground conductor" is a conductor configured to be in electrical communication with a ground. As used in this disclosure, a "ground" is a reference point in an electrical circuit, a common return path for electric current, or a direct physical connection to the earth. Ground may include an absolute ground such as earth or ground may include a relative (or reference) ground, for example in a floating configuration.

With continued reference to FIG. 1, cable may include a coolant tube. A coolant tube may have a connector located substantially at the cable. As used in this disclosure, a "coolant tube" is a component that is substantially impermeable to a coolant and contains and/or directs a coolant flow. As used in this disclosure, a "flow of coolant" is a stream of coolant. In some cases, coolant may include a fluid and coolant flow is a fluid flow. The coolant tube may be in fluidic communication with a coolant source. As used in this disclosure, a "coolant source" is an origin, generator, reservoir, or flow producer of coolant. In some cases, a coolant source may include a flow producer, such as a fan and/or a pump. Coolant source may include any of following non-limiting examples, air conditioner, refrigerator, heat exchanger, pump, fan, expansion valve, and the like. In some cases, a coolant source may be ground support equipment 104. In some embodiments, a coolant tube may be further configured to transfer heat between coolant, for example coolant belonging to coolant flow, and an ambient air.

With continued reference to FIG. 1, in some embodiments, a cable may additionally include a coolant tube being located proximal or otherwise in thermal communication with one or more feeders, for example direct current conductor and/or alternating current conductor. In some cases, heat generated within one or more feeders may be transferred into coolant within the coolant tube. In some cases, the coolant tube may be arranged substantially coaxial with one or more feeders, such that coolant flows substantially parallel with an axis of the one or more feeders. Alternatively or additionally, in some cases, the coolant tube may be arranged in cross flow with one or more feeders. In some cases, apparatus 100 may include a heat exchange configured to extract heat from one or more feeders, for example at a location of high current and/or high impedance (e.g., resistance) within feeder. In some cases, generated heat within a feeder may be proportional to current within feeder squared. Heating within a feeder may be understood according to Joule heating, also referred to in this disclosure as resistive, resistance, or Ohmic heating. Joule-Lenz law states that power of heat generated by a feeder is proportional to a product of feeder resistance and a square of current within the feeder, see below.

$$P \propto I^2 R$$

where P is power of heat generated, for example in Watts, I is electric current within a feeder, for example in Amps, and R is resistance of a feeder, for example in Ohms. In some cases, coolant flow may be configured to provide a cooling load that is sufficient to cool a feeder and one or more electric aircraft batteries during charging.

With continued reference to FIG. 1, in some embodiments, a cable module 116a-c may include a connector 156a-c. For the purposes of this disclosure, a "connector" is a component which is configured to interface with a port of an electric aircraft. In some embodiments, the connector 156a-c may include a proximity sensor. Proximity sensor may be electrically communicative with a proximity signal conductor. Proximity sensor may be configured to generate a proximity signal as a function of connection between a connector 156a-c and a port. As used in this disclosure, a "proximity sensor" is a sensor that is configured to detect at least a phenomenon related to a connector 156a-c of a cable module being mated to a port of an electric aircraft. Proximity sensor may include any sensor described in this disclosure, including without limitation a switch, a capacitive sensor, a capacitive displacement sensor, a doppler effect sensor, an inductive sensor, a magnetic sensor, an optical sensor (such as without limitation a photoelectric sensor, a photocell, a laser rangefinder, a passive charge-coupled device, a passive thermal infrared sensor, and the like), a radar sensor, a reflection sensor, a sonar sensor, an ultrasonic sensor, fiber optics sensor, a Hall effect sensor, and the like. In some embodiments, a connector 156a-c may include a proximity signal conductor. As used in this disclosure, an "proximity signal conductor" is a conductor configured to carry a proximity signal. As used in this disclosure, a "proximity signal" is a signal that is indicative of information about a location of connector 156a-c. Proximity signal may be indicative of attachment of a connector 156a-c with a port. In some cases, a proximity signal may include an analog signal, a digital signal, an electrical signal, an optical signal, a fluidic signal, or the like. In some cases, a proximity signal conductor may be configured to conduct a proximity signal indicative of attachment between a connector 156a-c and a port. In some embodiments, the proximity sensor may be configured to use near-field communication (NFC). For the purposes of this disclosure, "near-field communication" is a set of communication protocols that enables communication between two electronic devices over a set distance. In some embodiments, the near-field communication may enable communication between two electronic devices over a distance of 4 cm (1½ in) or less. As a non-limiting example, the proximity sensor of a connector 156a-c may use NFC to detect if a port is within the set distance.

With continued reference to FIG. 1, in some embodiments, a connector 156a-c may include a fastener. As used in this disclosure, a "fastener" is a physical component that is designed and/or configured to attach or fasten two (or more) components together. A connector 156a-c may include one or more attachment components or mechanisms, for example without limitation fasteners, threads, snaps, canted coil springs, and the like. In some cases, a connector 156a-c may be connected to a port by way of one or more press fasteners. As used in this disclosure, a "press fastener" is a fastener that couples a first surface to a second surface when the two surfaces are pressed together. Some press fasteners include elements on the first surface that interlock with elements on the second surface; such fasteners include without limitation hook-and-loop fasteners such as VELCRO fasteners produced by Velcro Industries B.V. Limited Liability Company of Curacao Netherlands, and fasteners held together by a plurality of flanged or "mushroom"-shaped elements, such as 3M DUAL LOCK fasteners manufactured by 3M Company of Saint Paul, Minnesota. Press-fastener may also include adhesives, including reusable gel adhesives, GECKSKIN adhesives developed by the University of Massachusetts in Amherst, of Amherst, Massachusetts, or other reusable adhesives. Where press-fastener includes an adhesive, the adhesive may be entirely located on the first surface of the press-fastener or on the second surface of the press-fastener, allowing any surface that can adhere to the adhesive to serve as the corresponding surface. In some cases, a connector 156a-c may be connected to port by way of magnetic force. For example, a connector 156a-c may include one or more magnetic, a ferro-magnetic material, and/or an electromagnet. Fastener may be configured to provide removable attachment between a connector 156a-c and a port. As used in this disclosure, "removable attachment" is an attributive term that refers to an attribute of one or more relata to be attached to and subsequently detached from another relata; removable attachment is a relation that is contrary to permanent attachment wherein two or more relata may be attached without any means for future detachment. Exemplary non-limiting methods of permanent attachment include certain uses of adhesives, glues, nails, engineering interference (i.e., press) fits, and the like. In some cases, detachment of two or more relata permanently attached may result in breakage of one or more of the two or more relata. A connector 156a-c disclosed herein may be consistent with a connector 156a-c housing disclosed in U.S. patent application Ser. No. 17/405,840 entitled "CONNECTOR AND METHODS OF USE FOR CHARGING AN ELECTRIC VEHICLE," which is incorporated in its entirety herein by reference. Additionally, a connector 156a-c disclosed herein may be consistent with a casing disclosed in U.S. patent application Ser. No. 17/752,248, filed on May 24, 2022, entitled "GROUND SERVICE SYSTEMS AND DEVICES FOR AN ELECTRIC AIRCRAFT,", which is incorporated in its entirety herein by reference.

With continued reference to FIG. 1, in some embodiments, a connector 156a-c may include a user input device. The user input device disclosed herein is further described below. In some embodiments, the user input device of the connector 156a-c may include a button, a switch, a toggle, and the like. An exemplary configuration of the user input device of a cable module 116a-c is shown in FIG. 2. As a non-limiting example, the connector 156a-c may include one button for paying in the cable module 116a-c and another button for paying out the cable module 116a-c. As a non-limiting example, the connector 156a-c may include a button for activating and/or deactivating a ground support module. For example without limitation, a button of a connector 156b may be pushed to start charging at least a battery 112 of an electric aircraft 108 by at least a battery charging module 132. In some embodiments, the user input device of the connector 156a-c may receive a user input and transmit the user input to a controller 152. The controller 152 disclosed herein is further described below.

Figure 3A:
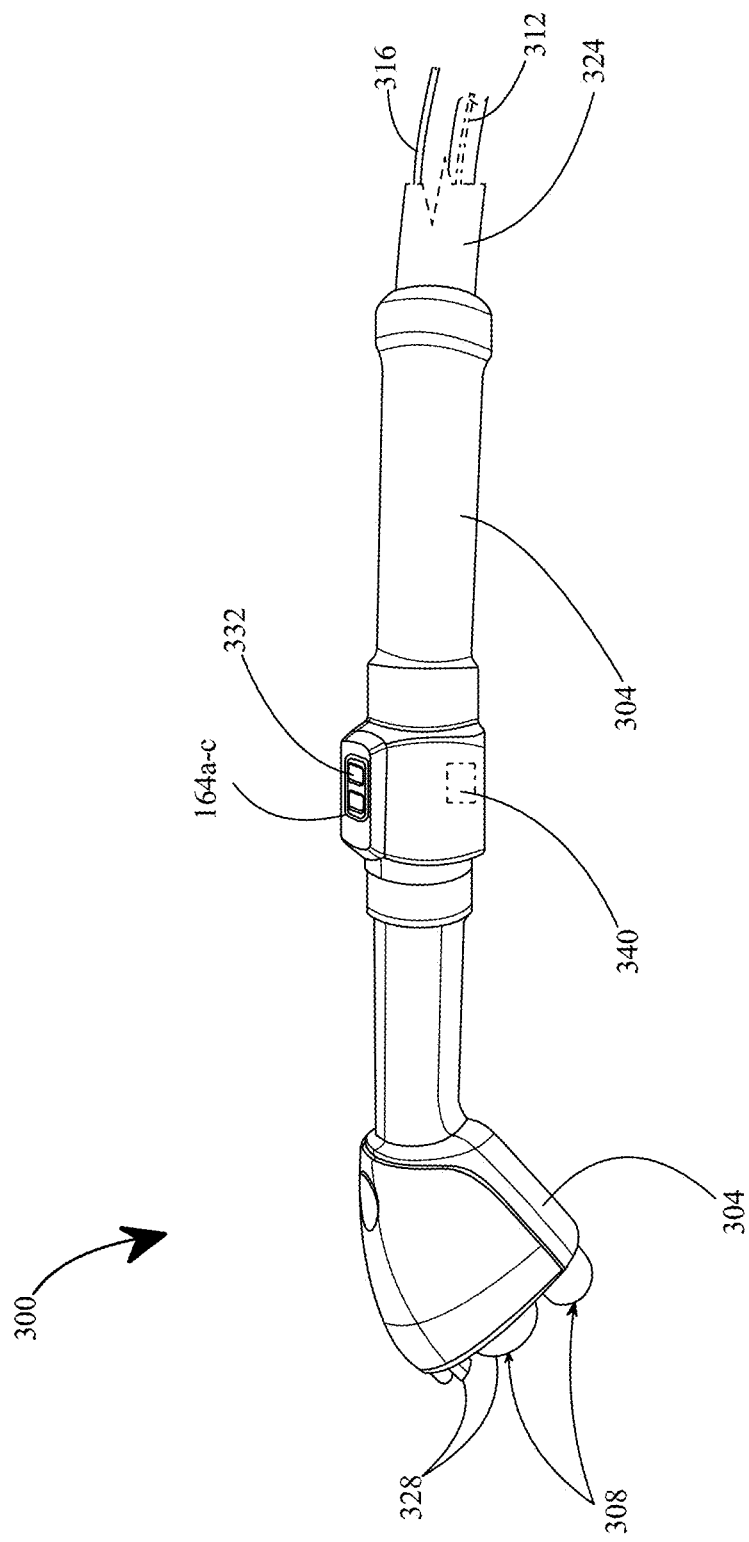
FIGS. 3A and 3B are exemplary schematics of an exemplary embodiment of a charging connector in accordance with one or more embodiments of the present disclosure.

With continued reference to FIG. 1, in some embodiments, a cable module 116a-c may include a connector indicator 164a-c. For the purposes of this disclosure, a "connector indicator" is an indicator used on a cable module. As a non-limiting example, a connector 156a-c of the cable module 116a-c may include the connector indicator 164a-c. In some embodiments, the connector indicator 164a-c may light up using a flash pattern. In some embodiments, the connector indicator 164a-c may light up using a color pattern. In some embodiments, the connector indicator 164a-c may light up using both the flash pattern and the color pattern. The connector indicator 164a-c may include a light indicator, a sound indicator, a vibration indicator, and the like. The light indicator, the sound indicator, the vibration indicator is further described in detail below. The connector indicator 164a-c disclosed herein may be consistent with an indicator described below. In some embodiments, a connector indicator 164a-c may surround a user input device of a connector 156a-c of a cable module 116a-c. This is so, the connector indicator 164a-c may indicate a user input of the user input device. As a non-limiting example, the connector indicator 164a-c that is around the user input device of the connector 156a-c may flash, when the user input device received the user input. As a non-limiting example, a controller 152 may receive a user input from a user input of the connector 156a-c. Then, the controller 152 may activate a connector indicator 164a-c that surrounds the user input device to indicate that the user input was input from the user input device. An exemplary configuration of a connector indicator 164a-c is shown in FIG. 2-3A.

With continued reference to FIG. 1, in an embodiment, the connector indicator 164a-c may be configured to indicate an attachment condition of the connector 156a-c. As a non-limiting example, the connector indicator 164a-c of the connector 156a-c of the cable module 116a-c may indicate a port of an electric aircraft 108 and the connector 156a-c of the cable module 116a-c are successfully mated and/or not successfully mated. For example, without limitation, a connector indicator 164a of a cable module 116a of at least a battery charging module 136 may light up when a connector 156a of the cable module 116a is successfully mated with a thermal port 124 of an electric aircraft 108.

With continued reference to FIG. 1, in another embodiment, the connector indicator 164a-c may be configured to indicate the cable module 116a-c is paying in. In another embodiment, the connector indicator 164a-c may be configured to indicate the cable module 116a-c is paying out. As a non-limiting example, a connector indicator 164a-c of a cable module 116a-c may flash when the cable module 116a-c is paying in. As another non-limiting example, a connector indicator 164a-c of a cable module 116a-c may flash when the cable module 116a-c is paying out. As another non-limiting example, a controller 152 may receive a user input from a user input of the connector 156a-c, wherein the user input device is a button to pay out the cable module 116a-c and the user input includes 'paying out the cable module.' Then, the controller 152 may control a reel of a cable module 116a-c and simultaneously activate a connector indicator 164a-c that surrounds the button to light up with light animation and a flash pattern to indicate that the cable module 116a-c is paying out. As another non-limiting example, when the controller 152 receives a user input from a user input device when a user pushed a button to pay in a cable module 116a-c, the controller 152 may activate a connector indicator 164a-c to flash to indicate that the cable module 116a-c is paying in.

With continued reference to FIG. 1, in some embodiments, a connector indicator 164a-c of the connector 156a-c of the cable module 116a-c may indicate that the cable module 116a-c is fully extended. As a non-limiting example, a connector indicator 164a-c of a cable module 116a-c may flash in red when the cable module 116a-c is fully extended. As another non-limiting example, a controller 152 may receive a signal from a motion sensor on a reel of the cable module 116a-c where a proximal end of the cable module 116a-c is located. When the controller 152 receives the signal that may include the movement of the proximal end of the cable module 116a-c on the reel, the controller 152 may activate a connector indicator 164a-c of the cable module 116a-c to flash in red and make a warning sound to indicate that the cable module 116a-c is fully extended.

With continued reference to FIG. 1, in some embodiments, a connector indicator 164a-c may be configured to indicate the ground support module is communicating with an electric aircraft through a port. As a non-limiting example, the connector indicator 164a-c may light up to indicate that at least a battery charging module 132 is charging at least a battery 112 of an electric aircraft 108. As another non-limiting example, a controller 152 may receive a signal from a battery current sensor communicatively connected to at least a battery 112 of an electric aircraft 108, wherein the signal may include a flow of current flowing int the at least a battery 112. Then, the controller 152 may activate the connector indicator 164a-c to flash in orange that the at least a battery is getting charged. As another non-limiting example, a controller 152 may receive a user input from a user input device, wherein the user input may include 'start booting a pilot control system.' Then, the controller 152 may activate at least an aircraft conditioning module 140 and simultaneously activate a connector indicator 164a-c to flash lights to indicate that the at least an aircraft conditioning module 140 is activated and being used. As another non-limiting example, when the controller 152 receives a user input from a user input device when a user pushed a button to start charging at least a battery 112 of an electric aircraft 108, the controller 152 may activate the connector indicator 164a-c to flash in yellow to indicate that at least a battery charging module 132 is charging the at least a battery 112.

With continued reference to FIG. 1, in some embodiments, a connector indicator 164a-c may indicate that a communication between the ground support module and the electric aircraft 108 is completed. As a non-limiting example, the connector indicator 164a-c of the connector 156a-c of the cable module 116a-c may indicate at least a battery 112 of an electric aircraft is fully charged. As another non-limiting example, a controller 152 may receive a signal from a battery current sensor communicatively connected to at least a battery 112 of an electric aircraft 108, wherein the signal may include a signal that the at least a battery 112 is fully charged. Then, the controller 152 may deactivate at least a battery charging module 132 and activate the connector indicator 164a-c to light up in green to indicate that the at least a battery is fully charged. As another non-limiting example, a controller 152 may receive a user input from a user input device, wherein the user input may include 'stop charging the battery.' Then, the controller 152 may deactivate the at least a battery charging module 132 and simultaneously activate the connector indicator 164a-c to flash lights to indicate that communication between the electric aircraft 108 and the ground service equipment 104 is completed.

With continued reference to FIG. 1, in some embodiments, a connector indicator 164a-c of the connector 156a-c of the cable module 116a-c may indicate the connector 156a-c of the cable module 116a-c is ready to be extracted from the port. As a non-limiting example, when there is no communication between the ground support module and the electric aircraft 108, the connector indicator 164a-c may flash in green to indicate the connector 156a-c is ready to be extracted from the port. As another non-limiting example, when a flow sensor detects a coolant flow from at least a battery thermal module 136, the flow sensor may transmit a signal to a controller 152. When the controller 152 receives the signal from the flow sensor, the controller 152 may activate a connector indicator 164a-c to flash in red to indicate that the port and the connector 156a-c of the cable module 116a-c are not ready to be detached.

With continued reference to FIG. 1, in some embodiments, ground support equipment 104 may include a user input device. For the purposes of this disclosure, a "user input device" is any device that a user inputs a user input. As a non-limiting example, the user input device may include a button, switch, toggle, slide, touch screen, flight controller, and the like. The flight controller disclosed herein is further described with respect to FIG. 8 In some embodiments, the flight controller may employ wired and/or wireless communication. In some embodiments, one or more housings 144 of ground support module may include the user input device. In some embodiments, a cable module 116 may include the user input device. Additionally without limitation, user input device may include any other element that enables a user to control an indicator. For the purposes of this disclosure, "user input" is any input from a user. As a non-limiting example, a user may input the user input to a user input device by pushing a button, controlling a switch, touching a touch screen, controlling a toggle, sliding a slider, inputting data into a flight controller, selecting options on a display, entering input on a keypad, voice commands, and the like. As another non-limiting example, the user input may include 'start pumping a coolant,' 'stop pumping a coolant,' 'start preconditioning,' 'stop preconditioning,' 'start pumping a coolant out,' 'stop pumping a coolant out,' 'start charging,' 'stop charging,' 'start paying out a cable module 116a-c,' 'stop paying out a cable module 116a-c,' 'start paying in a cable module 116a-c,' 'stop paying in a cable module 116a-c,' 'start conditioning an aircraft,' 'stop conditioning an aircraft,' and the like. This may include, as non-limiting examples, and the like. Additionally without limitation, the user input device disclosed herein may be consistent with a user input device found in U.S. patent application Ser. No. 18/120,257, filed on Mar. 10, 2023, and entitled "A SYSTEM AND A METHOD FOR PRECONDITIONING A POWER SOURCE OF AN ELECTRIC AIRCRAFT,", which are incorporated in their entirety herein by reference.

With continued reference to FIG. 1, in some embodiments, ground support equipment 104 includes an indicator. For the purposes of this disclosure, an "indicator" is an auxiliary element that indicates any aspect of an electric aircraft and/or ground support equipment. In an embodiment, an indicator may be mechanically coupled on a surface of a device. As a non-limiting example, the indicator may be mechanically connected on a surface of a connector 156a-c of a cable module 116a-c, a surface of one or more housings 144a-c, a port of an electric aircraft 108, and the like. In another embodiment, the indicator may be embedded in a device. As a non-limiting example, the indicator may be embedded in a connector 156a-c of a cable module 116a-c, one or more housings 144a-c, a port of an electric aircraft 108, and the like.

With continued reference to FIG. 1, in an embodiment, an indicator may indicate any aspect of an electric aircraft 108's operation, function, malfunction, emergency, and/or the like. As a non-limiting example, an indicator may indicate an electric aircraft 108 is being charged. As another non-limiting example, an indicator may indicate at least a battery 112 of an electric aircraft 108 needs to be charged. As another non-limiting example, an indicator may indicate the at least a battery 112 of the electric aircraft 108 is heated and needs to be cooled. As another non-limiting example, a controller 152 may receive a signal from a temperature sensor, wherein the signal may include a temperature of at least a battery. Then, the controller 152 may compare the temperature of the at least a battery 112 with an optimal temperature. If the temperature of the at least a battery 112 is lower than the optimal temperature, the controller 152 may activate an indicator to light in red to indicate the at least a battery 112 needs to be heated. If the temperature of the at least a battery 112 is higher than the optimal temperature, the controller 152 may activate the indicator to light in green to indicate the at least a battery 112 needs to be cooled. As another non-limiting example, an indicator may indicate a signal from at least a sensor in the electric aircraft 108 is transmitting to a controller 152. As another non-limiting example, an indicator may indicate an electronic system of the electric aircraft 108 is updating. As another non-limiting example, an indicator may indicate the electronic system needs to be updated. In some embodiments, an indicator may include a port indicator 148a-c, at least a module indicator 160a-c, a connector indicator 164a-c, and the like. The port indicator 148a-c, the module indicator 160a-c, and the connector indicator 164a-c disclosed herein are further described above. Additional examples of how the controller 152 activate the indicator is further described in detail above.

With continued reference to FIG. 1, in another embodiment, an indicator may indicate any aspect of ground support equipment 104's operation, function, malfunction, emergency, and/or the like. As a non-limiting example, an indicator may indicate that a retractable drawer of one or more housings 144a-c is opened. As another non-limiting example, an indicator may indicate that a ground support module is being used. As another non-limiting example, an indicator may indicate that a cable module 116a-c is being used. As another non-limiting example, an indicator may indicate that an attachment condition of a port of an electric aircraft 108 and a cable module 116a-c is poor. As another non-limiting example, an indicator may indicate that an energy source of a battery charging module 132 needs to be checked. As another non-limiting example, an indicator may indicate that a coolant source of a battery charging module 136 needs to be checked. As another non-limiting example, an indicator may indicate that a cable module 116a-c is fully extended. As another non-limiting example, an indicator may indicate that a cable module 116a-c is transmitting communication between an electric aircraft 108 and a ground support module. As another non-limiting example, an indicator may indicate ground support equipment 104 failed to communicate with an electric aircraft 108. Additional examples of how the controller 152 activates the indicator are further described in detail above.

With continued reference to FIG. 1, in an embodiment, an indicator may include a light indicator. For the purposes of this disclosure, a "light indicator" is an indicator that indicates a use of a device using light. In some embodiments, the light indicator may include light emitting diodes (LED), incandescent lights, liquid crystal display (LCD) screen, neon lamp, and the like. A size of the light indicator may vary. In some embodiments, the light indicator may include a plurality of light indicators. In some embodiments, the light indicator may include a flash pattern. For the purposes of this disclosure, a "flash pattern" is a pattern of flashing. In an embodiment, flash pattern may include a rate of flashing. As a non-limiting example, the flash pattern may include 10, 20, 25, 45, 50 flashes per minute, and the like. In another embodiment, flash pattern may include a light animation. For the purposes of this disclosure, "light animation" refers to a method by which still lights are manipulated to appear as they are moving. As a non-limiting example, the light animation may show that the light indicators are pointing at a certain direction. As another limiting example, the light animation may show that the light indicators circling around a user input device. In some embodiments, the light indicator may include a color pattern. The light animation disclosed herein is further described in detail below. For the purposes of this disclosure, a "color pattern" is a type of lighting effect using a color. As a non-limiting example, the plurality of colors may include red, purple, green, black, blue, orange, yellow, white, and/or any combination thereof. As a non-limiting example, the light indicator of a port indicator 148 may flash in red to indicate that an attachment condition of a port and a cable module 116a-c is poor. As another non-limiting example, the light indicator of the port indicator 148 may flash in green to indicate that an attachment condition of the port and the cable module 116a-c is good. As another non-limiting example, the light indicator of at least a module indicator 160a-c may flash in yellow when a retractable drawer of one or more housings 144a-c is opened.

With continued reference to FIG. 1, in another embodiment, an indicator may include a sound indicator. For the purposes of this disclosure, a "sound indicator" is an indicator that indicates a use of a device using sound. In an embodiment, the sound may be indicative sound. For the purposes of this disclosure, "indicative sound" refers to any sound that is configured to indicate information to a user. As a non-limiting example, indicative sound may indicate that a port and a cable module 116a-c are mated. As another non-limiting example, indicative sound may indicate that a cable module 116a-c is being extended. As another non-limiting example, indicative sound may indicate that a battery charging module 132 is being used. As another non-limiting example, indicative sound may indicate that at least a battery 112 of an electric aircraft 108 is being charged. As another non-limiting example, indicative sound may indicate that a retractable drawer of one or more housings is opened and/or closed. In another embodiment, the sound may be warning sound. For the purposes of this disclosure, "warning sound" refers to any sound that is configured to warn a user. As a non-limiting example, warning sound may warn that the at least a battery 112 is overly heated. As another non-limiting example, warning sound may warn that a cable module 116a-c is fully extended and cannot be extended further. In some embodiments, a sound indicator may include a sound pattern. For the purposes of this disclosure, a "sound pattern" is any type of arrangement of making a sound. As a non-limiting example, a sound indicator may repeat a sound twice in one second.

With continued reference to FIG. 1, in another embodiment, an indicator may include a vibration indicator. For the purposes of this disclosure, a "vibration indicator" is an indicator that indicates a use of a device using vibration. For the purposes of this disclosure, "vibration" is an oscillation about an equilibrium point of an object. As a non-limiting example, a vibration indicator may vibrate when a cable module 116a-c is fully extended. As another non-limiting example, a vibration indicator may vibrate when the at least a battery 112 is fully charged. As another non-limiting example, a vibration indicator may vibrate when a cable module 116a-c is ready to be retracted from a port of an electric aircraft 108. In some embodiments, a vibration indicator may include a vibration pattern. For the purposes of this disclosure, a "vibration pattern" refers a rate of vibration. As a non-limiting example, a vibration indicator may repeat vibration two times in one second.

With continued reference to FIG. 1, a ground support equipment 104 includes a controller 152. Controller 152 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Controller 152 may include a single computing device operating independently, or may include two or more computing device operating in concert, in parallel, sequentially or the like; two or more computing devices may be included together in a single computing device or in two or more computing devices. Controller 152 may interface or communicate with one or more additional devices as described below in further detail via a network interface device. Network interface device may be utilized for connecting controller 152 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Controller 152 may include but is not limited to, for example, a computing device or cluster of computing devices in a first location and a second computing device or cluster of computing devices in a second location. Controller 152 may include one or more computing devices dedicated to data storage, security, distribution of traffic for load balancing, and the like. Controller 152 may distribute one or more computing tasks as described below across a plurality of computing devices of computing device, which may operate in parallel, in series, redundantly, or in any other manner used for distribution of tasks or memory between computing devices. Controller 152 may be implemented using a "shared nothing" architecture in which data is cached at the worker, in an embodiment, this may enable scalability of apparatus 100 and/or computing device.

With continued reference to FIG. 1, controller 152 may be designed and/or configured to perform any method, method step, or sequence of method steps in any embodiment described in this disclosure, in any order and with any degree of repetition. For instance, controller 152 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. controller 152 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, in some embodiments, a controller 152 may be configured to receive a signal from at least a sensor. As a non-limiting example, the at least a sensor may include at least a sensor of at least a battery 112, at least a sensor of a ground support module, at least a sensor of a cable module 116a-c, at least a sensor of an electric aircraft 108, and the like. The signal may be further described above. The controller 152 may be further configured to, without limitation, perform preprocessing, lexical analysis, parsing, semantic analysis of the signal, and the like. In some embodiments, a controller 152 may be further configured to control an indicator as a function of a signal from at least a sensor. In some embodiments, the controller 152 may control the indicator to flash, make a sound, vibrate, and/or the like, upon receiving the signal from the at least a sensor. In some embodiments, the controller 152 may control the indicator to stop flashing, making a sound, vibrating, and/or the like, upon receiving the signal from the at least a sensor. In some embodiments, a controller 152 may be configured to receive a user input from a user input device. In some embodiments, a controller 152 may be configured to control an indicator as a function of the user input. Additionally, a various functions of the controller 152 may be further described in detail above. In some embodiments, the controller 152 may control a reel of the cable module 116a-c as a function of the user input from the user input device of the cable module 116a-c. In some embodiments, the controller 152 may control a ground support module as a function of the user input from the user input device of the cable module 116a-c.

With continued reference to FIG. 1, in some embodiments, a controller 152 may be further configured to control one or more electrical charging current and coolant flow as a function of signal. For example, controller 152 may control coolant source as a function of signal. In some cases, signal may be representative of battery temperature. In some cases, signal may represent battery cell swell. In some cases, signal may be representative of temperature of at least a battery 112, for example temperature of one or more battery cells within at least a battery 112. In some embodiments, a controller 152 may be configured to control at least a parameter of the electrical charging current. For example, in some cases, the controller 152 may control one or more of current (Amps), potential (Volts), and/or power (Watts) of electrical charging current by way of control signal. In some cases, the controller 152 may be configured to selectively engage electrical charging current, for example ON or OFF.

With continued reference to FIG. 1, in some embodiments, a controller 152 may be further configured to control a temperature of coolant. For instance, in some cases, a sensor may be located within thermal communication with coolant, such that sensor is able to detect, measure, or otherwise quantify temperature of coolant within a certain acceptable level of precision. In some cases, sensor may include a thermometer. Exemplary thermometers include without limitation, pyrometers, infrared non-contacting thermometers, thermistors, thermocouples, and the like. In some cases, thermometer may transduce coolant temperature to a coolant temperature signal and transmit the coolant temperature signal to controller. Controller 152 may receive signal and control heat transfer between ambient air and coolant as a function of signal. Controller 152 may use any control method and/or algorithm used in this disclosure to control heat transfer, including without limitation proportional control, proportional-integral control, proportional-integral-derivative control, and the like. In some cases, controller 152 may be further configured to control temperature of coolant within a temperature range below an ambient air temperature. As used in this disclosure, an "ambient air temperature" is temperature of an ambient air. An exemplary non-limiting temperature range below ambient air temperature is about −5° C. to about −30° C. Additionally, controller 152 disclosed herein may be consistent with a computing device described with respect to FIG. 11.

Now referring to FIG. 2, an exemplary embodiment of a ground support equipment 200 with an indicating system for an electric aircraft is shown. The ground support equipment 200 disclosed herein may be consistent with ground support equipment 104. The ground support equipment 200 may include a ground support module. As a non-limiting example, the ground support equipment 200 may include a battery charging module 132, a battery thermal module 136, an aircraft conditioning module 140, and the like. In some embodiments, the ground support equipment 200 may include a housing 144a-c. As a non-limiting example, the ground support equipment 200 may include a housing 144a for the battery thermal module 136, a housing 144b for the battery charging module 132, a housing 144c for the aircraft conditioning module 140, and the like. In some embodiments, the housing 144a-c may include an indicator, wherein the indicator may include a module indicator 160a-c. In some embodiments, the housing 144a-c may include a retractable drawer 204. The retractable drawer 204 disclosed herein is further described in detail with respect to FIG. 1. In some embodiments, ground support equipment 200 may include a cable module 116a-c. In some embodiments, the cable module 116a-c may include a proximal end 208. In some embodiments, the cable module 116a-c may include a connector 156a-c. In some embodiments, the connector 156a-c may include a user input device 212. The user input device 212 disclosed herein is further described in detail with respect to FIG. 1. In some embodiments, the connector may include a connector indicator 164a-c. In some embodiments, the cable module 116a-c may include a reel 216. The reel 216 disclosed herein is further described in detail with respect to FIG. 1.

Figure 3B:
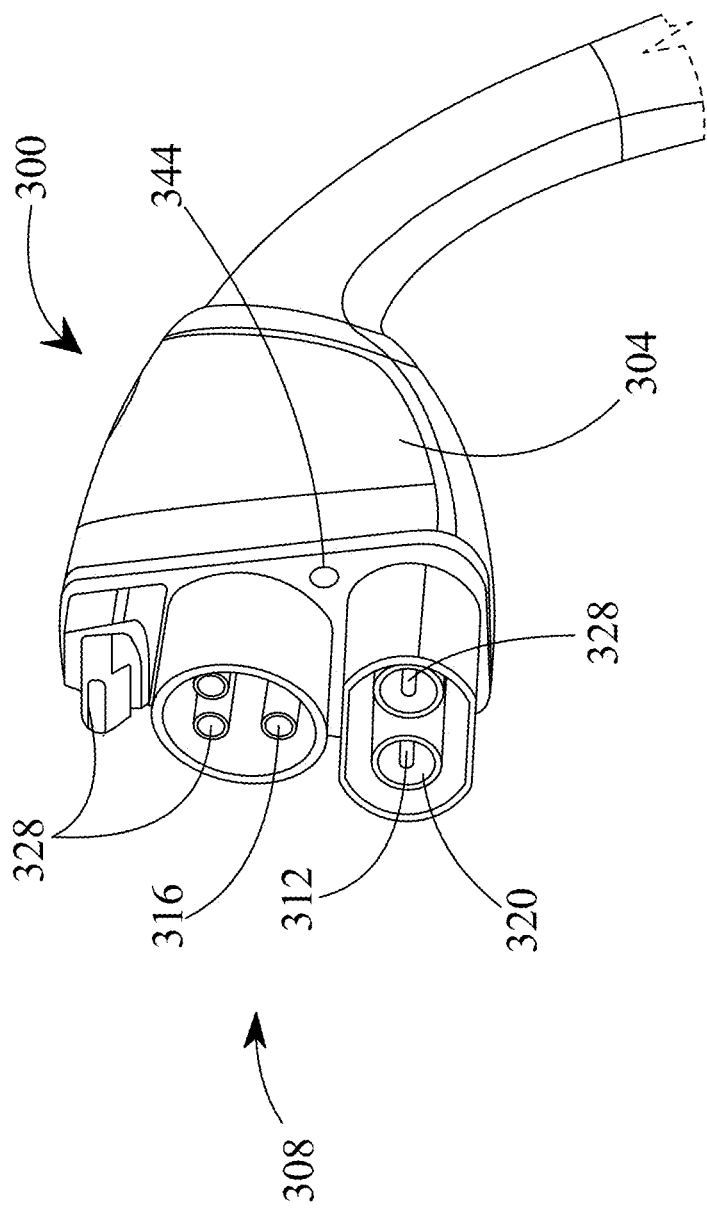

Now referring to FIGS. 3A and 3B, an exemplary embodiment of a charging connector 100 is illustrated. As shown in FIG. 3A, charging connector 300 (also referred to herein as a "connector") facilitates transfer of electrical power between a power source of a charging station and an electric aircraft, such as a power source of the electric aircraft and/or electrical systems of the electric aircraft. As used in this disclosure, "charging" refers to a process of increasing energy stored within an energy source. In some cases, and without limitation, an energy source may include a battery and charging may include providing electrical power, such as an electrical current, to the battery.

In one or more embodiments, and with continued reference to FIG. 3A, connector 300 may include a distal end of a flexible tether 324 or a bundle of tethers, e.g., hose, tubing, cables, wires, and the like, attached to a charging unit, such as a charging station or charger. Connector 300 is configured to connect charging unit to an electric aircraft to create an electrical communication between charging unit and electric aircraft, as discussed further in this disclosure. Connector 300 may be configured to removably attach to a port of electric aircraft using, for example, a mating component 328. For example, and without limitation, in the case of an electric aircraft port, the port interfaces with a number of conductors 308 and/or a cooling channel 320 by way of receiving connector 300. In the case of a computing device port, the port may provide an interface between a signal and a computing device. A connector may include a male component having a penetrative form and port may include a female component having a receptive form, receptive to the male component. Alternatively or additionally, connector may have a female component and port may have a male component. In some cases, connector may include multiple connections, which may make contact and/or communicate with associated mating components within port, when the connector is mated with the port.

With continued reference to FIG. 3A, connector 300 may include a casing 304. In some cases, casing 304 may protect internal components of connector 300. Casing 304 may be made from various materials, such as metal alloy, aluminum, steel, plastic, synthetic material, semi-synthetic material, polymer, and the like. In some embodiments, casing 304 may be monolithic. In other embodiments, casing 304 may include a plurality of assembled components. Casing 304 and/or connector 300 may be configured to mate with a port of an electric aircraft using a mating component 328. Mating component 328 may include a mechanical or electromechanical mechanism described in this disclosure. For example, without limitation mating may include an electromechanical device used to join electrical conductors and create an electrical circuit. In some cases, mating component 328 may include gendered mating components. Gendered mating components may include a male component, such as a plug, which is inserted within a female component, such as a socket. In some cases, mating between mating components may be removable. In some cases, mating between mating components may be permanent. In some cases, mating may be removable, but require a specialized tool or key for removal. Mating may be achieved by way of one or more of plug and socket mates, pogo pin contact, crown spring mates, and the like. In some cases, mating may be keyed to ensure proper alignment of connector 300. In some cases, mate may be lockable. In one or more embodiments, casing 304 may include controls 332. The controls 332 disclosed herein may be consistent with a user input device 212. Controls 332 may be actuated by a user to initiate, terminate, and/or modify parameters charging. For example, and without limitation, a button of controls 332 may be depressed by a user to initiate a transfer of electrical power from charging unit to electric aircraft. Controls 332 may include buttons, switches, slides, a touchscreen, joystick, and the like. In some embodiments, controls 332 may include a screen that displays information related to the charging of an energy source. For example, and without limitation, screen may display an amperage or voltage of electrical power being transferred to energy source of electric aircraft. Screen may also display a calculated amount of time until energy source is charged to a desired amount (e.g., desired state of charge). Screen may also display data detected by components, such as a sensor, of connector and/or electric aircraft. For example, and without limitation, screen may display a temperature of an energy source of electric aircraft. In an exemplary embodiment, a user may actuate, for example, a switch, of control 332 to initiate a cooling of a component of connector 300 and/or electric aircraft in response to displayed information and/or data on screen of connector 300. Initiating of a cooling of one or more embodiments of connector 300 may include a coolant source displacing a coolant within a cooling channel, as discussed further in this disclosure below. Controlling a transmission of electrical power and/or charging of an electric aircraft using a connector may be consistent with charging described in U.S. Nonprovisional application Ser. No. 17/405,840, filed on Aug. 18, 2021, and entitled "CONNECTOR AND METHODS OF USE FOR CHARGING AN ELECTRIC AIRCRAFT", U.S. Nonprovisional application Ser. No. 17/407,358, filed on Aug. 20, 2021, and entitled "CONNECTOR AND METHOD FOR USE FOR AUTHORIZING BATTERY CHARGING FOR AN ELECTRIC AIRCRAFT", U.S. Nonprovisional application Ser. No. 17/515,508, filed on Oct. 21, 2021, and entitled "CONNECTOR WITH AMBIENCE MONITORING CAPABILITY AND METHODS OF USE FOR CHARGING AN ELECTRIC AIRCRAFT", the entirety of each one of which is incorporated herein by reference.

With continued reference to FIG. 3A, mating component 328 of casing 304 may include a fastener. Connector 300 may include one or more attachment components or mechanisms, for example without limitation fasteners, threads, snaps, canted coil springs, and the like. In some cases, connector may be connected to port by way of one or more press fasteners. Some press fasteners include elements on the first surface that interlock with elements on the second surface; such fasteners include without limitation hook-and-loop fasteners such as VELCRO fasteners produced by Velcro Industries B.V. Limited Liability Company of Curacao Netherlands, and fasteners held together by a plurality of flanged or "mushroom"-shaped elements, such as 3M DUAL LOCK fasteners manufactured by 3M Company of Saint Paul, Minnesota. Press-fastener may also include adhesives, including reusable gel adhesives, GECKSKIN adhesives developed by the University of Massachusetts in Amherst, of Amherst, Massachusetts, or other reusable adhesives. Where press-fastener includes an adhesive, the adhesive may be entirely located on the first surface of the press-fastener or on the second surface of the press-fastener, allowing any surface that can adhere to the adhesive to serve as the corresponding surface. In some cases, connector may be connected to port by way of magnetic force. For example, connector may include one or more of a magnetic, a ferromagnetic material, and/or an electromagnet. Fastener may be configured to provide removable attachment between connector 300 and port of electric aircraft. Exemplary non-limiting methods of permanent attachment include certain uses of adhesives, glues, nails, engineering interference (i.e., press) fits, and the like. In some cases, detachment of two or more relata permanently attached may result in breakage of one or more of the two or more relata.

With continued reference to FIG. 3A, connector 300 may include a controller 340. Connector 300 may include one or more charging cables that each include a conductor 308, which has a distal end approximately located within connector 300 and a proximal end approximately located at an energy source of charging unit. In some cases, conductor 308 may be configured to charge and/or recharge electric aircraft. For instance, conductor 308 may be connected to an energy source of a charging unit and conductor may be designed and/or configured to facilitate a specified amount of electrical power, current, or current type. For example, conductor 308 may include a direct current conductor. In some cases, conductor may include an alternating current conductor. In some cases, an alternating current may change its magnitude continuously with in time (e.g., sine wave).

In one or more embodiments, and with continued reference to FIG. 3A, conductor 308 may include a high-voltage conductor 312. In a non-limiting embodiment, high-voltage conductor 312 may be configured for a potential no less than 300 V. In some embodiments, high-voltage conductor may include a direct current (DC) conductor. High-voltage conductor 312 may include a DC conductor pin, which extends from casing 304 and allows for the flow of DC power into and out of the electric aircraft via port. In other embodiments, high-voltage conductor 312 may include an alternating current (AC) conductor. An AC conductor may include any component responsible for the flow of AC power into and out of the electric aircraft. The AC conductor may include a pin that extends from casing 304 that may allow for a transfer of electrical power between connector and power source of electrical aircraft. In some embodiments, a pin of high-voltage conductor 312 may include a live pin, such that the pin is the supply of DC or AC power. In other embodiments, pin of high-voltage conductor 312 may include a neutral pin, such that the pin is the return path for DC or AC power.

With continued reference to FIG. 3A, conductor may include a low-voltage conductor 316. In a non-limiting embodiment, low-voltage conductor 316 may be configured for a potential no greater than 300 V. Low-voltage conductor 316 may be configured for AC or DC current. In one or more embodiments, low-voltage conductor 316 may be used as an auxiliary charging connector to power auxiliary equipment of electric aircraft. In some embodiments, auxiliary equipment may only be powered using low-voltage conductor 316 such that auxiliary equipment is not powered after charging, thus, auxiliary equipment may be off during in-flight activities.

With continued reference to FIG. 3A, high-voltage conductor 312 and low-voltage conductor 316 may receive an electrical charging current from an energy source of charging unit. In some cases, energy source may include a charging battery (i.e., a battery used for charging other batteries). A charging battery is notably contrasted with an electric aircraft energy source or battery, which is located for example upon electric aircraft. As used in this disclosure, an "electrical charging current" is a flow of electrical charge that facilitates an increase in stored electrical energy of an energy storage, such as without limitation a battery. Charging battery may include a plurality of batteries, battery modules, and/or battery cells. Charging battery may be configured to store a range of electrical energy, for example a range of between about 5 KWh and about 5,000 KWh. Energy source may house a variety of electrical components. In one embodiment, energy source may contain a solar inverter. Solar inverter may be configured to produce on-site power generation. In one embodiment, power generated from solar inverter may be stored in a charging battery. In some embodiments, charging battery may include a used electric aircraft battery no longer fit for service in an aircraft.

In some embodiments, and with continued reference to FIG. 3A, charging battery may have a continuous power rating of at least 250 kVA. In other embodiments, charging battery may have a continuous power rating of over 250 kVA. In some embodiments, charging battery may have a battery charge range up to 950 Vdc. In other embodiments, charging battery may have a battery charge range of over 950 Vdc. In some embodiments, charging battery may have a continuous charge current of at least 250 amps. In other embodiments, charging battery may have a continuous charge current of over 250 amps. In some embodiments, charging battery may have a boost charge current of at least 500 amps. In other embodiments, charging battery may have a boost charge current of over 500 amps. In some embodiments, charging battery may include any component with the capability of recharging an energy source of an electric aircraft. In some embodiments, charging battery may include a constant voltage charger, a constant current charger, a taper current charger, a pulsed current charger, a negative pulse charger, an IUI charger, a trickle charger, and a float charger.

In one or more embodiments, and with continued reference to FIG. 3A, conductor 308 may be an electrical conductor, for example, a wire and/or cable, as previously mentioned above in this disclosure. Exemplary conductor materials may include metals, such as without limitation copper, nickel, steel, and the like. In one or more embodiments, conductor may be disposed within an insulation, such as an insulation sleeve that conductor is at least partially disposed within. For example, and without limitation, conductor 308 may be covered by insulation except for at conductor pin, which may contact a component or interface of port of electric aircraft as part of mating component 328.

Now referring to FIG. 3B, in some embodiments, a charging unit may additionally include an alternating current to direct current converter configured to convert an electrical charging current from an alternating current. As used in this disclosure, an "analog current to direct current converter" is an electrical component that is configured to convert analog current to digital current. An analog current to direct current (AC-DC) converter may include an analog current to direct current power supply and/or transformer. In some cases, AC-DC converter may be located within an electric aircraft and conductors may provide an alternating current to the electric aircraft by way of conductors 308 and connector 300. Alternatively and/or additionally, in some cases, AC-DC converter may be located outside of electric aircraft and an electrical charging current may be provided by way of a direct current to the electric aircraft. In some cases, AC-DC converter may be used to recharge a charging batter. In some cases, AC-DC converter may be used to provide electrical power to one or more of coolant source 336, charging battery, and/or controller 340. In some embodiments, charging battery may have a connection to grid power component. Grid power component may be connected to an external electrical power grid. In some embodiments, grid power component may be configured to slowly charge one or more batteries in order to reduce strain on nearby electrical power grids. In one embodiment, grid power component may have an AC grid current of at least 450 amps. In some embodiments, grid power component may have an AC grid current of more or less than 450 amps. In one embodiment, grid power component may have an AC voltage connection of 480 Vac. In other embodiments, grid power component may have an AC voltage connection of above or below 480 Vac. In some embodiments, charging battery may provide power to the grid power component. In this configuration, charging battery may provide power to a surrounding electrical power grid.

With continued reference to FIG. 3B, a conductor 308 may include a control signal conductor configured to conduct a control signal. As used in this disclosure, a "control signal conductor" is a conductor configured to carry a control signal, such as a control signal between an electric aircraft and a charging unit. As used in this disclosure, a "control signal" is an electrical signal that is indicative of information. In this disclosure, "control pilot" is used interchangeably in this application with control signal. In some cases, a control signal may include an analog signal or a digital signal. In some cases, control signal may be communicated from one or more sensors, for example located within electric aircraft (e.g., within an electric aircraft battery) and/or located within connector 300. For example, in some cases, control signal may be associated with a battery within an electric aircraft. For example, control signal may include a battery sensor signal. As used in this disclosure, a "battery sensor signal" is a signal representative of a characteristic of a battery. In some cases, battery sensor signal may be representative of a characteristic of an electric aircraft battery, for example as electric aircraft battery is being recharged. In some versions, controller 340 may additionally include a sensor interface configured to receive a battery sensor signal. Sensor interface may include one or more ports, an analog to digital converter, and the like. Controller 340 may be further configured to control one or more of electrical charging current and coolant flow as a function of sensor signal from a sensor 344 and/or control signal. For example, controller 340 may control a charging battery as a function of a battery sensor signal and/or control signal. In some cases, battery sensor signal may be representative of battery temperature. In some cases, battery sensor signal may represent battery cell swell. In some cases, battery sensor signal may be representative of temperature of electric aircraft battery, for example temperature of one or more battery cells within an electric aircraft battery. In some cases, a sensor, a circuit, and/or a controller 340 may perform one or more signal processing steps on a signal. For instance, sensor, circuit or controller 340 may analyze, modify, and/or synthesize a signal in order to improve the signal, for instance by improving transmission, storage efficiency, or signal to noise ratio.

Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

With continued reference to FIG. 3B, a conductor 308 may include a ground conductor. Ground may include an absolute ground such as earth or ground may include a relative (or reference) ground, for example in a floating configuration. In some cases, charging battery may include one or electrical components configured to control flow of an electric recharging current or switches, relays, direct current to direct current (DC-DC) converters, and the like. In some case, charging battery may include one or more circuits configured to provide a variable current source to provide electric recharging current, for example an active current source. Non-limiting examples of active current sources include active current sources without negative feedback, such as current-stable nonlinear implementation circuits, following voltage implementation circuits, voltage compensation implementation circuits, and current compensation implementation circuits, and current sources with negative feedback, including simple transistor current sources, such as constant currant diodes, Zener diode current source circuits, LED current source circuits, transistor current, and the like, Op-amp current source circuits, voltage regulator circuits, and curpistor tubes, to name a few. In some cases, one or more circuits within charging battery or within communication with charging battery are configured to affect electrical recharging current according to control signal from controller 340, such that the controller 340 may control at least a parameter of the electrical charging current. For example, in some cases, controller 340 may control one or more of current (Amps), potential (Volts), and/or power (Watts) of electrical charging current by way of control signal. In some cases, controller 340 may be configured to selectively engage electrical charging current, for example ON or OFF by way of control signal.

With continued reference to FIG. 3B, a conductor 308 may include a proximity signal conductor. Proximity signal may be indicative of attachment of connector with a port, for instance electric aircraft port and/or test port. In some cases, a proximity signal may include an analog signal, a digital signal, an electrical signal, an optical signal, a fluidic signal, or the like. In some cases, a proximity signal conductor may be configured to conduct a proximity signal indicative of attachment between connector 300 and a port, for example electric aircraft port.

With continued reference to FIG. 3B, in some cases, connector 300 may additionally include a proximity sensor. For example, and without limitation, sensor 344 may include a proximity sensor. Proximity sensor may be electrically communicative with a proximity signal conductor. Proximity sensor may be configured to generate a proximity signal as a function of connection between connector 300 and a port, for example port of electric aircraft. Proximity sensor may include any sensor described in this disclosure, including without limitation a switch, a capacitive sensor, a capacitive displacement sensor, a doppler effect sensor, an inductive sensor, a magnetic sensor, an optical sensor (such as without limitation a photoelectric sensor, a photocell, a laser rangefinder, a passive charge-coupled device, a passive thermal infrared sensor, and the like), a radar sensor, a reflection sensor, a sonar sensor, an ultrasonic sensor, fiber optics sensor, a Hall effect sensor, and the like.

With continued reference to FIG. 3B, in some embodiments, connector 300 may additionally include an isolation monitor conductor configured to conduct an isolation monitoring signal. In some cases, power systems for example charging battery or electric aircraft batteries must remain electrically isolated from communication, control, and/or sensor signals. Often signal carrying conductors and components (e.g., sensors) may need to be in relatively close proximity with power systems and/or power carrying conductors. For instance, battery sensors which sense characteristics of batteries, for example batteries within an electric aircraft, are often by virtue of their function placed in close proximity with a battery. A battery sensor that measures battery charge and communicates a signal associated with battery charge back to controller 340 is at risk of becoming unisolated from the battery. In some cases, an isolation monitoring signal will indicate isolation of one or more components. In some cases, an isolation monitoring signal may be generated by an isolation monitoring sensor. Isolation monitoring sensor may include any sensor described in this disclosure, such as without limitation a multi-meter, an impedance meter, and/or a continuity meter. In some cases, isolation from an electrical power (e.g., battery and/or charging battery) may be required for housing of connector 300 and a ground. Isolation monitoring signal may, in some cases, communication information about isolation between an electrical power and ground, for example along a flow path that includes connector 300.

Referring now to FIG. 4, an exemplary embodiment of a port 404 of an electric aircraft and a port indicator 148a-c is disclosed. The port 404 disclosed herein may be consistent with a port described with respect to FIG. 1. The port 404 may be configured to mate with a mating component. As a non-limiting example, the mating component of the port 404 may include a connector of a cable module of ground support equipment. In some cases, mating may be performed by way of gendered mating components. A gendered mate may include a male component or plug which is inserted within a female component or socket. In an embodiment, the port 404 may include the male component. In another embodiment, the port 404 may include the female component. In some cases, mating may be removable. In some cases, mating may be permanent. In some cases, mating may be removable, but requires a specialized tool or key for removal. Mating may be achieved by way of one or more of plug and socket mates, pogo pin contact, crown spring mates, and the like. In some cases, mating may be keyed to ensure proper alignment of a mating component. In some cases, mate may be lockable. As a non-limiting example, the port 404 may include the female component having a receptive form, receptive to a male component, the cable module. Alternatively or additionally, the port 404 may include the male component having a penetrative form that may include one or more plug pins, that may be protruding pins, that mates with a socket, the female component of the cable module.

With continued reference to FIG. 4, in some embodiments, a port indicator 148a-c may include a light indicator 404a-h, a sound indicator, a vibration indicator, and the like. The light indicator 404a-I may include a flash pattern, a color pattern, a light animation, and the like. As a non-limiting example, the light animation of the light indicator 408a-i may include flashing the light indicator 408a, light indicator 408b, light indicator 408c, light indicator 408d, light indicator 408e, light indicator 408f, light indicator 408g, light indicator 408h in order, so that it may look like the light indicator 408a-h are moving in a circular motion. The order of the light indicators flashing may be changed to any other orders that can be. As another non-limiting example, the light animation of the light indicator a-h may include flashing the light indicator 408a, then light indicator 408h and light indicator 408b, then light indicator 408g and light indicator 408c, then 40f and light indicator 408d, then light indicator 408e in order, so that it may look like the light indicator 408a-h are moving from top to bottom. The order of the light indicators flashing may be changed to any other orders that can be. The light animation disclosed herein can be applied to any light indicator disclosed its entirely herein. In an embodiment, the port indicator 148a-c may indicate an attachment condition of a port 404 and a cable module. In another embodiment, the port indicator 148a-c may indicate that the port 404 is ready to be detached from a cable module.

Figure 5:
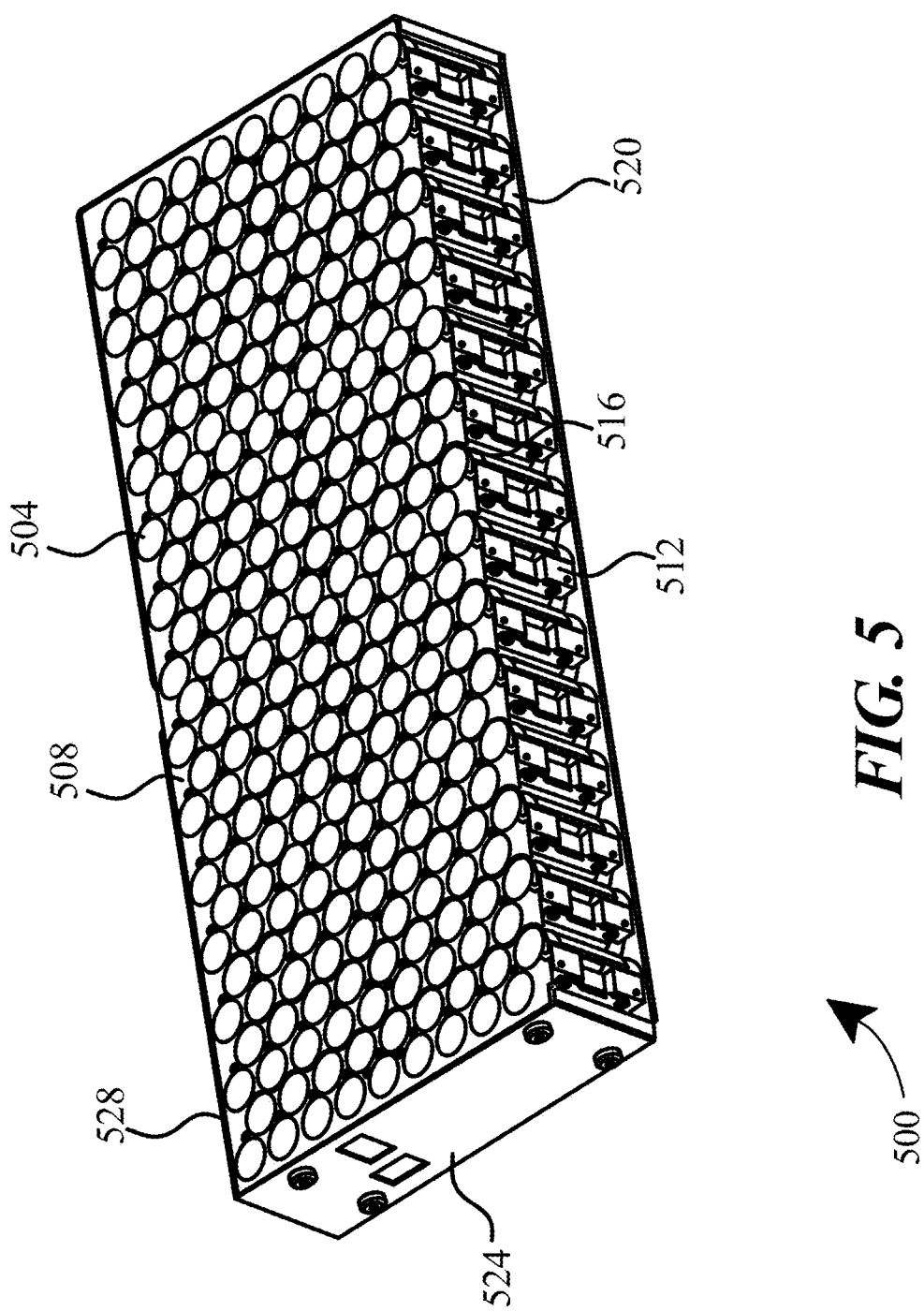
FIG. 5 schematically illustrates an exemplary battery module.

Referring now to FIG. 5, battery module 500 with multiple battery units 516 is illustrated, according to embodiments. Battery module 500 may comprise a battery cell 504, cell retainer 508, cell guide 512, protective wrapping, back plate 520, end cap 524, and side panel 528. Battery module 500 may comprise a plurality of battery cells, an individual of which is labeled 504. In embodiments, battery cells 504 may be disposed and/or arranged within a respective battery unit 516 in groupings of any number of columns and rows. For example, in the illustrative embodiment of FIG. 5, battery cells 504 are arranged in each respective battery unit 516 with 18 cells in two columns. It should be noted that although the illustration may be interpreted as containing rows and columns, that the groupings of battery cells in a battery unit, that the rows are only present as a consequence of the repetitive nature of the pattern of staggered battery cells and battery cell holes in cell retainer being aligned in a series. While in the illustrative embodiment of FIG. 5 battery cells 504 are arranged 18 to battery unit 516 with a plurality of battery units 516 comprising battery module 500, one of skill in the art will understand that battery cells 504 may be arranged in any number to a row and in any number of columns and further, any number of battery units may be present in battery module 500. According to embodiments, battery cells 504 within a first column may be disposed and/or arranged such that they are staggered relative to battery cells 504 within a second column. In this way, any two adjacent rows of battery cells 504 may not be laterally adjacent but instead may be respectively offset a predetermined distance. In embodiments, any two adjacent rows of battery cells 504 may be offset by a distance equal to a radius of a battery cell. This arrangement of battery cells 504 is only a non-limiting example and in no way precludes other arrangement of battery cells.

With continued reference to FIG. 5, in some embodiments, battery cells 504 may be fixed in position by cell retainer 508. For the illustrative purpose within FIG. 5, cell retainer 508 is depicted as the negative space between the circles representing battery cells 504. Cell retainer 508 comprises a sheet further comprising circular openings that correspond to the cross-sectional area of an individual battery cell 504. Cell retainer 508 comprises an arrangement of openings that inform the arrangement of battery cells 504. In embodiments, cell retainer 508 may be configured to non-permanently, mechanically couple to a first end of battery cell 504.

With continued reference to FIG. 5, according to embodiments, battery module 500 may further comprise a plurality of cell guides 512 corresponding to each battery unit 516. Cell guide 512 may comprise a solid extrusion with cutouts (e.g. scalloped) corresponding to the radius of the cylindrical battery cell 504. Cell guide 512 may be positioned between the two columns of a battery unit 516 such that it forms a surface (e.g. side surface) of the battery unit 516. In embodiments, the number of cell guides 512 therefore may match in quantity to the number of battery units 516. Cell guide 512 may comprise a material suitable for conducting heat.

With continued reference to FIG. 5, battery module 500 may also comprise a protective wrapping woven between the plurality of battery cells 504. Protective wrapping may provide fire protection, thermal containment, and thermal runaway during a battery cell malfunction or within normal operating limits of one or more battery cells 504 and/or potentially, battery module 500 as a whole. Battery module 500 may also comprise a backplate 520. Backplate 520 is configured to provide structure and encapsulate at least a portion of battery cells 504, cell retainers 508, cell guides 512, and protective wraps. End cap 524 may be configured to encapsulate at least a portion of battery cells 504, cell retainers 508, cell guides 512, and battery units 516, as will be discussed further below, end cap may comprise a protruding boss that clicks into receivers in both ends of back plate 520, as well as a similar boss on a second end that clicks into sense board. Side panel 528 may provide another structural element with two opposite and opposing faces and further configured to encapsulate at least a portion of battery cells 504, cell retainers 508, cell guides 512, and battery units 516.

With continued reference to FIG. 5, in embodiments, battery module 500 can include one or more battery cells 504. In another embodiment, battery module 500 comprises a plurality of individual battery cells 504. Battery cells 504 may each comprise a cell configured to include an electrochemical reaction that produces electrical energy sufficient to power at least a portion of an electric aircraft. Battery cell 504 may include electrochemical cells, galvanic cells, electrolytic cells, fuel cells, flow cells, voltaic cells, or any combination thereof—to name a few. In embodiments, battery cells 504 may be electrically connected in series, in parallel, or a combination of series and parallel. Series connection, as used herein, comprises wiring a first terminal of a first cell to a second terminal of a second cell and further configured to comprise a single conductive path for electricity to flow while maintaining the same current (measured in Amperes) through any component in the circuit. Battery cells 504 may use the term 'wired', but one of ordinary skill in the art would appreciate that this term is synonymous with 'electrically connected', and that there are many ways to couple electrical elements like battery cells 504 together. As an example, battery cells 504 can be coupled via prefabricated terminals of a first gender that mate with a second terminal with a second gender. Parallel connection, as used herein, comprises wiring a first and second terminal of a first battery cell to a first and second terminal of a second battery cell and further configured to comprise more than one conductive path for electricity to flow while maintaining the same voltage (measured in Volts) across any component in the circuit. Battery cells 504 may be wired in a series-parallel circuit which combines characteristics of the constituent circuit types to this combination circuit. Battery cells 504 may be electrically connected in any arrangement which may confer onto the system the electrical advantages associated with that arrangement such as high-voltage applications, high-current applications, or the like. As used herein, an electrochemical cell is a device capable of generating electrical energy from chemical reactions or using electrical energy to cause chemical reactions. Further, voltaic or galvanic cells are electrochemical cells that generate electric current from chemical reactions, while electrolytic cells generate chemical reactions via electrolysis. As used herein, the term 'battery' is used as a collection of cells connected in series or parallel to each other.

With continued reference to FIG. 5, according to embodiments and as discussed above, any two rows of battery cells 504 and therefore cell retainer 508 openings are shifted one half-length so that no two battery cells 504 are directly next to the next along the length of the battery module 500, this is the staggered arrangement presented in the illustrated embodiment of FIG. 5. Cell retainer 508 may employ this staggered arrangement to allow more cells to be disposed closer together than in square columns and rows like in a grid pattern. The staggered arrangement may also be configured to allow better thermodynamic dissipation, the methods of which may be further disclosed hereinbelow. Cell retainer 508 may comprise staggered openings that align with battery cells 504 and further configured to hold battery cells 504 in fixed positions. Cell retainer 508 may comprise an injection molded component. Injection molded component may comprise a component manufactured by injecting a liquid into a mold and letting it solidify, taking the shape of the mold in its hardened form. Cell retainer 508 may comprise liquid crystal polymer, polypropylene, polycarbonate, acrylonitrile butadiene styrene, polyethylene, nylon, polystyrene, polyether ether ketone, to name a few. Cell retainer 508 may comprise a second cell retainer fixed to the second end of battery cells 504 and configured to hold battery cells 504 in place from both ends. The second cell retainer may comprise similar or the exact same characteristics and functions of first cell retainer 508. Battery module 500 may also comprise cell guide 512. Cell guide 512 includes material disposed in between two rows of battery cells 504. In embodiments, cell guide 512 can be configured to distribute heat that may be generated by battery cells 504.

With continued reference to FIG. 5, battery module 500 may also comprise back plate 520. Back plate 520 is configured to provide a base structure for battery module 500 and may encapsulate at least a portion thereof. Backplate 520 can have any shape and includes opposite, opposing sides with a thickness between them. In embodiments, back plate 520 may comprise an effectively flat, rectangular prism shaped sheet. For example, back plate 520 can comprise one side of a larger rectangular prism which characterizes the shape of battery module 500 as a whole. Back plate 520 also comprises openings correlating to each battery cell 504 of the plurality of battery cells 504. Back plate 520 may comprise a lamination of multiple layers. The layers that are laminated together may comprise FR-5, a glass-reinforced epoxy laminate material, and a thermal barrier of a similar or exact same type as disclosed hereinabove. Back plate 520 may be configured to provide structural support and containment of at least a portion of battery module 500 as well as provide fire and thermal protection.

With continued reference to FIG. 5, battery module 500 may also comprise first end cap 524 configured to encapsulate at least a portion of battery module 500. End cap 524 may provide structural support for battery module 500 and hold back plate 520 in a fixed relative position compared to the overall battery module 500. End cap 524 may comprise a protruding boss on a first end that mates up with and snaps into a receiving feature on a first end of back plate 520. End cap 524 may comprise a second protruding boss on a second end that mates up with and snaps into a receiving feature on sense board.

With continued reference to FIG. 5, battery module 500 may also comprise at least a side panel 528 that may encapsulate two sides of battery module 500. Side panel 528 may comprise opposite and opposing faces comprising a metal or composite material. In the illustrative embodiment of FIG. 5, a second side panel 528 is present but not illustrated so that the inside of battery module 500 may be presented. Side panel(s) 528 may provide structural support for battery module 500 and provide a barrier to separate battery module 500 from exterior components within aircraft or environment.

Figure 6:
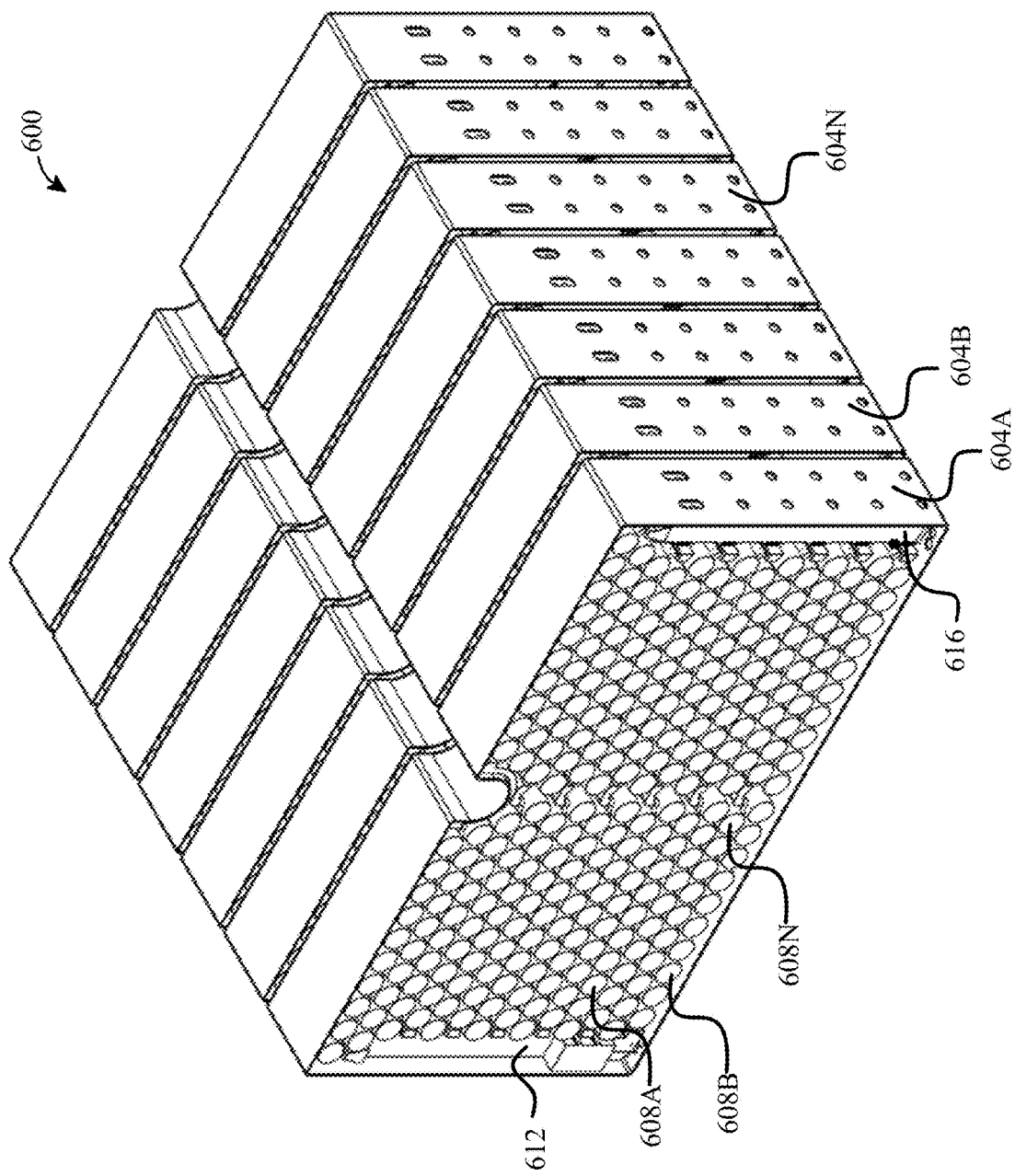
FIG. 6 is perspective drawings illustrating a battery pack, according to embodiments.

Referring now to FIG. 6, a perspective drawing of an embodiment of a battery pack with a plurality of battery modules disposed therein 600. The configuration of battery pack 600 is merely exemplary and should in no way be considered limiting. Battery pack 600 is configured to facilitate the flow of the media through each battery module of the plurality of battery modules to cool the battery pack. Battery pack 600 can include one or more battery modules 604A-N. Battery pack 600 is configured to house and/or encase one or more battery modules 604A-N. Each battery module of the plurality of battery modules 604A-N may include any battery module as described in further detail in the entirety of this disclosure. As an exemplary embodiment, FIG. 6 illustrates 7 battery modules 604A-N creating battery pack 600, however, a person of ordinary skill in the art would understand that any number of battery modules 604A-N may be housed within battery pack 600. In an embodiment, each battery module of the plurality of battery modules 604A-N can include one or more battery cells 608A-N. Each battery module 604A-N is configured to house and/or encase one or more battery cells 608A-N. Each battery cell of the plurality of battery cells 608A-N may include any battery cell as described in further detail in the entirety of this disclosure. Battery cells 608A-N may be configured to be contained within each battery module 604A-N, wherein each battery cell 608A-N is disposed in any configuration without limitation. As an exemplary embodiment, FIG. 6 illustrates 240 battery cells 608A-N housed within each battery module 604A-N, however, a person of ordinary skill in the art would understand that any number of battery units 608A-N may be housed within each battery module 604A-N of battery pack 600. Further, each battery module of the plurality of battery modules 604A-N of battery pack 600 includes circuit 612. Circuit 612 may include any circuit as described in further detail in the entirety of this disclosure. Each battery module of the plurality of battery modules 604A-N further includes second circuit 616. Second circuit 616 may include any circuit as described in further detail in the entirety of this disclosure. Persons skilled in the art, upon reviewing the entirety of this disclosure, will be aware of various configurations of the plurality of battery modules that may be utilized for the battery pack consistently with this disclosure.

With continued reference to FIG. 6, in some embodiments, a battery unit may be configured to couple to one or more other battery units, wherein the combination of two or more battery units forms at least a portion of vehicle battery and/or charging battery. Battery unit may be configured to include a plurality of battery cells. The plurality of battery cells may include any battery cell as described in the entirety of this disclosure. In the instant embodiment, for example and without limitation, battery unit includes a first row of battery cells, wherein first row of battery cells is in contact with the first side of the thermal conduit, as described in further detail below. As a non-limiting example, row of battery cells is configured to contain ten columns of battery cells. Further, in the instant embodiment, for example and without limitation, battery unit includes a second row of battery cells, wherein second row of battery cells is in contact with the second side of the thermal conduit, as described in further detail below. As a non-limiting example, second row of battery cells is configured to contain ten columns of battery cells. In some embodiments, battery unit may be configured to contain twenty battery cells in first row and second row. Battery cells of battery unit may be arranged in any configuration, such that battery unit may contain any number of rows of battery cells and any number of columns of battery cells. In embodiments, battery unit may contain any offset of distance between first row of battery cells and second row of battery cells, wherein the battery cells of first row and the battery cells of second row are not centered with each other. In the instant embodiment, for example and without limitation, battery unit includes first row and adjacent second row each containing ten battery cells, each battery cell of first row and each battery cell of second row are shifted a length measuring the radius of a battery cell, wherein the center of each battery cell of first row and each battery cell of second row are separated from the center of the battery cell in the adjacent column by a length equal to the radius of the battery cell. As a further example and without limitation, each battery cell of first row and each battery cell of second row are shifted a length measuring a quarter the diameter of each battery cell, wherein the center of each battery cell of first row and each battery cell of second row are separated from the center of a battery cell in the adjacent column by a length equal to a quarter of the diameter of the battery cell. First row of battery cells and second row of battery cells of the plurality of battery unit may be configured to be fixed in a position by utilizing a cell retainer, as described in the entirety of this disclosure. Each battery cell may be connected utilizing any means of connection as described in the entirety of this disclosure. In some embodiments, battery unit can include thermal conduit, wherein thermal conduit has a first surface and a second opposite and opposing surface. In some cases, height of thermal conduit may not exceed the height of battery cells, as described in the entirety of this disclosure. For example and without limitation, thermal conduit may be at a height that is equal to the height of each battery cell of first row and second row. Thermal conduit is configured to include an indent in the component for each battery cell coupled to the first surface and/or the second surface of thermal conduit. Persons skilled in the art, upon reviewing the entirety of this disclosure, will be aware of components that may be used as thermal conduits consistently with this disclosure.

With continued reference to FIG. 6, in some embodiments, thermal conduit may include at least a passage, wherein the plurality of passage comprises an opening starting at the first end of thermal conduit and terminating at a second, opposing end of thermal conduit. The "passage", as described herein, is a horizontal channel with openings on each end of the thermal conduit. The plurality of passage may be configured to have a hollow shape comprising one or more sides, at least two ends (e.g. a top and a bottom), and a length, wherein the hollow shape comprises a void having a shape the same as or different from the shape of the plurality of passage and terminating at an opposite, opposing second end of the shape. For example and without limitation, in some embodiments, the plurality of passage comprises a rectangle shaped tubular shape. In embodiments, the tubular component runs effectively perpendicular to each battery cell. In embodiments, the plurality of passage can be disposed such that it forms a void originating at a first side of the battery module and terminating at the second, opposite, and opposing side, of the battery module. According to embodiments, the plurality of passage and/or thermal conduit may be composed utilizing any suitable material. For example and without limitation, thermal conduit and/or the plurality of passage may be composed of polypropylene, polycarbonate, acrylonitrile butadiene styrene, polyethylene, nylon, polystyrene, polyether ether ketone, and the like.

With continued reference to FIG. 6, in some embodiments, the plurality of passage may be disposed in the thermal conduit such that the plurality of passage is configured to allow the travel of a media from a first end of thermal conduit to the second, opposite, and opposite end of thermal conduit. For example, the plurality of passage can be disposed to allow the passage of the media through the hollow opening/void of the plurality of passage. The media may include any media as described in the entirety of this disclosure. The hollow opening of thermal conduit and/or the plurality of passage may be configured to be of any size and/or diameter. For example and without limitation, the hollow opening of the plurality of passage may be configured to have a diameter that is equal to or less than the radius of each battery cell. The plurality of passage and/or thermal conduit may have a length equal or less than the length of one row of battery cells such that thermal conduit and/or the plurality of passage is configured to not exceed the length of first row and/or second row of battery cells. The opening of the plurality of passage can be configured to be disposed at each end of thermal conduit, wherein the plurality of passage may be in contact with each battery cell in a respective battery unit located at the end of each column and/or row of the battery unit. For example and without limitation, in some embodiments, a battery unit can contain two rows with ten columns of battery cells and the opening of the plurality of passage on each end of thermal conduit that is in contact with a respective battery cell at the end of each of the two columns. Persons skilled in the art, upon reviewing the entirety of this disclosure, will be aware of various components that may be used as at least a passage consistently with this disclosure.

With continued reference to FIG. 6, in some embodiments, circuit and/or thermal conduit may be configured to facilitate the flow of the media through each battery module of the plurality of battery modules to cool the battery pack. The media may include any media described in further detail in the entirety of this disclosure. Circuit can include any circuit as described above in further detail. In the embodiment, circuit may be configured to couple to a first end of thermal conduit, wherein coupling is configured to facilitate the flow of the media from the circuit to the first end of thermal conduit through the plurality of passage. Coupling may include any coupling as described in further detail throughout the entirety of this disclosure. Circuit may include any component configured to facilitate the flow of media to the battery pack by utilizing an electrical current. For example and without limitation, circuit may include a printed circuit board, wherein the printed circuit board mechanically supports the electrical connection facilitating the flow of media to the battery pack. Circuit may be configured to include first end and a second end, wherein the second end is opposite the first end of circuit. In some embodiments, first end of circuit is in a plane perpendicular to the longitudinal axis of thermal conduit. First end of circuit is configured to include media feed component. The embodiment of circuit illustrates media feed component disposed only on first side of circuit; however this is non-limiting and circuit may include media feed component disposed on the second end of circuit. The media feed component of circuit may be configured to allow the media to feed into circuit, the battery module and/or the battery pack, wherein the flow of media may be initiated as a function of coupling media feed component of circuit to the media feeder of the thermal management apparatus. Media feed component can include any media feed component as described in further detail above. In some embodiments, media feed component is a threaded hole, wherein the media feeder of the thermal management apparatus is configured to couple to the threaded hole of media feed component, however this is non-limiting and media feed component may include, without limitation, a magnetic component, a latching mechanism, a pressure fit tubing mechanism, a nozzle mechanism, a hole, a flap, and the like.

With continued reference to FIG. 6, in some embodiments, thermal conduit can include any thermal conduit as described in further detail above. The height of thermal conduit may not exceed the height of each battery cell of the plurality of battery cells, in some cases, as described in the entirety of this disclosure. Thermal conduit may be composed of any suitable material, as described above in further detail above. Thermal conduit may be configured to include any curvature of the first side and/or second side of thermal conduit. For example and without limitation the curvature of the first side and/or second side of thermal conduit correlates at least a portion of a battery cell of the plurality of battery cells. As a further example and without limitation, in an embodiment, thermal conduit may be configured to include ten curves of the first surface of thermal conduit, wherein each curve is configured to contain the plurality of portion of each battery cell of the plurality of battery cells adjacent to the first surface of thermal conduit. As a further example and without limitation, in some embodiments, thermal conduit may be configured to include ten curves on the second surface of thermal conduit wherein each curve may be configured to contain the plurality of portion of each battery cell of the plurality of battery cells adjacent to the second surface of thermal conduit. The embodiment of thermal conduit illustrates ten curves on each surface of thermal conduit; however this is non-limiting and thermal conduit may include any number of curves on each surface of thermal conduit, wherein each curve corresponds to the plurality of portion of a battery cell of the plurality of battery cells.

With continued reference to FIG. 6, in some embodiments, thermal conduit can include any thermal conduit as described in further detail above. As described in further detail above, thermal conduit may be composed of any suitable material. Further, thermal conduit may be configured to include any curvature of the first side and/or second side of the thermal conduit, as described in further detail above. Thermal conduit may be configured to at least a passage. The plurality of passage can include any at least a passage as described in further detail above. The plurality of passage is configured to have a hollow shape comprising one or more sides, at least two ends (e.g. a top and a bottom), and a length, wherein the hollow shape comprises a void having a shape the same as or different from the shape of the plurality of passage and terminating at an opposite, opposing second end of the shape, as described above in further detail above. For example and without limitation, in the illustrative embodiment, the plurality of passage comprise a rectangle shaped tubular shape. In embodiments, the tubular component runs effectively perpendicular to each battery cell and/or curvature of thermal conduit configured to house each battery cell. In embodiments, the plurality of passage can be disposed such that it forms a void originating at a first side of the battery module and terminating at the second, opposite, and opposing side, of the battery module, as described in further detail in the entirety of this disclosure. According to embodiments, the plurality of passage and/or thermal conduit may be composed utilizing any suitable material, as described in further detail above. In embodiments, the plurality of passage may be disposed in the thermal conduit such that the plurality of passage may be configured to allow the travel of a media from a first end of thermal conduit to the second, opposite, and opposite end of thermal conduit, as described in further detail in the entirety of this disclosure.

Figure 7:
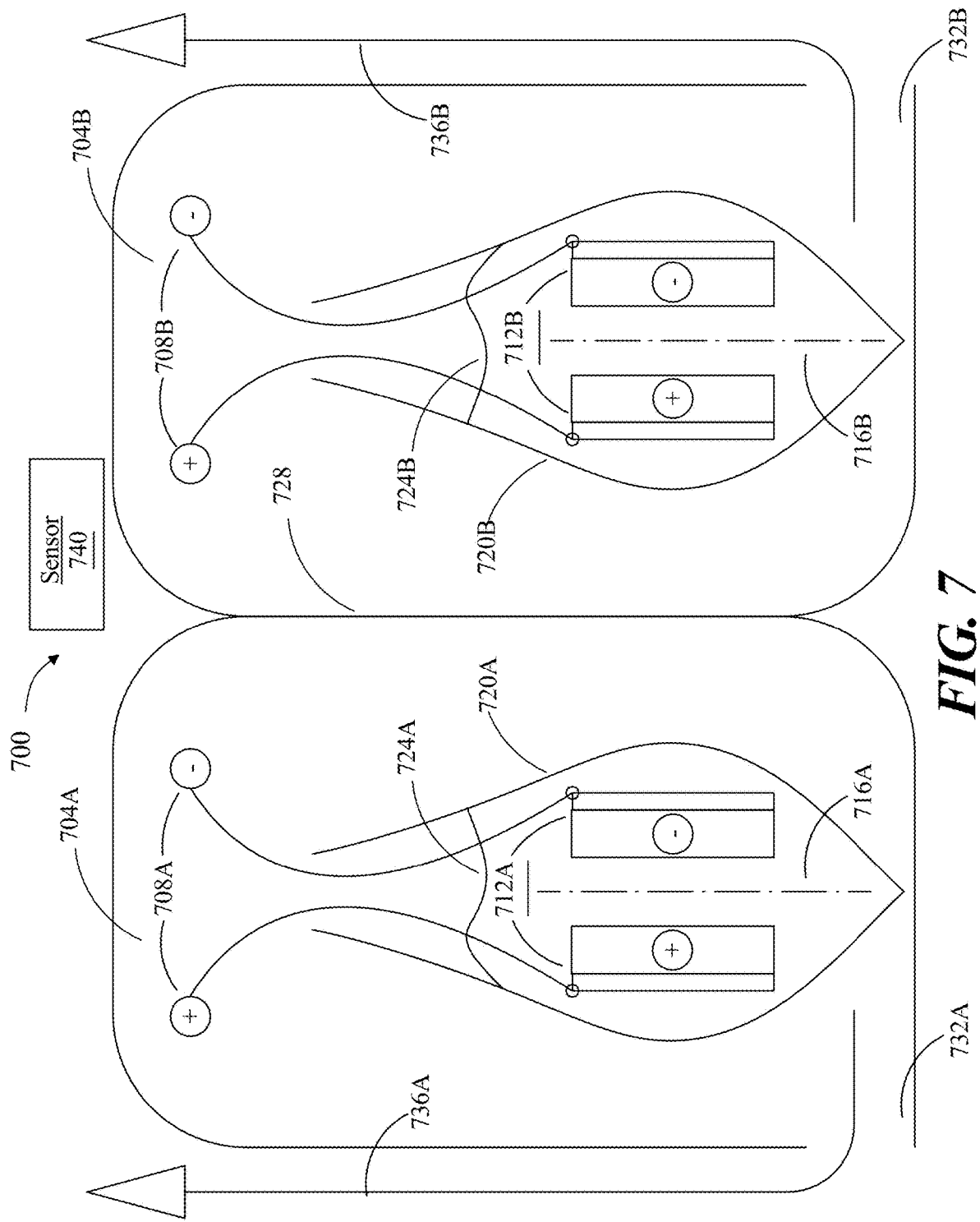
FIG. 7 is a block diagram of an exemplary battery pack for preventing progression of thermal runaway between modules.

Referring now to FIG. 7, FIG. 7 illustrates a block diagram of an exemplary battery pack 700 for preventing progression of thermal runaway between modules. Battery pack 700 may include a pouch cell 704A-B. As used in this disclosure, "pouch cell" is a battery cell or module that includes a pouch. In some cases, a pouch cell may include or be referred to as a prismatic pouch cell, for example when an overall shape of pouch is prismatic. In some cases, a pouch cell may include a pouch which is substantially flexible. Alternatively or additionally, in some cases, pouch may be substantially rigid. Pouch cell 704A-B may include at least a pair of electrodes 708A-B. At least a pair of electrodes 708A-B may include a positive electrode and a negative electrode. Each electrode of at least a pair of electrodes 708A-B may include an electrically conductive element. Non-limiting exemplary electrically conductive elements include braided wire, solid wire, metallic foil, circuitry, such as printed circuit boards, and the like. At least a pair of electrodes 708A-B may be in electric communication with and/or electrically connected to at least a pair of foil tabs 712A-B. At least a pair of electrodes 708A-B may be bonded in electric communication with and/or electrically connected to at least a pair of foil tabs 712A-B by any known method, including without limitation welding, brazing, soldering, adhering, engineering fits, electrical connectors, and the like. In some cases, at least a pair of foil tabs may include a cathode and an anode. In some cases, an exemplary cathode may include a lithium-based substance, such as lithium-metal oxide, bonded to an aluminum foil tab. In some cases, an exemplary anode may include a carbon-based substance, such as graphite, bonded to a copper tab. A pouch cell 704A-B may include an insulator layer 716A-B. As used in this disclosure, an "insulator layer" is an electrically insulating material that is substantially permeable to battery ions, such as without limitation lithium ions. In some cases, insulator layer may be referred to as a separator layer or simply separator. In some cases, insulator layer 716A-B is configured to prevent electrical communication directly between at least a pair of foil tabs 712A-B (e.g., cathode and anode). In some cases, insulator layer 716A-B may be configured to allow for a flow ion across it. Insulator layer 716A-B may consist of a polymer, such as without limitation polyolefin (PO). Insulator layer 716A-B may comprise pours which are configured to allow for passage of ions, for example lithium ions. In some cases, pours of a PO insulator layer 716A-B may have a width no greater than 100 μm, 10 μm, or 0.1 μm. In some cases, a PO insulator layer 716A-B may have a thickness within a range of 1-100 μm, or 10-70 μm.

With continued reference to FIG. 7, pouch cell 704A-B may include a pouch 720A-B. Pouch 720A-B may be configured to substantially encompass at least a pair of foil tabs 712A-B and at least a portion of insulator layer 716A-B. In some cases, pouch 720A-B may include a polymer, such as without limitation polyethylene, acrylic, polyester, and the like. In some case, pouch 720A-B may be coated with one or more coatings. For example, in some cases, pouch may have an outer surface coated with a metalizing coating, such as an aluminum or nickel containing coating. In some cases, pouch coating be configured to electrically ground and/or isolate pouch, increase pouches impermeability, increase pouches resistance to high temperatures, increases pouches thermal resistance (insulation), and the like. An electrolyte 724A-B is located within pouch. In some cases, electrolyte 724A-B may comprise a liquid, a solid, a gel, a paste, and/or a polymer. Electrolyte may wet or contact one or both of at least a pair of foil tabs 712A-B.

With continued reference to FIG. 7, battery pack 700 may additionally include an ejecta barrier 728. Ejecta barrier may be located substantially between a first pouch cell 704A and a second pouch cell 704B. As used in this disclosure, an "ejecta barrier" is any material or structure that is configured to substantially block, contain, or otherwise prevent passage of ejecta. As used in this disclosure, "ejecta" is any material that has been ejected, for example from a battery cell. In some cases, ejecta may be ejected during thermal runaway of a battery cell. Alternatively or additionally, in some cases, eject may be ejected without thermal runaway of a battery cell. In some cases, ejecta may include lithium-based compounds. Alternatively or additionally, ejecta may include carbon-based compounds, such as without limitation carbonate esters. Ejecta may include matter in any phase or form, including solid, liquid, gas, vapor, and the like. In some cases, ejecta may undergo a phase change, for example ejecta may be vaporous as it is initially being ejected and then may cool and condense into a solid or liquid after ejection. In some cases, ejecta barrier may be configured to prevent materials ejected from a first pouch cell 704A from coming into contact with a second pouch cell 704B. For example, in some instances ejecta barrier 728 is substantially impermeable to ejecta from battery pouch cell 704A-B. In some embodiments, ejecta barrier 728 may include titanium. In some embodiments, ejecta barrier 728 may include carbon fiber. In some cases, ejecta barrier 728 may include at least a one of a lithiophilic or a lithiophobic material or layer, configured to absorb and/or repel lithium-based compounds. In some cases, ejecta barrier 728 may comprise a lithiophilic metal coating, such as silver or gold. In some cases, ejecta barrier 728 may be flexible and/or rigid. In some cases, ejecta barrier 728 may include a sheet, a film, a foil, or the like. For example in some cases, ejecta barrier may be between 25 and 7,000 micrometers thick. In some cases, an ejecta barrier may have a nominal thickness of about 2 mm. Alternatively or additionally, in some cases, an ejecta barrier may include rigid and/or structural elements, for instance which are solid. Rigid ejecta barriers 728 may include metals, composites and the like. In some cases, ejecta barrier 728 may be further configured to structurally support at least a pouch cell 728. For example in some cases, at least a pouch cell 728 may be mounted to a rigid ejecta barrier 728.

With continued reference to FIG. 7, battery pack 700 may additionally include at least a vent 732A-B. In some cases, at least a vent 732A may be configured to vent ejecta from first pouch cell 704A. In some cases, at least a vent 704A may be configured to vent ejecta along a flow path 736A. A flow path 736A may substantially exclude second pouch cell 704B, for example fluids such as gases liquids, or any material that acts as a gas or liquid, flowing along the flow path 736A may be cordoned away from contact with second pouch cell 704B. For example flow path 736A may be configured to not intersect with any surface of second pouch cell 704B. Flow path 736A-B may include any channel, tube, hose, conduit, or the like suitable for facilitating fluidic communication, for example with a pouch cell 704A-B. In some cases, flow path 736A-B may include a check valve. As used in this disclosure, a "check valve" is a valve that permits flow of a fluid only in certain, for example one, direction. In some cases check valve may be configured to allow flow of fluids substantially only away from battery pouch cell 704A-B, while preventing back flow of vented fluid to the battery pouch cell 704A-B. In some cases, check valve may include a duckbill check valve. In some cases, a duckbill check valve may have lips which are substantially in a shape of a duckbill. Lips may be configured to open to allow forward flow (out of the lips), while remaining normally closed to prevent backflow (into the lips). In some cases, duckbill lips may be configured to automatically close (remain normally closed), for example with use of a compliant element, such as without limitation an elastomeric material, a spring, and the like. In some embodiments vent may include a mushroom poppet valve. In some cases, a mushroom poppet valve may include a mushroom shaped poppet. Mushroom shaped poppet may seal against a sealing element, for example a ring about an underside of a cap of the mushroom shaped poppet. In some cases, mushroom poppet valve may be loaded against sealing element, for example by way of a compliant element, such as a spring. According to some embodiments, vent 732A-B may have a vacuum applied to aid in venting of ejecta. Vacuum pressure differential may range from 0.1" Hg to 36" Hg.

With continued reference to FIG. 7, battery pack 700 may include a first battery pouch cell 704A and a second battery pouch cell 704B. First pouch cell 704A may include at least a first pair of electrodes 708A, at least a first pair of foil tabs 712A in electrical communication with the first electrodes 708A, at least a first insulator layer 716A located substantially between the plurality of first pair of foil tabs 712A, a first pouch 720A substantially encompassing the plurality of first pair of foil tabs 712A and at least a portion of the plurality of first separator layer 716A, and a first electrolyte 724A within the first pouch 720A. Second pouch cell 704B may include at least a second pair of electrodes 708B, at least a second pair of foil tabs 712B in electrical communication with the first electrodes 708B, at least a second insulator 716B located substantially between the plurality of first pair of foil tabs 712B, a second pouch 720B substantially encompassing the plurality of second pair of foil tabs 712B and at least a portion of the plurality of second insulator 716B, and a second electrolyte 724B within the second pouch 720B. Battery pack 700 may include an ejecta barrier 728 located substantially between first pouch cell 704A and second pouch cell 704B. Ejecta barrier 728 may be substantially impermeable to ejecta, for example ejecta from first pouch cell 704A. In some cases, battery pack 700 may include a vent configured to vent ejecta, for example from first pouch cell 704A. In some embodiments, ejecta barrier 728 may substantially encapsulate at least a portion of pouch cell 704A-B. For example, ejecta barrier 728 may substantially encapsulate first pouch cell 704A. In some cases, vent may be configured to provide fluidic communication through at least one of ejecta barrier 728 and pouch 720A-B. In some cases, vent may include a seam. Seam may be a seam of pouch 720A-B. Alternatively or additionally; seam may be a seam of ejecta barrier 728.

With continued reference to FIG. 7, in some embodiments battery pack 700 may additionally include a third pouch cell. Third pouch cell may include at least a third pair of electrodes, at least a third pair of foil tabs welded to the third electrodes, at least a third insulator layer located substantially between the plurality of third pair of foil tabs, a third pouch substantially encompassing the plurality of third pair of foil tabs and the plurality of third separator layer, and a third electrolyte within the third pouch. Battery pack may include a plurality including any number of pouch cells. In some cases, each pouch cell of plurality of pouch cells is separated from adjacent pouch cells with at least an ejecta barrier 728. Any pouch cell of plurality of pouch cells in battery pack may include any component described in this disclosure, for example without limitation vents, valves, and the like.

With continued reference to FIG. 7, in some embodiments, pouch cells 704A-B may include Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon, tin nanocrystals, graphite, graphene or titanate anode, or the like. Batteries and/or battery modules may include without limitation batteries using nickel-based chemistries such as nickel cadmium or nickel metal hydride, batteries using lithium-ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), batteries using lithium polymer technology, metal-air batteries. Pouch cells 704A-B may include lead-based batteries such as without limitation lead acid batteries and lead carbon batteries. Pouch cells 704A-B may include lithium sulfur batteries, magnesium ion batteries, and/or sodium ion batteries. Batteries may include solid state batteries or supercapacitors or another suitable energy source. Batteries may be primary or secondary or a combination of both. Additional disclosure related to batteries and battery modules may be found in co-owned U.S. Patent Applications entitled "SYSTEM AND METHOD FOR HIGH ENERGY DENSITY BATTERY MODULE" and "SYSTEMS AND METHODS FOR RESTRICTING POWER TO A LOAD TO PREVENT ENGAGING CIRCUIT PROTECTION DEVICE FOR AN AIRCRAFT," having U.S. patent application Ser. Nos. 16/948,140 and 16/690,496 respectively; the entirety of both applications is incorporated herein by reference. Persons skilled in the art, upon reviewing the entirety of this disclosure, will be aware of various devices of components that may be used as a battery module. In some cases, battery pack 700 is constructed in a manner that vents ejecta, while preventing ejecta from one pouch cell from interacting with another pouch cell.

With continued reference to FIG. 7, battery pack 700 may include at least a sensor 740. At least a sensor 740 may include a sensor suite, for example as described above. In some cases, at least a sensor 740 may be configured to sense battery pack data and transmit battery pack data to a data storage system, for example as described above.

Figure 8:
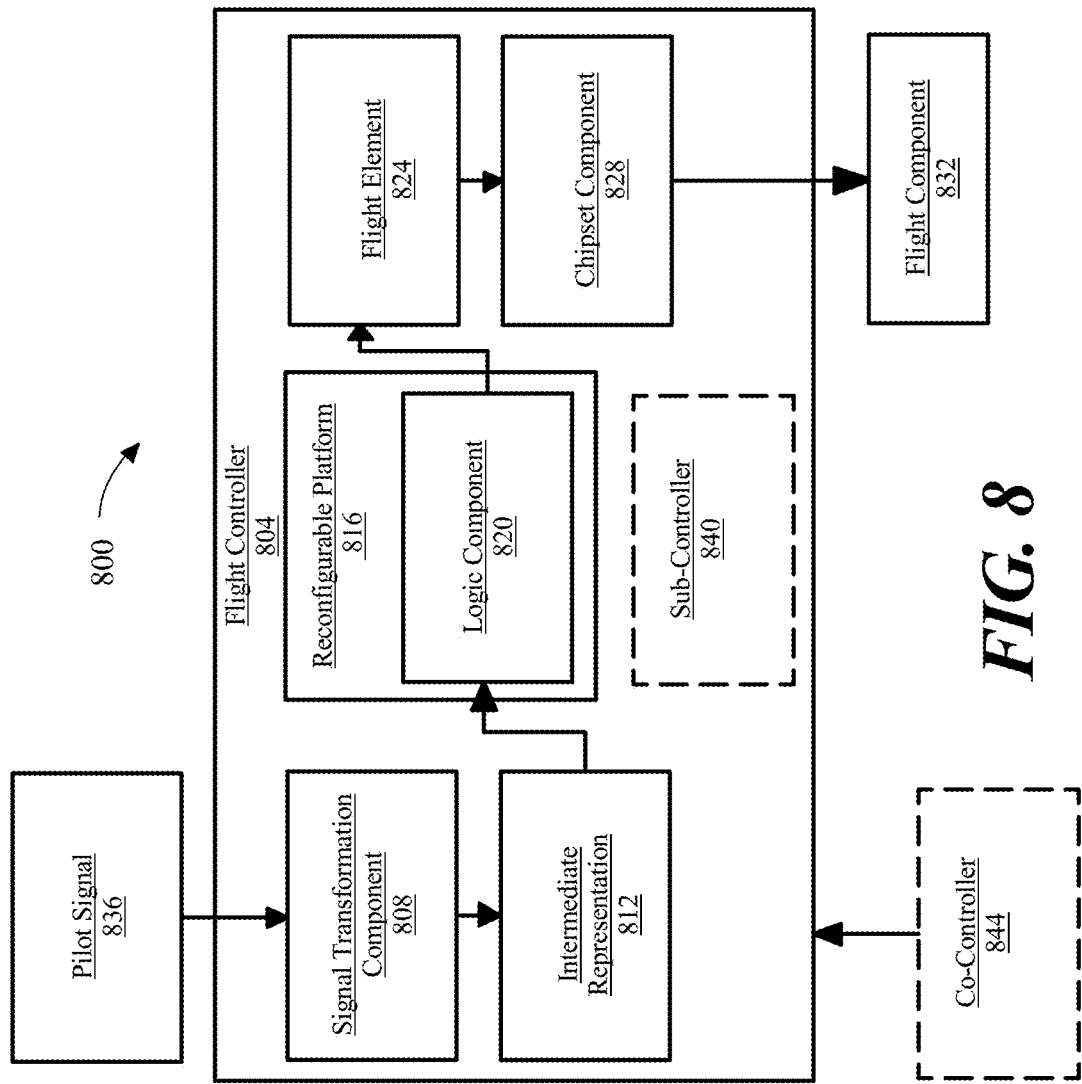
FIG. 8 is a block diagram of a flight controller according to an embodiment in the present disclosure.

Now referring to FIG. 8, an exemplary embodiment 800 of a flight controller 804 is illustrated. As used in this disclosure a "flight controller" is a computing device of a plurality of computing devices dedicated to data storage, security, distribution of traffic for load balancing, and flight instruction. Flight controller 804 may include and/or communicate with any computing device as described in this disclosure, including without limitation a microcontroller, microprocessor, digital signal processor (DSP) and/or system on a chip (SoC) as described in this disclosure. Further, flight controller 804 may include a single computing device operating independently, or may include two or more computing device operating in concert, in parallel, sequentially or the like; two or more computing devices may be included together in a single computing device or in two or more computing devices. In embodiments, flight controller 804 may be installed in an aircraft, may control the aircraft remotely, and/or may include an element installed in the aircraft and a remote element in communication therewith.

In an embodiment, and with continued reference to FIG. 8, flight controller may include a signal transformation component 808. As used in this disclosure a "signal transformation component" is a component that transforms and/or converts a first signal to a second signal, wherein a signal may include one or more digital and/or analog signals. For example, and without limitation, signal transformation component 808 may be configured to perform one or more operations such as preprocessing, lexical analysis, parsing, semantic analysis, and the like thereof. In an embodiment, and without limitation, signal transformation component 808 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 808 may include transforming one or more low-level languages such as, but not limited to, machine languages and/or assembly languages. For example, and without limitation, signal transformation component 808 may include transforming a binary language signal to an assembly language signal. In an embodiment, and without limitation, signal transformation component 808 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

With continued reference to FIG. 8, signal transformation component 808 may be configured to optimize an intermediate representation 812. As used in this disclosure an "intermediate representation" is a data structure and/or code that represents the input signal. Signal transformation component 808 may optimize intermediate representation as a function of a data-flow analysis, dependence analysis, alias analysis, pointer analysis, escape analysis, and the like thereof. In an embodiment, and without limitation, signal transformation component 808 may optimize intermediate representation 812 as a function of one or more inline expansions, dead code eliminations, constant propagation, loop transformations, and/or automatic parallelization functions. In another embodiment, signal transformation component 808 may optimize intermediate representation as a function of a machine dependent optimization such as a peephole optimization, wherein a peephole optimization may rewrite short sequences of code into more efficient sequences of code. Signal transformation component 808 may optimize intermediate representation to generate an output language, wherein an "output language," as used herein, is the native machine language of flight controller. For example, and without limitation, native machine language may include one or more binary and/or numerical languages.

In an embodiment, and without limitation, signal transformation component 808 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and with continued reference to FIG. 8, flight controller may include a reconfigurable hardware platform 816. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 816 may be reconfigured to enact any algorithm and/or algorithm selection process received from another computing device and/or created using machine-learning processes.

With continued reference to FIG. 8, reconfigurable hardware platform 816 may include a logic component 820. As used in this disclosure a "logic component" is a component that executes instructions on output language. For example, and without limitation, logic component may perform basic arithmetic, logic, controlling, input/output operations, and the like thereof. Logic component 820 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 820 may be organized according to Von Neumann and/or Harvard architecture as a non-limiting example. Logic component 820 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC). In an embodiment, logic component 820 may include one or more integrated circuit microprocessors, which may contain one or more central processing units, central processors, and/or main processors, on a single metal-oxide-semiconductor chip. Logic component 820 may be configured to execute a sequence of stored instructions to be performed on the output language and/or intermediate representation 812. Logic component 820 may be configured to fetch and/or retrieve the instruction from a memory cache, wherein a "memory cache," as used in this disclosure, is a stored instruction set on flight controller. Logic component 820 may be configured to decode the instruction retrieved from the memory cache to opcodes and/or operands. Logic component 820 may be configured to execute the instruction on intermediate representation 812 and/or output language. For example, and without limitation, logic component 820 may be configured to execute an addition operation on intermediate representation 812 and/or output language.

With continued reference to FIG. 8, in an embodiment, and without limitation, logic component 820 may be configured to calculate a flight element 824. As used in this disclosure a "flight element" is an element of datum denoting a relative status of aircraft. For example, and without limitation, flight element 824 may denote one or more torques, thrusts, airspeed velocities, forces, altitudes, groundspeed velocities, directions during flight, directions facing, forces, orientations, and the like thereof. For example, and without limitation, flight element 824 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 824 may denote that aircraft is following a flight path accurately and/or sufficiently.

With continued reference to FIG. 8, flight controller may include a chipset component 828. As used in this disclosure a "chipset component" is a component that manages data flow. In an embodiment, and without limitation, chipset component 828 may include a northbridge data flow path, wherein the northbridge dataflow path may manage data flow from logic component 820 to a high-speed device and/or component, such as a RAM, graphics controller, and the like thereof. In another embodiment, and without limitation, chipset component 828 may include a southbridge data flow path, wherein the southbridge dataflow path may manage data flow from logic component 820 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 828 may manage data flow between logic component 820, memory cache, and a flight component 108. As used in this disclosure a "flight component" is a portion of an aircraft that can be moved or adjusted to affect one or more flight elements. For example, flight component 108 may include a component used to affect the aircrafts' roll and pitch which may include one or more ailerons. As a further example, flight component 108 may include a rudder to control yaw of an aircraft. In an embodiment, chipset component 828 may be configured to communicate with a plurality of flight components as a function of flight element 824. For example, and without limitation, chipset component 828 may transmit to an aircraft rotor to reduce torque of a first lift propulsor and increase the forward thrust produced by a pusher component to perform a flight maneuver.

In an embodiment, and with continued reference to FIG. 8, flight controller is configured to produce both autonomous and semi-autonomous flight. As used in this disclosure an "autonomous function" is a mode and/or function of flight controller that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 824. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller will control the ailerons and/or rudders. As used in this disclosure "non-autonomous mode" is a mode that denotes a pilot will control aircraft and/or maneuvers of aircraft in its entirety.

In an embodiment, and with continued reference to FIG. 8, flight controller may generate autonomous function as a function of an autonomous machine-learning model. Training data is used to train autonomous machine-learning model; training data may be stored in a database or based on expert input. Training data may include an input of the charge of the batteries and an output of whether they need to be charged. As used in this disclosure an "autonomous machine-learning model" is a machine-learning model to produce an autonomous function output given flight element 824 and a pilot signal 836 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 836 may denote that a pilot is controlling and/or maneuvering ailerons, wherein the pilot is not in control of the rudders and/or propulsors. In an embodiment, pilot signal 836 may include an implicit signal and/or an explicit signal. For example, and without limitation, pilot signal 836 may include an explicit signal, wherein the pilot explicitly states there is a lack of control and/or desire for autonomous function. As a further non-limiting example, pilot signal 836 may include an explicit signal directing flight controller to control and/or maintain a portion of aircraft, a portion of the flight plan, the entire aircraft, and/or the entire flight plan. As a further non-limiting example, pilot signal 836 may include an implicit signal, wherein flight controller detects a lack of control such as by a malfunction, torque alteration, flight path deviation, and the like thereof. In an embodiment, and without limitation, pilot signal 836 may include one or more explicit signals to reduce torque, and/or one or more implicit signals that torque may be reduced due to reduction of airspeed velocity. In an embodiment, and without limitation, pilot signal 836 may include one or more local and/or global signals. For example, and without limitation, pilot signal 836 may include a local signal that is transmitted by a pilot and/or crew member. As a further non-limiting example, pilot signal 836 may include a global signal that is transmitted by air traffic control and/or one or more remote users that are in communication with the pilot of aircraft. In an embodiment, pilot signal 836 may be received as a function of a tri-state bus and/or multiplexor that denotes an explicit pilot signal should be transmitted prior to any implicit or global pilot signal.

With continued reference to FIG. 8, autonomous machine-learning model may include one or more autonomous machine-learning processes such as supervised, unsupervised, or reinforcement machine-learning processes that flight controller and/or a remote device may or may not use in the generation of autonomous function. As used in this disclosure, "remote device" is an external device to flight controller. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elastic net regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and with continued reference to FIG. 8, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

With continued reference to FIG. 8, flight controller may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller. Remote device and/or FPGA may transmit a signal, bit, datum, or parameter to flight controller that at least relates to autonomous function. Additionally or alternatively, the remote device and/or FPGA may provide an updated machine-learning model. For example, and without limitation, an updated machine-learning model may be included of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller as a software update, firmware update, or corrected autonomous machine-learning model. For example, and without limitation autonomous machine learning model may utilize a neural net machine-learning process, wherein the updated machine-learning model may incorporate a gradient boosting machine-learning process.

With continued reference to FIG. 8, flight controller may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and with continued reference to FIG. 8, flight controller may include, but is not limited to, for example, a cluster of flight controllers in a first location and a second flight controller or cluster of flight controllers in a second location. Flight controller may include one or more flight controllers dedicated to data storage, security, distribution of traffic for load balancing, and the like. Flight controller may be configured to distribute one or more computing tasks as described below across a plurality of flight controllers, which may operate in parallel, in series, redundantly, or in any other manner used for distribution of tasks or memory between computing devices. For example, and without limitation, flight controller may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and with continued reference to FIG. 8, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 108. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further includes separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

With continued reference to FIG. 8, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 812 and/or output language from logic component 820, wherein output language may include one or more analog-to-digital conversions, low bit rate transmissions, message encryptions, digital signals, binary signals, logic signals, analog signals, and the like thereof described above in detail.

With continued reference to FIG. 8, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and with continued reference to FIG. 8, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

With continued reference to FIG. 8, flight controller may also be implemented using a "shared nothing" architecture in which data is cached at the worker, in an embodiment, this may enable scalability of aircraft and/or computing device. Flight controller may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

With continued reference to FIG. 8, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

With continued reference to FIG. 8, flight controller may include a sub-controller 840. As used in this disclosure a "sub-controller" is a controller and/or component that is part of a distributed controller as described above; for instance, flight controller may be and/or include a distributed flight controller made up of one or more sub-controllers. For example, and without limitation, sub-controller 840 may include any controllers and/or components thereof that are similar to distributed flight controller and/or flight controller as described above. Sub-controller 840 may include any component of any flight controller as described above. Sub-controller 840 may be implemented in any manner suitable for implementation of a flight controller as described above. As a further non-limiting example, sub-controller 840 may include one or more processors, logic components and/or computing devices capable of receiving, processing, and/or transmitting data across the distributed flight controller as described above. As a further non-limiting example, sub-controller 840 may include a controller that receives a signal from a first flight controller and/or first distributed flight controller component and transmits the signal to a plurality of additional sub-controllers and/or flight components.

With continued reference to FIG. 8, flight controller may include a co-controller 844. As used in this disclosure a "co-controller" is a controller and/or component that joins flight controller as components and/or nodes of a distributer flight controller as described above. For example, and without limitation, co-controller 844 may include one or more controllers and/or components that are similar to flight controller. As a further non-limiting example, co-controller 844 may include any controller and/or component that joins flight controller to distributer flight controller. As a further non-limiting example, co-controller 844 may include one or more processors, logic components and/or computing devices capable of receiving, processing, and/or transmitting data to and/or from flight controller to distributed flight control system. Co-controller 844 may include any component of any flight controller as described above. Co-controller 844 may be implemented in any manner suitable for implementation of a flight controller as described above.

In an embodiment, and with continued reference to FIG. 8, flight controller may be designed and/or configured to perform any method, method step, or sequence of method steps in any embodiment described in this disclosure, in any order and with any degree of repetition. For instance, flight controller may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 9:
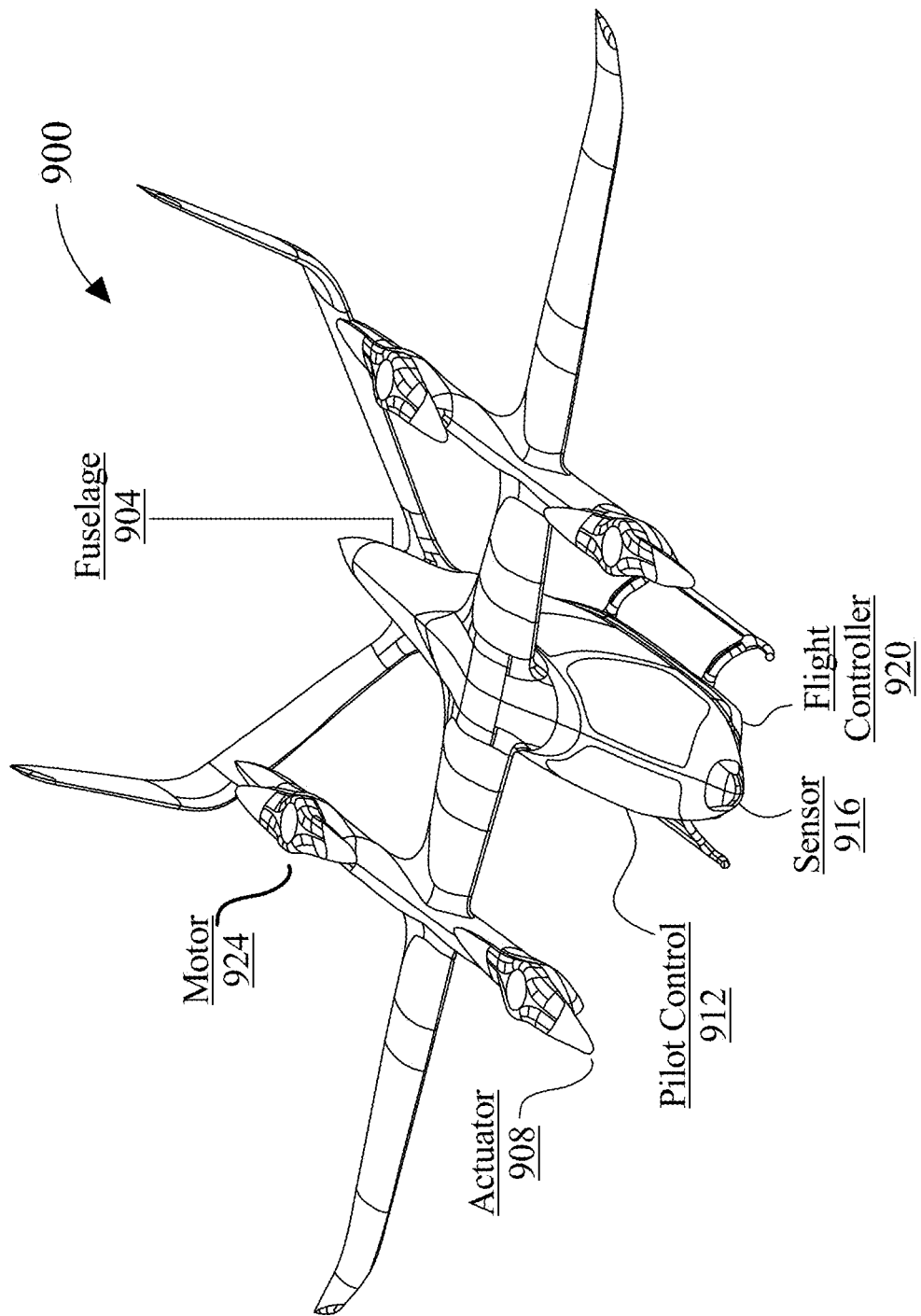
FIG. 9 is an illustration of an embodiment of an electric aircraft in one or more aspect of the present disclosure.

Referring now to FIG. 9, an exemplary embodiment of an aircraft 900 is illustrated. Aircraft 900 may include an electrically powered aircraft (i.e., electric aircraft). In some embodiments, electrically powered aircraft may be an electric vertical takeoff and landing (eVTOL) aircraft. In some embodiments, aircraft 900 may include a fuselage 904. Fuselage 904 may comprise structural elements that physically support the shape and structure of an aircraft. Structural elements may take a plurality of forms, alone or in combination with other types. Structural elements may vary depending on the construction type of aircraft and specifically, the fuselage. Fuselage 904 may comprise a truss structure. A truss structure may be used with a lightweight aircraft and may include welded aluminum tube trusses. A truss, as used herein, is an assembly of beams that create a rigid structure, often in combinations of triangles to create three-dimensional shapes. A truss structure may alternatively comprise titanium construction in place of aluminum tubes, or a combination thereof. In some embodiments, structural elements may comprise aluminum tubes and/or titanium beams. In an embodiment, and without limitation, structural elements may include an aircraft skin. Aircraft skin may be layered over the body shape constructed by trusses. Aircraft skin may comprise a plurality of materials such as aluminum, fiberglass, and/or carbon fiber, the latter of which will be addressed in greater detail later in this paper.

With continued reference to FIG. 9, aircraft 900 may include a plurality of actuators 908. Actuator 908 may include any motor and/or propulsor described in this disclosure. In an embodiment, actuator 908 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, Hirth joints, hydrodynamic coupling, jaw coupling, magnetic coupling, Oldham coupling, sleeve coupling, tapered shaft lock, twin spring coupling, rag joint coupling, universal joints, or any combination thereof. As a non-limiting example, aircraft may include airplanes, helicopters, airships, blimps, gliders, paramotors, and the like thereof. In an embodiment, mechanical coupling may be used to connect the ends of adjacent parts and/or objects of an electric aircraft. Further, in an embodiment, mechanical coupling may be used to join two pieces of rotating electric aircraft components.

With continued reference to FIG. 9, a plurality of actuators 908 may be configured to produce a torque. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. For example, plurality of actuators 908 may include a component used to produce a torque that affects aircrafts' roll and pitch, such as without limitation one or more ailerons. An "aileron," as used in this disclosure, is a hinged surface which forms part of the trailing edge of a wing in a fixed wing aircraft, and which may be moved via mechanical means such as without limitation servomotors, mechanical linkages, or the like. As a further example, plurality of actuators 908 may include a rudder, which may include, without limitation, a segmented rudder that produces a torque about a vertical axis. Additionally or alternatively, plurality of actuators 908 may include other flight control surfaces such as propulsors, rotating flight controls, or any other structural features which can adjust movement of aircraft 900. Plurality of actuators 908 may include one or more rotors, turbines, ducted fans, paddle wheels, and/or other components configured to propel a vehicle through a fluid medium including, but not limited to air.

With continued reference to FIG. 9, plurality of actuators 908 may include at least a propulsor component. As used in this disclosure a "propulsor component" or "propulsor" is a component and/or device used to propel a craft by exerting force on a fluid medium, which may include a gaseous medium such as air or a liquid medium such as water. In an embodiment, when a propulsor twists and pulls air behind it, it may, at the same time, push an aircraft forward with an amount of force and/or thrust. More air pulled behind an aircraft results in greater thrust with which the aircraft is pushed forward. Propulsor component may include any device or component that consumes electrical power on demand to propel an electric aircraft in a direction or other vehicle while on ground or in-flight. In an embodiment, propulsor component may include a puller component. As used in this disclosure a "puller component" is a component that pulls and/or tows an aircraft through a medium. As a non-limiting example, puller component may include a flight component such as a puller propeller, a puller motor, a puller propulsor, and the like. Additionally, or alternatively, puller component may include a plurality of puller flight components. In another embodiment, propulsor component may include a pusher component. As used in this disclosure a "pusher component" is a component that pushes and/or thrusts an aircraft through a medium. As a non-limiting example, pusher component may include a pusher component such as a pusher propeller, a pusher motor, a pusher propulsor, and the like. Additionally, or alternatively, pusher flight component may include a plurality of pusher flight components.

With continued reference to FIG. 9, in another embodiment, propulsor may include a propeller, a blade, or any combination of the two. A propeller may function to convert rotary motion from an engine or other power source into a swirling slipstream which may push the propeller forwards or backwards. Propulsor may include a rotating power-driven hub, to which several radial airfoil-section blades may be attached, such that an entire whole assembly rotates about a longitudinal axis. As a non-limiting example, blade pitch of propellers may be fixed at a fixed angle, manually variable to a few set positions, automatically variable (e.g. a "constant-speed" type), and/or any combination thereof as described further in this disclosure. As used in this disclosure a "fixed angle" is an angle that is secured and/or substantially unmovable from an attachment point. For example, and without limitation, a fixed angle may be an angle of 2.2° inward and/or 1.7° forward. As a further non-limiting example, a fixed angle may be an angle of 3.9° outward and/or 2.7° backward. In an embodiment, propellers for an aircraft may be designed to be fixed to their hub at an angle similar to the thread on a screw makes an angle to the shaft; this angle may be referred to as a pitch or pitch angle which may determine a speed of forward movement as the blade rotates. Additionally or alternatively, propulsor component may be configured having a variable pitch angle. As used in this disclosure a "variable pitch angle" is an angle that may be moved and/or rotated. For example, and without limitation, propulsor component may be angled at a first angle of 3.3° inward, wherein propulsor component may be rotated and/or shifted to a second angle of 1.7° outward.

With continued reference to FIG. 9, propulsor may include a thrust element which may be integrated into the propulsor. Thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

With continued reference to FIG. 9, plurality of actuators 908 may include power sources, control links to one or more elements, fuses, and/or mechanical couplings used to drive and/or control any other flight component. Plurality of actuators 908 may include a motor that operates to move one or more flight control components and/or one or more control surfaces, to drive one or more propulsors, or the like. A motor may be driven by direct current (DC) electric power and may include, without limitation, brushless DC electric motors, switched reluctance motors, induction motors, or any combination thereof. Alternatively or additionally, a motor may be driven by an inverter. A motor may also include electronic speed controllers, inverters, or other components for regulating motor speed, rotation direction, and/or dynamic braking.

With continued reference to FIG. 9, plurality of actuators 908 may include an energy source. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which system may be incorporated.

With continued reference to FIG. 9, in another embodiment, an energy source may be used to provide a steady supply of electrical power to a load over a flight by an electric aircraft 900. For example, energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, energy source may include an emergency power unit which may be capable of providing sufficient electrical power for auxiliary loads including without limitation, lighting, navigation, communications, de-icing, steering or other systems requiring power or energy. Further, energy source may be capable of providing sufficient power for controlled descent and landing protocols, including, without limitation, hovering descent or runway landing. As used herein the energy source may have high power density where electrical power an energy source can usefully produce per unit of volume and/or mass is relatively high. As used in this disclosure, "electrical power" is a rate of electrical energy per unit time. An energy source may include a device for which power that may be produced per unit of volume and/or mass has been optimized, for instance at an expense of maximal total specific energy density or power capacity. Non-limiting examples of items that may be used as at least an energy source include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

With continued reference to FIG. 9, an energy source may include a plurality of energy sources, referred to herein as a module of energy sources. Module may include batteries connected in parallel or in series or a plurality of modules connected either in series or in parallel designed to satisfy both power and energy requirements. Connecting batteries in series may increase a potential of at least an energy source which may provide more power on demand. High potential batteries may require cell matching when high peak load is needed. As more cells are connected in strings, there may exist a possibility of one cell failing which may increase resistance in module and reduce overall power output as voltage of the module may decrease as a result of that failing cell. Connecting batteries in parallel may increase total current capacity by decreasing total resistance, and it also may increase overall amp-hour capacity. Overall energy and power outputs of at least an energy source may be based on individual battery cell performance or an extrapolation based on a measurement of at least an electrical parameter. In an embodiment where energy source includes a plurality of battery cells, overall power output capacity may be dependent on electrical parameters of each individual cell. If one cell experiences high self-discharge during demand, power drawn from at least an energy source may be decreased to avoid damage to a weakest cell. Energy source may further include, without limitation, wiring, conduit, housing, cooling system and battery management system. Persons skilled in the art will be aware, after reviewing the entirety of this disclosure, of many different components of an energy source. Exemplary energy sources are disclosed in detail in U.S. patent application Ser. Nos. 16/948,157 and 16/048,140 both entitled "SYSTEM AND METHOD FOR HIGH ENERGY DENSITY BATTERY MODULE" by S. Donovan et al., which are incorporated in their entirety herein by reference.

With continued reference to FIG. 9, according to some embodiments, an energy source may include an emergency power unit (EPU) (i.e., auxiliary power unit). As used in this disclosure an "emergency power unit" is an energy source as described herein that is configured to power an essential system for a critical function in an emergency, for instance without limitation when another energy source has failed, is depleted, or is otherwise unavailable. Exemplary non-limiting essential systems include navigation systems, such as MFD, GPS, VOR receiver or directional gyro, and other essential flight components, such as propulsors.

With continued reference to FIG. 9, another exemplary actuator may include landing gear. Landing gear may be used for take-off and/or landing/Landing gear may be used to contact ground while aircraft 900 is not in flight. Exemplary landing gear is disclosed in detail in U.S. patent application Ser. No. 17/196,719 entitled "SYSTEM FOR ROLLING LANDING GEAR" by R. Griffin et al., which is incorporated in its entirety herein by reference.

With continued reference to FIG. 9, aircraft 900 may include a pilot control 912, including without limitation, a hover control, a thrust control, an inceptor stick, a cyclic, and/or a collective control. As used in this disclosure a "collective control" or "collective" is a mechanical control of an aircraft that allows a pilot to adjust and/or control the pitch angle of the plurality of actuators 908. For example and without limitation, collective control may alter and/or adjust the pitch angle of all of the main rotor blades collectively. For example, and without limitation pilot control 912 may include a yoke control. As used in this disclosure a "yoke control" is a mechanical control of an aircraft to control the pitch and/or roll. For example and without limitation, yoke control may alter and/or adjust the roll angle of aircraft 900 as a function of controlling and/or maneuvering ailerons. In an embodiment, pilot control 912 may include one or more footbrakes, control sticks, pedals, throttle levels, and the like thereof. In another embodiment, and without limitation, pilot control 912 may be configured to control a principal axis of the aircraft. As used in this disclosure a "principal axis" is an axis in a body representing one three dimensional orientations. For example, and without limitation, principal axis or more yaw, pitch, and/or roll axis. Principal axis may include a yaw axis. As used in this disclosure a "yaw axis" is an axis that is directed towards the bottom of the aircraft, perpendicular to the wings. For example, and without limitation, a positive yawing motion may include adjusting and/or shifting the nose of aircraft 900 to the right. Principal axis may include a pitch axis. As used in this disclosure a "pitch axis" is an axis that is directed towards the right laterally extending wing of the aircraft. For example, and without limitation, a positive pitching motion may include adjusting and/or shifting the nose of aircraft 900 upwards. Principal axis may include a roll axis. As used in this disclosure a "roll axis" is an axis that is directed longitudinally towards the nose of the aircraft, parallel to the fuselage. For example, and without limitation, a positive rolling motion may include lifting the left and lowering the right wing concurrently.

With continued reference to FIG. 9, pilot control 912 may be configured to modify a variable pitch angle. For example, and without limitation, pilot control 912 may adjust one or more angles of attack of a propeller. As used in this disclosure an "angle of attack" is an angle between the chord of the propeller and the relative wind. For example, and without limitation angle of attack may include a propeller blade angled 3.2°. In an embodiment, pilot control 912 may modify the variable pitch angle from a first angle of 2.71° to a second angle of 3.72°. Additionally or alternatively, pilot control 912 may be configured to translate a pilot desired torque for flight component 908. For example, and without limitation, pilot control 912 may translate that a pilot's desired torque for a propeller be 160 lb. ft. of torque. As a further non-limiting example, pilot control 912 may introduce a pilot's desired torque for a propulsor to be 290 lb. ft. of torque. Additional disclosure related to pilot control 912 may be found in U.S. patent application Ser. Nos. 17/001, 545 and 16/929,206 both of which are entitled "A HOVER AND THRUST CONTROL ASSEMBLY FOR DUAL-MODE AIRCRAFT" by C. Spiegel et al., which are incorporated in their entirety herein by reference.

With continued reference to FIG. 9, aircraft 900 may include a loading system. A loading system may include a system configured to load an aircraft of either cargo or personnel. For instance, some exemplary loading systems may include a swing nose, which is configured to swing the nose of aircraft 900 of the way thereby allowing direct access to a cargo bay located behind the nose. A notable exemplary swing nose aircraft is Boeing 747. Additional disclosure related to loading systems can be found in U.S. patent application Ser. No. 17/97,594 entitled "SYSTEM AND METHOD FOR LOADING AND SECURING PAYLOAD IN AN AIRCRAFT" by R. Griffin et al., entirety of which in incorporated herein by reference.

With continued reference to FIG. 9, aircraft 900 may include a sensor 916. Sensor 916 may include any sensor or noise monitoring circuit described in this disclosure. 916 may be configured to sense a characteristic of pilot control 912. Sensor may be a device, module, and/or subsystem, utilizing any hardware, software, and/or any combination thereof to sense a characteristic and/or changes thereof, in an instant environment, for instance without limitation a pilot control 912, which the sensor is proximal to or otherwise in a sensed communication with, and transmit information associated with the characteristic, for instance without limitation digitized data. Sensor 916 may be mechanically and/or communicatively coupled to aircraft 900, including, for instance, to at least a pilot control 912. Sensor 916 may be configured to sense a characteristic associated with at least a pilot control 912. An environmental sensor may include without limitation one or more sensors used to detect ambient temperature, barometric pressure, and/or air velocity, one or more motion sensors which may include without limitation gyroscopes, accelerometers, inertial measurement unit (IMU), and/or magnetic sensors, one or more humidity sensors, one or more oxygen sensors, or the like. Additionally or alternatively, sensor 916 may include at least a geospatial sensor. Sensor 916 may be located inside an aircraft; and/or be included in and/or attached to at least a portion of the aircraft. Sensor may include one or more proximity sensors, displacement sensors, vibration sensors, and the like thereof. Sensor may be used to monitor the status of aircraft 900 for both critical and non-critical functions. Sensor may be incorporated into vehicle or aircraft or be remote.

With continued reference to FIG. 9, in some embodiments, sensor 916 may be configured to sense a characteristic associated with any pilot control described in this disclosure. Non-limiting examples of a sensor 916 may include an inertial measurement unit (IMU), an accelerometer, a gyroscope, a proximity sensor, a pressure sensor, a light sensor, a pitot tube, an air speed sensor, a position sensor, a speed sensor, a switch, a thermometer, a strain gauge, an acoustic sensor, and an electrical sensor. In some cases, sensor 916 may sense a characteristic as an analog measurement, for instance, yielding a continuously variable electrical potential indicative of the sensed characteristic. In these cases, sensor 916 may additionally comprise an analog to digital converter (ADC) as well as any additional circuitry, such as without limitation a Whetstone bridge, an amplifier, a filter, and the like. For instance, in some cases, sensor 916 may comprise a strain gage configured to determine loading of one or flight components, for instance landing gear. Strain gage may be included within a circuit comprising a Whetstone bridge, an amplified, and a band-pass filter to provide an analog strain measurement signal having a high signal to noise ratio, which characterizes strain on a landing gear member. An ADC may then digitize analog signal produces a digital signal that can then be transmitted other systems within aircraft 900, for instance without limitation a computing system, a pilot display, and a memory component. Alternatively or additionally, sensor 916 may sense a characteristic of a pilot control 912 digitally. For instance in some embodiments, sensor 916 may sense a characteristic through a digital means or digitize a sensed signal natively. In some cases, for example, sensor 916 may include a rotational encoder and be configured to sense a rotational position of a pilot control; in this case, the rotational encoder digitally may sense rotational "clicks" by any known method, such as without limitation magnetically, optically, and the like.

With continued reference to FIG. 9, electric aircraft 900 may include at least a motor 924, which may be mounted on a structural feature of the aircraft. Design of motor 924 may enable it to be installed external to structural member (such as a boom, nacelle, or fuselage) for easy maintenance access and to minimize accessibility requirements for the structure; this may improve structural efficiency by requiring fewer large holes in the mounting area. In some embodiments, motor 924 may include two main holes in top and bottom of mounting area to access bearing cartridge. Further, a structural feature may include a component of electric aircraft 900. For example, without limitation structural feature may be any portion of a vehicle incorporating motor 924, including any vehicle as described in this disclosure. As a further non-limiting example, a structural feature may include without limitation a wing, a spar, an outrigger, a fuselage, or any portion thereof; persons skilled in the art, upon reviewing the entirety of this disclosure, will be aware of many possible features that may function as at least a structural feature. At least a structural feature may be constructed of any suitable material or combination of materials, including without limitation metal such as aluminum, titanium, steel, or the like, polymer materials or composites, fiberglass, carbon fiber, wood, or any other suitable material. As a non-limiting example, at least a structural feature may be constructed from additively manufactured polymer material with a carbon fiber exterior; aluminum parts or other elements may be enclosed for structural strength, or for purposes of supporting, for instance, vibration, torque or shear stresses imposed by at least propulsor 908. Persons skilled in the art, upon reviewing the entirety of this disclosure, will be aware of various materials, combinations of materials, and/or constructions techniques.

With continued reference to FIG. 9, a number of aerodynamic forces may act upon the electric aircraft 900 during flight. Forces acting on electric aircraft 900 during flight may include, without limitation, thrust, the forward force produced by the rotating element of the electric aircraft 900 and acts parallel to the longitudinal axis. Another force acting upon electric aircraft 900 may be, without limitation, drag, which may be defined as a rearward retarding force which is caused by disruption of airflow by any protruding surface of the electric aircraft 900 such as, without limitation, the wing, rotor, and fuselage. Drag may oppose thrust and acts rearward parallel to the relative wind. A further force acting upon electric aircraft 900 may include, without limitation, weight, which may include a combined load of the electric aircraft 900 itself, crew, baggage, and/or fuel. Weight may pull electric aircraft 900 downward due to the force of gravity. An additional force acting on electric aircraft 900 may include, without limitation, lift, which may act to oppose the downward force of weight and may be produced by the dynamic effect of air acting on the airfoil and/or downward thrust from the propulsor 908 of the electric aircraft. Lift generated by the airfoil may depend on speed of airflow, density of air, total area of an airfoil and/or segment thereof, and/or an angle of attack between air and the airfoil. For example, and without limitation, electric aircraft 900 are designed to be as lightweight as possible. Reducing the weight of the aircraft and designing to reduce the number of components is essential to optimize the weight. To save energy, it may be useful to reduce weight of components of electric aircraft 900, including without limitation propulsors and/or propulsion assemblies. In an embodiment, motor 924 may eliminate need for many external structural features that otherwise might be needed to join one component to another component. Motor 924 may also increase energy efficiency by enabling a lower physical propulsor profile, reducing drag and/or wind resistance. This may also increase durability by lessening the extent to which drag and/or wind resistance add to forces acting on electric aircraft 900 and/or propulsors.

Figure 10:
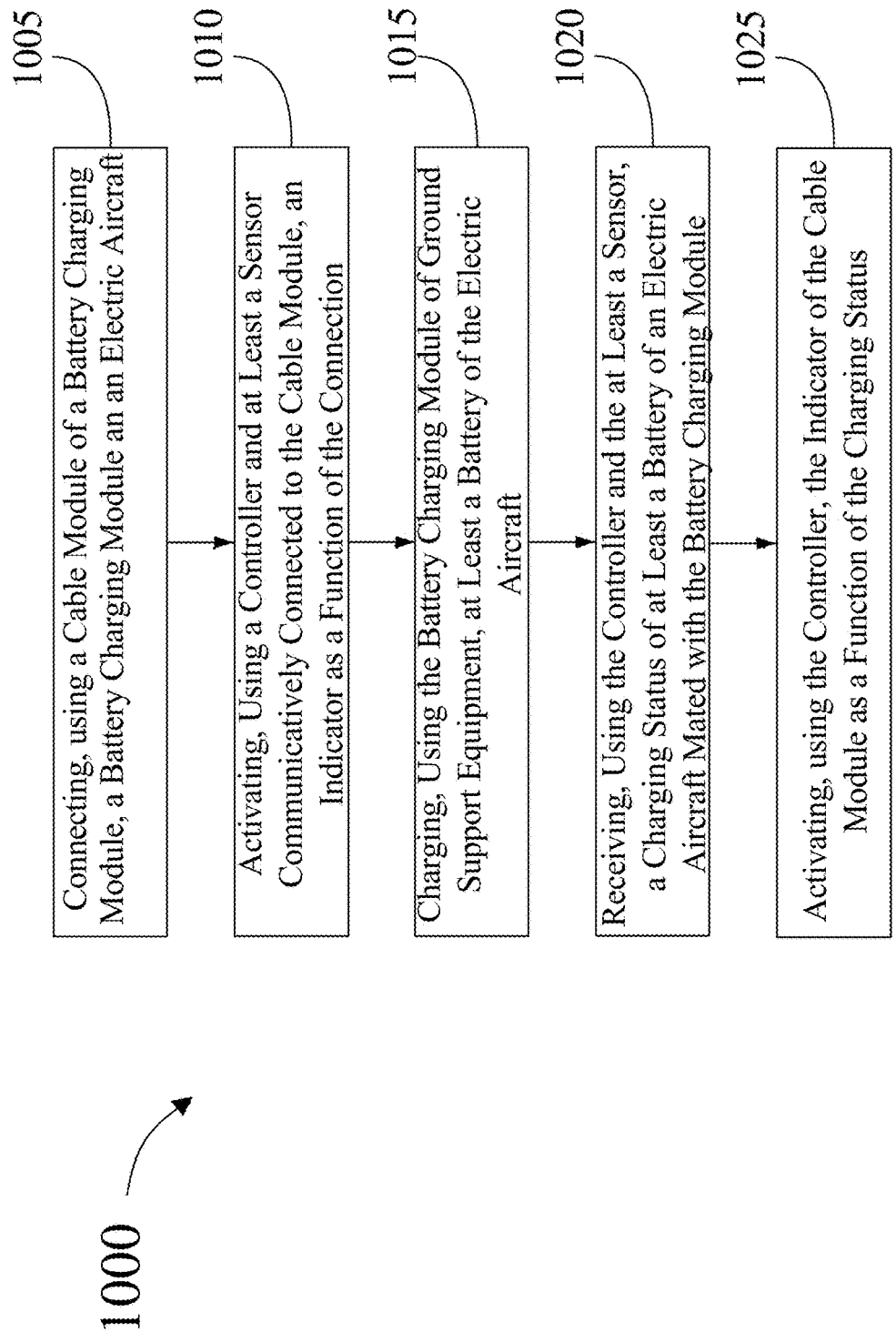
FIG. 10 is a flow diagram of an exemplary method for using an indicating system for ground support equipment for an electric aircraft.

Referring now to FIG. 10, a flow diagram of an exemplary method 1000 for using an indicating system for ground support equipment for an electric aircraft. The method 1000 includes a step 1005 of connecting, using a cable module of a battery charging module, the battery charging module and an electric aircraft. The method 1000 includes a step 1010 of activating, using a controller and at least a sensor communicatively connected to the cable module, an indicator mechanically connected to the cable module as a function of the connection. The method 1000 includes a step 1015 of charging, using the battery charging module of ground support equipment, the at least a battery of the electric aircraft. The method 1000 includes a step 1020 of receiving, using the controller and the at least a sensor communicatively connected to the at least a battery, a charging status of the at least a battery of the electric aircraft mated with the battery charging module of the ground service equipment using a cable module. The method 1000 includes a step 1025 of activating, using the controller, the indicator of the cable module with a flash pattern and a color pattern as a function of the charging status. In some embodiments, the indicator may include a light indicator, wherein the light indicator may include a color pattern and may be mechanically connected to the one or more housings of the battery charging module; and the method 1000 may further include controlling, using the controller, the color pattern of the light indicator to indicate a charging status of the at least a battery of the electric aircraft. In some embodiments, the charging status may include a charging status, wherein the light indicator may be further configured to flash in red; and the charging status may include a complete status, wherein the light indicator may be further configured to flash in green. In some embodiments, the at least a ground support module may include a battery thermal module configured to regulate a temperature of at least a battery of the electric aircraft. In some embodiments, method 1000 may further include receiving, using the controller, a signal from a temperature sensor communicatively connected to the at least a battery of the electric aircraft, activating, using the controller, the battery thermal module as a function of the signal from the temperature sensor, and activating, using the controller, the indicator, wherein the indicator may be mechanically connected to the one or more housings of the battery thermal module. In some embodiments, the at least a ground support module may include an aircraft conditioning module configured to engage in a pre-flight preparation protocol. In some embodiments, the indicator may include a light indicator, wherein the light indicator may include a flash pattern and the light indicator is mechanically connected to the one or more housings of the aircraft conditioning module, and method 1000 may further include controlling, using the controller, the flash pattern of the indicator to indicate a usage of the aircraft conditioning module. In some embodiments, the cable module may include a connector, wherein the connector comprises a user input device configured to receive a user input from a user, and method 1000 may further include controlling, using the controller, the indicator as a function of the user input from the user input device, wherein the indicator may be mechanically connected to the cable module. In some embodiments, the at least a sensor may include a motion sensor, and method 1000 may further include controlling, using the controller, the indicator as a function of a signal from the motion sensor, wherein the indicator may be communicatively connected to the cable module. In some embodiments, the indicator may include a sound indicator. This method 1000, and steps therein, may be implemented as disclosed with respect to FIGS. 1-9.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 11:
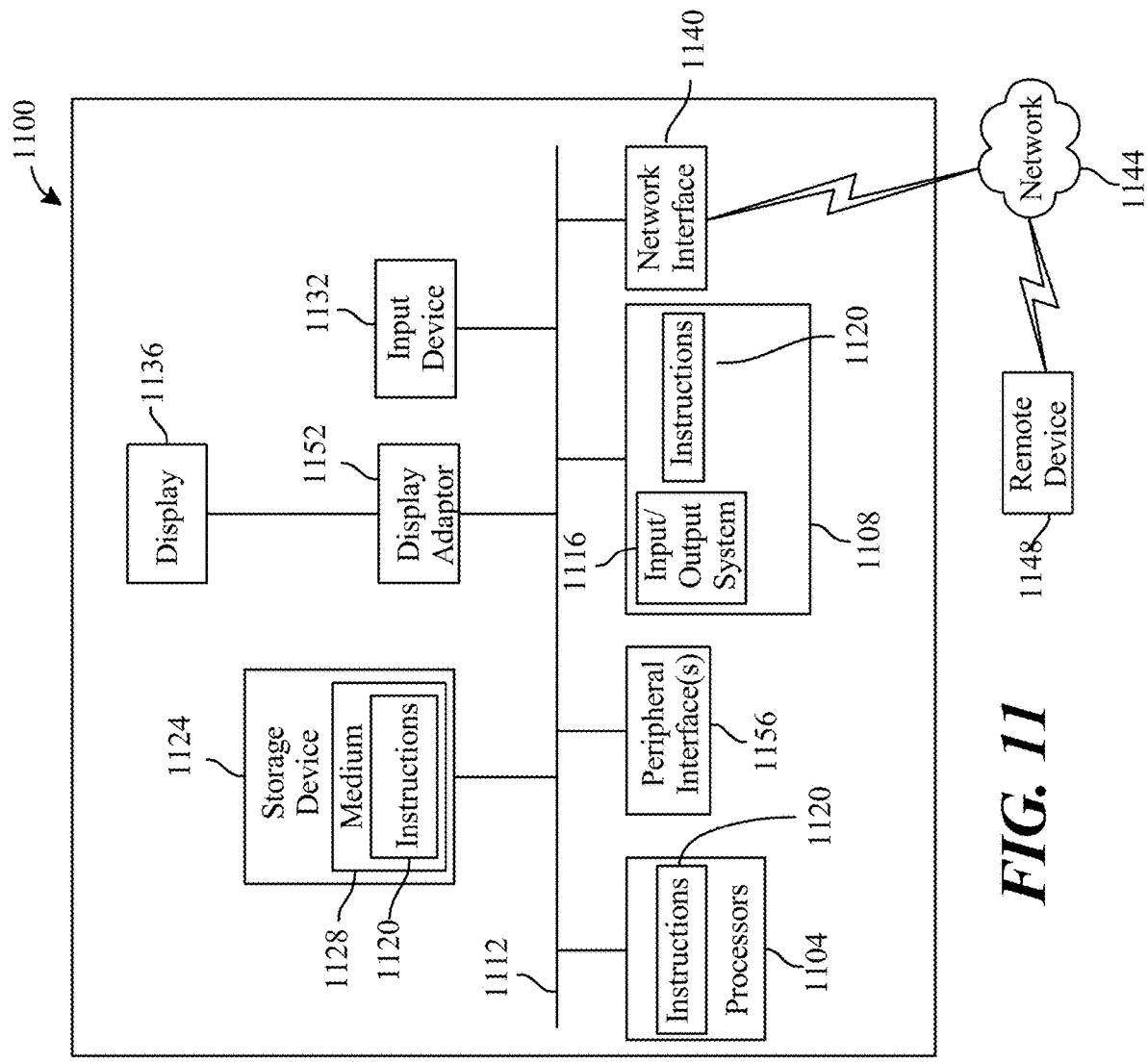
FIG. 11 is a block diagram of a computing system that can be used to implement any one or more of the methodologies disclosed herein and any one or more portions thereof.

FIG. 11 shows a diagrammatic representation of one embodiment of a computing device in the exemplary form of a computer system 1100 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1100 includes a processor 1104 and a memory 1108 that communicate with each other, and with other components, via a bus 1112. Bus 1112 may include any of several types of bus structures including, but not limited to, a memory bus, a memory controller, a peripheral bus, a local bus, and any combinations thereof, using any of a variety of bus architectures.

Processor 1104 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1104 may be organized according to Von Neumann and/or Harvard architecture as a non-limiting example. Processor 1104 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1108 may include various components (e.g., machine-readable media) including, but not limited to, a random-access memory component, a read only component, and any combinations thereof. In one example, a basic input/output system 1116 (BIOS), including basic routines that help to transfer information between elements within computer system 1100, such as during start-up, may be stored in memory 1108. Memory 1108 may also include (e.g., stored on one or more machine-readable media) instructions (e.g., software) 1120 embodying any one or more of the aspects and/or methodologies of the present disclosure. In another example, memory 1108 may further include any number of program modules including, but not limited to, an operating system, one or more application programs, other program modules, program data, and any combinations thereof.

Computer system 1100 may also include a storage device 1124. Examples of a storage device (e.g., storage device 1124) include, but are not limited to, a hard disk drive, a magnetic disk drive, an optical disc drive in combination with an optical medium, a solid-state memory device, and any combinations thereof. Storage device 1124 may be connected to bus 1112 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1124 (or one or more components thereof) may be removably interfaced with computer system 1100 (e.g., via an external connector (not shown)). Particularly, storage device 1124 and an associated machine-readable medium 1128 may provide nonvolatile and/or volatile storage of machine-readable instructions, data structures, program modules, and/or other data for computer system 1100. In one example, software 1120 may reside, completely or partially, within machine-readable medium 1128. In another example, software 1120 may reside, completely or partially, within processor 1104.

Computer system 1100 may also include an input device 1132. In one example, a user of computer system 1100 may enter commands and/or other information into computer system 1100 via input device 1132. Examples of an input device 1132 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1132 may be interfaced to bus 1112 via any of a variety of interfaces (not shown) including, but not limited to, a serial interface, a parallel interface, a game port, a USB interface, a FIRE-WIRE interface, a direct interface to bus 1112, and any combinations thereof. Input device 1132 may include a touch screen interface that may be a part of or separate from display 1136, discussed further below. Input device 1132 may be utilized as a user selection device for selecting one or more graphical representations in a graphical interface as described above.

A user may also input commands and/or other information to computer system 1100 via storage device 1124 (e.g., a removable disk drive, a flash drive, etc.) and/or network interface device 1140. A network interface device, such as network interface device 1140, may be utilized for connecting computer system 1100 to one or more of a variety of networks, such as network 1144, and one or more remote devices 1148 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1144, may employ a wired and/or a wireless mode of communication. In general, any network topology may be used. Information (e.g., data, software 1120, etc.) may be communicated to and/or from computer system 1100 via network interface device 1140.

Computer system 1100 may further include a video display adapter 1152 for communicating a displayable image to a display device, such as display device 1136. Examples of a display device include, but are not limited to, a liquid crystal display (LCD), a cathode ray tube (CRT), a plasma display, a light emitting diode (LED) display, and any combinations thereof. Display adapter 1152 and display device 1136 may be utilized in combination with processor 1104 to provide graphical representations of aspects of the present disclosure. In addition to a display device, computer system 1100 may include one or more other peripheral output devices including, but not limited to, an audio speaker, a printer, and any combinations thereof. Such peripheral output devices may be connected to bus 1112 via a peripheral interface 1156. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments according to this disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for an indicating system for ground support equipment for an electric aircraft, wherein the apparatus comprises:
   ground support equipment, wherein the ground support equipment comprises:
      at least a ground support module comprising a battery charging module including a coolant source configured to transfer heat between a coolant and ambient air wherein the at least a ground support module is configured to support an operation of an electric aircraft;
      one or more housings wherein the one or more housings is configured to house the at least a ground support module;
      a cable module, wherein the cable module is configured to connect the at least a ground support module and the electric aircraft;
      an indicator configured to indicate informatic communication of the at least ground support module and the cable module; and
      a controller communicatively connected to the at least a ground support module and the cable module and configured to control the indicator.

2. The apparatus of claim 1, wherein the at least a ground support module comprises a battery charging module configured to charge at least a battery of the electric aircraft.

3. The apparatus of claim 2, wherein:
   the indicator comprises a light indicator, wherein the light indicator comprises a color pattern and is mechanically connected to the one or more housings of the battery charging module; and
   the controller is configured to control the color pattern of the light indicator to indicate a charging status of the at least a battery of the electric aircraft.

4. The apparatus of claim 3, wherein:
   the charging status comprises a charging status, wherein the light indicator is further configured to flash in red; and
   the charging status comprises a complete status, wherein the light indicator is further configured to flash in green.

5. The apparatus of claim 1, wherein the at least a ground support module comprises a battery thermal module configured to regulate a temperature of at least a battery of the electric aircraft.

6. The apparatus of claim 5, wherein the controller is further configured to:
receive a signal from a temperature sensor communicatively connected to the at least a battery of the electric aircraft;
activate the battery thermal module as a function of the signal from the temperature sensor; and
activate the indicator, wherein the indicator is mechanically connected to the one or more housings of the battery thermal module.

7. The apparatus of claim 1, wherein the at least a ground support module comprises an aircraft conditioning module configured to engage in a pre-flight preparation protocol.

8. The apparatus of claim 7, wherein:
the indicator comprises a light indicator, wherein the light indicator comprises a flash pattern and the light indicator is mechanically connected to the one or more housings of the aircraft conditioning module; and
the controller is configured to control the flash pattern of the light indicator to indicate a usage of the aircraft conditioning module.

9. The apparatus of claim 1, wherein:
the cable module comprises a connector, wherein the connector comprises a user input device configured to receive a user input from a user; and
the controller is further configured to control the indicator, wherein the indicator is mechanically connected to the cable module, as a function of the user input from the user input device.

10. The apparatus of claim 1, wherein:
the cable module further comprises at least a sensor, wherein the at least a sensor comprises a motion sensor; and
the controller is further configured to control the indicator as a function of a signal from the motion sensor, wherein the indicator is communicatively connected to the cable module.

11. A method for using an indicating system for ground support equipment for an electric aircraft, wherein the method comprises:
connecting, using a cable module of a battery charging module, the battery charging module and an electric aircraft;
activating, using a controller and at least a sensor communicatively connected to the cable module, an indicator mechanically connected to the cable module as a function of the connection;
charging, using the battery charging module of ground support equipment wherein the battery charging module includes a coolant source configured to transfer heat between a coolant and ambient air, at least a battery of the electric aircraft;
receiving, using the controller and the at least a sensor communicatively connected to the at least a battery, a charging status of at least a battery of an electric aircraft mated with the battery charging module of the ground support equipment using the cable module; and
activating, using the controller, the indicator of the cable module as a function of the charging status.

12. The method of claim 11, wherein the indicator comprises a light indicator, wherein the light indicator comprises a color pattern and is mechanically connected to the one or more housings of the battery charging module; and the method further comprising:
controlling, using the controller, the color pattern of the light indicator to indicate a charging status of the at least a battery of the electric aircraft.

13. The method of claim 12, wherein:
the charging status comprises a charging status, wherein the light indicator is further configured to flash in red; and
the charging status comprises a complete status, wherein the light indicator is further configured to flash in green.

14. The method of claim 11, wherein the at least a ground support module comprises a battery thermal module configured to regulate a temperature of at least a battery of the electric aircraft.

15. The method of claim 14, further comprising:
receiving, using the controller, a signal from a temperature sensor communicatively connected to the at least a battery of the electric aircraft;
activating, using the controller, the battery thermal module as a function of the signal from the temperature sensor; and
activating, using the controller, the indicator, wherein the indicator is mechanically connected to the one or more housings of the battery thermal module.

16. The method of claim 11, wherein the at least a ground support module comprises an aircraft conditioning module configured to engage in a pre-flight preparation protocol.

17. The method of claim 16, wherein the indicator comprises a light indicator, wherein the light indicator comprises a flash pattern and the light indicator is mechanically connected to the one or more housings of the aircraft conditioning module; and the method further comprising:
controlling, using the controller, the flash pattern of the indicator to indicate a usage of the aircraft conditioning module.

18. The method of claim 11, wherein the cable module comprises a connector, wherein the connector comprises a user input device configured to receive a user input from a user; and the method further comprising:
controlling, using the controller, the indicator as a function of the user input from the user input device, wherein the indicator is mechanically connected to the cable module.

19. The method of claim 11, wherein the at least a sensor comprises a motion sensor; and the method further comprising:
controlling, using the controller, the indicator as a function of a signal from the motion sensor, wherein the indicator is communicatively connected to the cable module.

20. The method of claim 11, wherein the indicator comprises a sound indicator.

* * * * *